United States Patent
Li et al.

(10) Patent No.: US 12,167,428 B2
(45) Date of Patent: Dec. 10, 2024

(54) BANDWIDTH INFORMATION INDICATION METHOD AND COMMUNICATIONS DEVICE

(71) Applicant: Huawei Technologies Co., Ltd., Shenzhen (CN)

(72) Inventors: Yunbo Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 751 days.

(21) Appl. No.: 17/159,611

(22) Filed: Jan. 27, 2021

(65) Prior Publication Data

US 2021/0153210 A1 May 20, 2021

Related U.S. Application Data

(63) Continuation of application No. PCT/CN2019/097989, filed on Jul. 26, 2019.

(30) Foreign Application Priority Data

Jul. 28, 2018 (CN) .......................... 201810850345.4

(51) Int. Cl.
*H04W 72/53* (2023.01)
*H04L 1/00* (2006.01)
(Continued)

(52) U.S. Cl.
CPC ........... *H04W 72/53* (2023.01); *H04L 1/0068* (2013.01); *H04L 1/1614* (2013.01);
(Continued)

(58) Field of Classification Search
CPC ............. H04W 72/53; H04W 72/0446; H04W 72/0453; H04W 72/23; H04W 48/12;
(Continued)

(56) References Cited

U.S. PATENT DOCUMENTS

2014/0045514 A1* 2/2014 Lee .................. H04W 16/14
455/454
2014/0112273 A1 4/2014 Aboul-Magd et al.
(Continued)

FOREIGN PATENT DOCUMENTS

| CN | 104584576 A | 4/2015 |
|---|---|---|
| CN | 104704753 A | 6/2015 |

(Continued)

*Primary Examiner* — Hardikkumar D Patel
(74) *Attorney, Agent, or Firm* — Conley Rose, P.C.

(57) ABSTRACT

A bandwidth information indication method includes generating, by a first communications device, a first frame, where the first frame includes a channel bandwidth field, a first channel center frequency segment field, a second channel center frequency segment field, a third channel center frequency segment field, and a fourth channel center frequency segment field, where the channel bandwidth field indicates a basic service set (BSS) bandwidth, and the first channel center frequency segment field, the second channel center frequency segment field, the third channel center frequency segment field, and the fourth channel center frequency segment field indicate a location of an operating channel of a BSS, and sending, by the first communications device, the first frame.

20 Claims, 15 Drawing Sheets

| First communications device | ↔ | Second communications device |

(51) Int. Cl.
  *H04L 1/1607*   (2023.01)
  *H04W 72/0446*  (2023.01)
  *H04W 72/0453*  (2023.01)
  *H04W 72/23*    (2023.01)

(52) U.S. Cl.
  CPC ... *H04W 72/0446* (2013.01); *H04W 72/0453* (2013.01); *H04W 72/23* (2023.01)

(58) Field of Classification Search
  CPC .... H04W 84/12; H04W 28/20; H04L 1/0068; H04L 1/1614; H04L 5/0053; H04L 1/0025; H04L 5/0092
  See application file for complete search history.

(56) References Cited

U.S. PATENT DOCUMENTS

| | | | |
|---|---|---|---|
| 2016/0316473 A1* | 10/2016 | Wang | H04W 24/08 |
| 2017/0171796 A1 | 6/2017 | Wu et al. | |
| 2017/0181136 A1* | 6/2017 | Bharadwaj | H04L 41/08 |
| 2017/0188376 A1* | 6/2017 | Noh | H04W 52/42 |
| 2017/0366957 A1* | 12/2017 | Oren | H04W 8/005 |
| 2017/0373816 A1 | 12/2017 | Son et al. | |
| 2018/0124866 A1* | 5/2018 | Asterjadhi | H04W 88/08 |

FOREIGN PATENT DOCUMENTS

| | | |
|---|---|---|
| CN | 104918228 A | 9/2015 |
| CN | 106937382 A | 7/2017 |
| CN | 107251472 A | 10/2017 |
| CN | 107409324 A | 11/2017 |
| EP | 1814340 B1 | 12/2014 |

\* cited by examiner

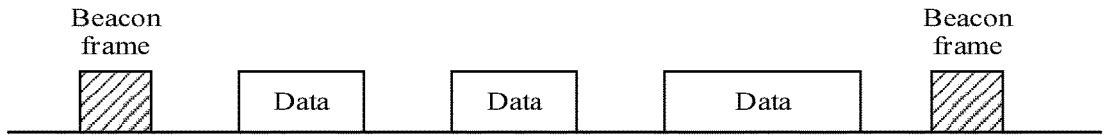

FIG. 12

| EHT channel bandwidth | Channel center frequency (channel center frequency segment) 3 | Channel center frequency (channel center frequency segment) 4 |
|---|---|---|

FIG. 13A

| EHT channel bandwidth | Channel center frequency (channel center frequency segment) 0 | Channel center frequency (channel center frequency segment) 1 | Channel center frequency (channel center frequency segment) 3 | Channel center frequency (channel center frequency segment) 4 |
|---|---|---|---|---|

FIG. 13B

| EHT channel bandwidth | Channel center frequency (channel center frequency segment) 3 | Channel center frequency (channel center frequency segment) 4 | Bitmap for preamble puncture |
|---|---|---|---|

FIG. 14A

| EHT channel bandwidth | Channel center frequency (channel center frequency segment) 0 | Channel center frequency (channel center frequency segment) 1 | Channel center frequency (channel center frequency segment) 3 | Channel center frequency (channel center frequency segment) 4 | Bitmap for preamble puncture |
|---|---|---|---|---|---|

FIG. 14B

| B0  B2 | B3 | B4  B13 | B14 | B15 | B16 | B17  B23 |
|---|---|---|---|---|---|---|
| Default packet extension duration (Default PE Duration) | Target wake time (TWT Required) | Transmission opportunity duration request to send threshold (TXOP Duration RTS Threshold) | VHT operation information present (Operation Information Present) | Co-located (Co-Located) BSS | Extended range single-user disable (ER SU Disable) | Bitmap for preamble puncture |

FIG. 15

| Element identifier (Element ID) | Length | Element identifier extension (Element ID Extension) | HE Operation Parameter | BSS color information (Color Information) | Basic high efficiency modulation and coding level and number of spatial streams setting (Basic HE-MCS And NSS Set) | VHT operation information | Maximum co-located basic service set identifier indicator (Max Co-Located BSSID Indicator) | Bitmap for preamble puncture |

| B0 | B2 | B3 | B4 | B13 | B14 | B15 | B16 | B17 | B18 B23 |
|---|---|---|---|---|---|---|---|---|---|
| Default packet extension duration (Default PE Duration) | Target wake time (TWT Required) | Transmission opportunity duration request to send threshold (TXOP Duration RTS Threshold) | VHT operation information present | Co-located (Co-Located) BSS | Extended range single-user disable (ER SU Disable) | Preamble punctured (Preamble punctured) BSS | Reserved |

FIG. 16A

| B0 | B1 | B2 | B3 B4 | B7 |
|---|---|---|---|---|
| Secondary channel offset | STA channel bandwidth (Channel Width) | RIFS mode (Mode) | Reserved |

| B8 B9 | B10 | B11 B12 | B13 B20 | B21 |
|---|---|---|---|---|
| HT protection | Non-green field (Nongreenfield) HT STA Present | Reserved | Overlapping basic service set terminal present (OBSS Non-HT STAs Present) | Channel center frequency (Channel Center Frequency Segment) 2 | Bitmap for preamble puncture |

| B27 B28 | B29 | B30 | B31 | B32 | B33 B39 |
|---|---|---|---|---|---|
| Reserved | Dual beacon frame (Dual Beacon) | Dual clear to send protection (Dual CTS Protection) | Space-time block coding beacon frame (STBC Beacon) | Reserved |

FIG. 17

BANDWIDTH INFORMATION INDICATION METHOD AND COMMUNICATIONS DEVICE

CROSS-REFERENCE TO RELATED APPLICATIONS

This application is a continuation of International Patent Application No. PCT/CN2019/097989 filed on Jul. 26, 2019, which claims priority to Chinese Patent Application No. 201810850345.4 filed on Jul. 28, 2018. The disclosures of the aforementioned applications are hereby incorporated by reference in their entireties.

TECHNICAL FIELD

This application relates to the field of communications technologies, and in particular, to a bandwidth information indication method and a communications device.

BACKGROUND

Currently, large-scale application and deployment of wireless communications systems can provide various types of communication, for example, voice, data, and multimedia services, for a plurality of users.

Institute of Electrical and Electronics Engineers (IEEE) 802.11 is one of current mainstream wireless access standards and currently has been widely used in commercial applications. In the IEEE 802.11a standard, only a bandwidth of 20 megahertz (MHz) is supported, and the bandwidth continuously increases in a subsequent standard evolution process. A maximum bandwidth of 40 MHz is supported in the 802.11n standard, and a maximum bandwidth of 160 MHz is supported in the 802.11ac/ax standard.

An access point (AP) device may establish a basic service set (BSS), and indicate a size and a location of an operating channel of the BSS to a station (STA). An indication manner used in the other approaches is applicable only to a bandwidth range of 160 MHz or lower. An Extremely High Throughput (EHT) is used as a next-generation WI-FI standard, and a maximum bandwidth of the next-generation WI-FI standard is extended to 320 MHz. In the other approaches, a BSS bandwidth indication when a maximum bandwidth exceeds 160 MHz is not supported.

SUMMARY

Embodiments of this application provide a bandwidth information indication method and a communications device, to implement a BSS bandwidth indication when a maximum bandwidth exceeds 160 MHz.

To resolve the foregoing problem, the embodiments of this application provide the following technical solutions.

According to a first aspect, an embodiment of this application provides a bandwidth information indication method, including generating, by a first communications device, a first frame, where the first frame includes a channel bandwidth field, a first channel center frequency segment field, a second channel center frequency segment field, a third channel center frequency segment field, and a fourth channel center frequency segment field, the channel bandwidth field is used to indicate a BSS bandwidth, and the first channel center frequency segment field, the second channel center frequency segment field, the third channel center frequency segment field, and the fourth channel center frequency segment field are used to indicate a location of an operating channel of a BSS, and sending, by the first communications device, the first frame.

In this embodiment of this application, the first communications device first generates the first frame, where the first frame may include the following fields: the channel bandwidth field, the first channel center frequency segment field, the second channel center frequency segment field, the third channel center frequency segment field, and the fourth channel center frequency segment field. The channel bandwidth field is used to indicate the BSS bandwidth, and the first channel center frequency segment field, the second channel center frequency segment field, the third channel center frequency segment field, and the fourth channel center frequency segment field are used to indicate the location of the operating channel of the BSS. The first communications device sends the first frame. For example, a second communications device receives the first frame. In this embodiment of this application, because the first frame generated by the first communications device includes four channel center frequency segment fields, and the four channel center frequency segment fields may indicate a BSS bandwidth greater than 160 MHz and the location of the operating channel of the BSS, a BSS bandwidth indication when a maximum bandwidth exceeds 160 MHz can be implemented.

According to a second aspect, an embodiment of this application provides a bandwidth information indication method, including receiving, by a second communications device, a first frame from a first communications device, parsing, by the second communications device, the first frame to obtain a channel bandwidth field, a first channel center frequency segment field, a second channel center frequency segment field, a third channel center frequency segment field, and a fourth channel center frequency segment field, and determining, by the second communications device, a BSS bandwidth and a location of an operating channel of a BSS based on the channel bandwidth field, the first channel center frequency segment field, the second channel center frequency segment field, the third channel center frequency segment field, and the fourth channel center frequency segment field.

In this embodiment of this application, the second communications device parses the first frame, where the first frame may include the following fields: the channel bandwidth field, the first channel center frequency segment field, the second channel center frequency segment field, the third channel center frequency segment field, and the fourth channel center frequency segment field, the channel bandwidth field is used to indicate the BSS bandwidth, and the first channel center frequency segment field, the second channel center frequency segment field, the third channel center frequency segment field, and the fourth channel center frequency segment field are used to indicate the location of the operating channel of the BSS. In this embodiment of this application, because the first frame generated by the first communications device includes four channel center frequency segment fields, and the four channel center frequency segment fields may indicate a BSS bandwidth greater than 160 MHz and the location of the operating channel of the BSS, the second communications device can determine, based on the received first frame, a BSS bandwidth indication of the first communications device when a maximum bandwidth exceeds 160 MHz.

In a possible implementation of the first aspect or the second aspect, the first channel center frequency segment field and the second channel center frequency segment field are in a first operation element field, the channel bandwidth field, the third channel center frequency segment field, and the fourth channel center frequency segment field are in a second operation element field, and the first operation element field and the second operation element field are in the first frame. The first frame may include two operation element fields: the first operation element field and the second operation element field. The first operation element field may be a very high throughput (VHT) operation information field. The first channel center frequency segment field and the second channel center frequency segment field are in the first operation element field, and the second operation element field may be an EHT operation information field. One channel bandwidth field and four channel center frequency segment fields may be carried in the first frame using two different operation element fields, to implement a BSS bandwidth indication when a maximum bandwidth exceeds 160 MHz.

In a possible implementation of the first aspect or the second aspect, the channel bandwidth field, the first channel center frequency segment field, the second channel center frequency segment field, the third channel center frequency segment field, and the fourth channel center frequency segment field are in a same operation element field, and the operation element field is in the first frame. The first frame may include one operation element field, and the operation element field may be an EHT operation information field. One channel bandwidth field and four channel center frequency segment fields may be carried in the first frame using a same operation element field, to implement a BSS bandwidth indication when a maximum bandwidth exceeds 160 MHz.

In a possible implementation of the first aspect or the second aspect, a length of the channel bandwidth field is one byte, and when a value of the channel bandwidth field is 0, the channel bandwidth field is used to indicate that the BSS bandwidth is 20 MHz, 40 MHz, 80 MHz, 160 MHz, or 80+80 MHz, and when a value of the channel bandwidth field is 1, the channel bandwidth field is used to indicate that the BSS bandwidth is 240 MHz, 160+80 MHz, 80+160 MHz, 80+80+80 MHz, 320 MHz, 160+160 MHz, 160+80+80 MHz, 80+80+160 MHz, or 80+80+80+80 MHz, or when a value of the channel bandwidth field is 0, the channel bandwidth field is used to indicate that the BSS bandwidth is 20 MHz, when a value of the channel bandwidth field is 1, the channel bandwidth field is used to indicate that the BSS bandwidth is 40 MHz, when a value of the channel bandwidth field is 2, the channel bandwidth field is used to indicate that the BSS bandwidth is 80 MHz, when a value of the channel bandwidth field is 3, the channel bandwidth field is used to indicate that the BSS bandwidth is 160 MHz or 80+80 MHz, when a value of the channel bandwidth field is 4, the channel bandwidth field is used to indicate that the BSS bandwidth is 240 MHz, 160+80 MHz, 80+160 MHz, or 80+80+80 MHz, or when a value of the channel bandwidth field is 5, the channel bandwidth field is used to indicate that the BSS bandwidth is 320 MHz, 160+160 MHz, 160+80+80 MHz, 80+80+160 MHz, or 80+80+80+80 MHz.

In the foregoing implementation, different values of the channel bandwidth field may be used to indicate the BSS bandwidth. A same value of the channel bandwidth field may not be limited to indicate a plurality of BSS bandwidths, and the location of the operating channel of the BSS may be further determined based on the first channel center frequency segment field, the second channel center frequency segment field, the third channel center frequency segment field, and the fourth channel center frequency segment field.

The first communications device may determine, based on the BSS established by the first communications device, the BSS bandwidth and the location of the operating channel that needs to be used.

In a possible implementation of the first aspect or the second aspect, the first frame further includes a bitmap for preamble puncture field, and each bit status in the bitmap for preamble puncture field is used to indicate whether a subchannel is available. In addition to including the following five fields: the channel bandwidth field and the four channel center frequency fields, the first frame may further carry the bitmap for preamble puncture field. When the first communications device supports preamble puncture, the first frame may further include one bitmap for preamble puncture field such that the second communications device determines, based on a value of each bitmap for preamble puncture field, whether all subchannels are available.

In a possible implementation of the first aspect or the second aspect, the bitmap for preamble puncture field, the channel bandwidth field, the third channel center frequency segment field, and the fourth channel center frequency segment field are in a same operation element field, and first channel center frequency segment field the bitmap for preamble puncture field is in an operation element field different from an operation element field that the first channel center frequency segment field and the second channel center frequency segment field are in, or the bitmap for preamble puncture field, the channel bandwidth field, the first channel center frequency segment field, the second channel center frequency segment field, the third channel center frequency segment field, and the fourth channel center frequency segment field are in a same operation element field.

In the foregoing implementation, the first frame may include two operation element fields: the first operation element field and the second operation element field. The first operation element field may be a VHT operation information field. The first channel center frequency segment field and the second channel center frequency segment field are in the first operation element field. The channel bandwidth field, the third channel center frequency segment field, the fourth channel center frequency segment field, and the bitmap for preamble puncture field are in the second operation element field, and the second operation element field may be an EHT operation information field. One channel bandwidth field and four channel center frequency segment fields may be carried in the first frame using two different operation element fields, to implement a BSS bandwidth indication when a maximum bandwidth exceeds 160 MHz. In addition, whether each subchannel is available can be indicated using the bitmap for preamble puncture field. In another implementation, the first frame may include one operation element field, and the operation element field may be an EHT operation information field. One channel bandwidth field and four channel center frequency segment fields may be carried in the first frame using a same operation element field, to implement a BSS bandwidth indication when a maximum bandwidth exceeds 160 MHz. In addition, whether each subchannel is available may be indicated using the bitmap for preamble puncture field.

In a possible implementation of the first aspect, a value of the first channel center frequency segment field, a value of the second channel center frequency segment field, a value of the third channel center frequency segment field, and a value of the fourth channel center frequency segment field are obtained based on a value of a current channel center frequency indicator 0, a value of a current channel center frequency indicator 1, a value of a current channel center frequency indicator 2, and a value of a current channel center frequency indicator 3. The first communications device first determines a value of a channel bandwidth field, determines a quantity of frequency segments, and determines the values of the four indicators based on the quantity of frequency segments and a center frequency indicator used by each frequency segment. Therefore, the first communications device may determine values of the four channel center frequency segment fields using the indicator.

In a possible implementation of the first aspect, when the location of the operating channel of the BSS is at least one of the following frequency locations: 20 MHz, 40 MHz, and 80 MHz, the value of the first channel center frequency segment field is the value of the current channel center frequency indicator 0, and the value of the second channel center frequency segment field, the value of the third channel center frequency segment field, and the value of the fourth channel center frequency segment field are all 0, or when the location of the operating channel of the BSS is the following frequency location: 160 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, the value of the second channel center frequency segment field is the value of the current channel center frequency indicator 0, and the value of the third channel center frequency segment field and the value of the fourth channel center frequency segment field are both 0, or when the location of the operating channel of the BSS is the following frequency location: 80+80 MHz, the value of the first channel center frequency segment field is the value of the current channel center frequency indicator 0, the value of the second channel center frequency segment field is the value of the current channel center frequency indicator 1, and the value of the third channel center frequency segment field and the value of the fourth channel center frequency segment field are both 0, or when the location of the operating channel of the BSS is the following frequency location: 320 MHz, if a value of a current primary channel is greater than the value of the current channel center frequency indicator 0 and less than the value of the current channel center frequency indicator 0 plus 16, the value of the first channel center frequency segment field is the value of the current channel center frequency indicator 0 plus 8, or if a value of a current primary channel is greater than the value of the current channel center frequency indicator 0 plus 16, the value of the first channel center frequency segment field is the value of the current channel center frequency indicator 0 plus 24, or if a value of a current primary channel is less than the value of the current channel center frequency indicator 0 and greater than the value of the current channel center frequency indicator 0 minus 16, the value of the first channel center frequency segment field is the value of the current channel center frequency indicator 0 minus 8, or if a value of a current primary channel is less than the value of the current channel center frequency indicator 0 minus 16, the value of the first channel center frequency segment field is the value of the current channel center frequency indicator 0 minus 24, if a value of a current primary channel is greater than the value of the current channel center frequency indicator 0, the value of the second channel center frequency segment field is the value of the current channel center frequency indicator 0 plus 16, or if a value of a current primary channel is less than or equal to the value of the current channel center frequency indicator 0, the value of the second channel center frequency segment field is the value of the current channel center frequency indicator 0 minus 16, and the value of the third channel center frequency segment field is the value of the current channel center frequency indicator 0, and the value of the fourth channel center frequency segment field is 0, or when the location of the operating channel of the BSS is the following frequency location: 160+160 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, the value of the second channel center frequency segment field is the value of the current channel center frequency indicator 0, and the value of the third channel center frequency segment field is the value of the current channel center frequency indicator 1 minus 8 or plus 8, and the value of the fourth channel center frequency segment field is the value of the current channel center frequency indicator 1, or the value of the third channel center frequency segment field is the value of the current channel center frequency indicator 1, and the value of the fourth channel center frequency segment field is the value of the current channel center frequency indicator 1 minus 8 or plus 8, or the value of the third channel center frequency segment field is the value of the current channel center frequency indicator 1, and the value of the fourth channel center frequency segment field is 0, or the value of the third channel center frequency segment field is 0, and the value of the fourth channel center frequency segment field is the value of the current channel center frequency indicator 1, or when the location of the operating channel of the BSS is the following frequency location: 160+80+80 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, and the value of the fourth channel center frequency segment field is the value of the current channel center frequency indicator 2, or when the location of the operating channel of the BSS is the following frequency location: 80+80+160 MHz, the value of the first channel center frequency segment field is the value of the current channel center frequency indicator 0, the value of the second channel center frequency segment field is the value of the current channel center frequency indicator 1, and the value of the third channel center frequency segment field is the value of the current channel center frequency indicator 2 minus 8 or plus 8, and the value of the fourth channel center frequency segment field is the value of the current channel center frequency indicator 2, or the value of the third channel center frequency segment field is the value of the current channel center frequency indicator 2, and the value of the fourth channel center frequency segment field is the value of the current channel center frequency indicator 2 minus 8 or plus 8, or the value of the third channel center frequency segment field is the value of the current channel center frequency indicator 2, and the value of the fourth channel center frequency segment field is 0, or the value of the third channel center frequency segment field is 0, and the value of the fourth channel center frequency segment field is the value of the current channel center frequency indicator 2, or when the location of the operating channel of the BSS is the following frequency location: 80+80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is the value of the current channel center frequency indicator 3, or when the location of the operating channel of the BSS is the following frequency location: 240 MHz, if a value of a current primary channel is greater than the value of the current channel center frequency indicator 0 and less than the value of the current channel center frequency indicator 0 plus 8, the value of the first channel center frequency segment field is the value of the current channel center frequency indicator 0 plus 16, or if a value of a current primary channel is greater than the value of the current channel center frequency indicator 0 minus 8 and less than the value of the current channel center frequency indicator 0 plus 8, the value of the first channel center frequency segment field is the value of the current channel center frequency indicator 0, or if a value of a current primary channel is less than the value of the current channel center frequency indicator 0 minus 8, the value of the first channel center frequency segment field is the value of the current channel center frequency indicator 0 minus 16, if a value of a current primary channel is greater than the value of the current channel center frequency indicator 0 and less than the value of the current channel center frequency indicator 0 plus 8, the value of the second channel center frequency segment field is the value of the current channel center frequency indicator 0 plus 8, if a value of a current primary channel is less than the value of the current channel center frequency indicator 0 minus 8, the value of the second channel center frequency segment field is the value of the current channel center frequency indicator 0 minus 8, or if a value of a current primary channel is greater than the value of the current channel center frequency indicator 0 minus 8 and less than the value of the current channel center frequency indicator 0 plus 8, the value of the second channel center frequency segment field is the value of the current channel center frequency indicator 0 minus 8 or plus 8, the value of the third channel center frequency segment field is the value of the current channel center frequency indicator 0, and the value of the fourth channel center frequency segment field is 0, or when the location of the operating channel of the BSS is the following frequency location: 160+80 MHz, if a value of a current primary channel is greater than the value of the current channel center frequency indicator 0 and less than the value of the current channel center frequency indicator 0, the value of the first channel center frequency segment field is the value of the current channel center frequency indicator 0 plus 8, the value of the second channel center frequency segment field is the value of the current channel center frequency indicator 0, the value of the third channel center frequency segment field is the value of the current channel center frequency indicator 1, and the value of the fourth channel center frequency segment field is 0, or when the location of the operating channel of the BSS is the following frequency location: 80+160 MHz, the value of the first channel center frequency segment field is the value of the current channel center frequency indicator 0, the value of the second channel center frequency segment field is 0, and the value of the third channel center frequency segment field is the value of the current channel center frequency indicator 1 minus 8 or plus 8, and the value of the fourth channel center frequency segment field is the value of the current channel center frequency indicator 1, or the value of the third channel center frequency segment field is the value of the current channel center frequency indicator 1, and the value of the fourth channel center frequency segment field is the value of the current channel center frequency indicator 1 minus 8 or plus 8, or the value of the third channel center frequency segment field is the value of the current channel center frequency indicator 1, and the value of the fourth channel center frequency segment field is 0, or the value of the third channel center frequency segment field is 0, and the value of the fourth channel center frequency segment field is the value of the current channel center frequency indicator 1, or when the location of the operating channel of the BSS is the following frequency location: 80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is 0.

In the foregoing implementation, after the first communications device determines the location of the operating channel of the BSS, the first communications device may respectively determine the value of the first channel center frequency segment field, the value of the second channel center frequency segment field, the value of the third channel center frequency segment field, and the value of the fourth channel center frequency segment field based on the value of the current channel center frequency indicator 0, the value of the current channel center frequency indicator 1, the value of the current channel center frequency indicator 2, and the value of the current channel center frequency indicator 3, and then includes the value of the first channel center frequency segment field, the value of the second channel center frequency segment field, the value of the third channel center frequency segment field, and the value of the fourth channel center frequency segment field in the first frame. The values of the four channel center frequency segment fields in the first frame may be indicated using the four current channel center frequency indicators.

In a possible implementation of the first aspect, when the location of the operating channel of the BSS is at least one of the following frequency locations: 20 MHz, 40 MHz, 80 MHz, 160 MHz, 240 MHz, and 320 MHz, the current channel center frequency indicator 0 is used to indicate a channel center frequency, or when the location of the operating channel of the BSS is at least one of the following frequency locations: 80+80 MHz, 160+160 MHz, 160+80+80 MHz, 80+80+160 MHz, 80+80+80+80 MHz, 160+80 MHz, 80+160 MHz, and 80+80+80 MHz, the current channel center frequency indicator 0 is used to indicate a center frequency of a frequency segment that includes a primary channel, and + indicates that a total bandwidth includes two or more different frequency segments, or when the location of the operating channel of the BSS is at least one of the following frequency locations: 20 MHz, 40 MHz, 80 MHz, 160 MHz, 240 MHz, and 320 MHz, the value of the current channel center frequency indicator 1 is 0, or when the location of the operating channel of the BSS is at least one of the following frequency locations: 80+80 MHz, 160+160 MHz, 160+80 MHz, and 80+160 MHz, the current channel center frequency indicator 1 is used to indicate a center frequency of a frequency segment that does not include a primary channel, or when the location of the operating channel of the BSS is the following frequency location: 160+80+80 MHz, the current channel center frequency indicator 1 is used to indicate a center frequency of one of two 80 MHz frequency segments, or when the location of the operating channel of the BSS is the following frequency location: 80+80+160 MHz, the current channel center frequency indicator 1 is used to indicate a center frequency of an 80 MHz frequency segment that does not include a primary channel, or when the location of the operating channel of the BSS is at least one of the following frequency locations: 80+80+80+80 MHz and 80+80+80 MHz, the current channel center frequency indicator 1 is used to indicate a center frequency of a frequency segment of a secondary 80 MHz channel, or when the location of the operating channel of the BSS is at least one of the following frequency locations: 20 MHz, 40 MHz, 80 MHz, 160 MHz, 80+80 MHz, 320 MHz, 160+160 MHz, 240 MHz, 160+80 MHz, and 80+160 MHz, the value of the current channel center frequency indicator 2 is 0, or when the location of the operating channel of the BSS is the following frequency location: 160+80+80 MHz, the current channel center frequency indicator 2 is used to indicate a center frequency of a frequency segment that is in two 80 MHz frequency segments and that is other than a frequency segment indicated by the current channel center frequency indicator 1, or when the location of the operating channel of the BSS is the following frequency location: 80+80+160 MHz, the current channel center frequency indicator 2 is used to indicate a center frequency of a 160 MHz frequency segment, or when the location of the operating channel of the BSS is the following frequency location: 80+80+80+80 MHz, the current channel center frequency indicator 2 is used to indicate a center frequency of a frequency segment other than frequency segments that are indicated by the current channel center frequency indicator 0 and the current channel center frequency indicator 1, or when the location of the operating channel of the BSS is the following frequency location: 80+80+80 MHz, the current channel center frequency indicator 2 is used to indicate a center frequency of a frequency segment other than frequency segments that are indicated by the current channel center frequency indicator 0 and the current channel center frequency indicator 1, or when the location of the operating channel of the BSS is at least one of the following frequency locations: 20 MHz, 40 MHz, 80 MHz, 160 MHz, 80+80 MHz, 320 MHz, 160+160 MHz, 160+80+80 MHz, 80+80+160 MHz, 240 MHz, 160+80 MHz, 80+160 MHz, and 80+80+80 MHz, the value of the current channel center frequency indicator 3 is 0, or when the location of the operating channel of the BSS is the following frequency location: 80+80+80+80 MHz, the current channel center frequency indicator 3 is used to indicate a center frequency of a frequency segment other than frequency segments that are indicated by the current channel center frequency indicator 0, the current channel center frequency indicator 1, and the current channel center frequency indicator 2.

In the foregoing implementation, after the first communications device determines the location of the operating channel of the BSS, the first communications device may separately determine the value of the current channel center frequency indicator 0, the value of the current channel center frequency indicator 1, the value of the current channel center frequency indicator 2, and the value of the current channel center frequency indicator 3 based on a quantity of frequency segments of the operating bandwidth of the BSS and a center frequency of each frequency segment. The center frequencies of the frequency segments and the current channel center frequency indicators may be determined using a preset mapping relationship.

In a possible implementation of the first aspect or the second aspect, a value of the first channel center frequency segment field, a value of the second channel center frequency segment field, a value of the third channel center frequency segment field, a value of the fourth channel center frequency segment field are obtained using a center frequency corresponding to a preset frequency segment. Further, the first communications device first determines the center frequency corresponding to the preset frequency segment, and then indicates the value of the first channel center frequency segment field, the value of the second channel center frequency segment field, the value of the third channel center frequency segment field, and the value of the fourth channel center frequency segment field using the center frequency corresponding to the preset frequency segment. The values of the four channel center frequency segment fields in the first frame may be indicated using the center frequency corresponding to the preset frequency segment.

In a possible implementation of the first aspect or the second aspect, the preset frequency segment includes a first frequency segment and a second frequency segment, the first frequency segment is a frequency segment smaller than a frequency segment granularity, and the second frequency segment is a frequency segment obtained after a frequency segment larger than the frequency segment granularity is divided at the frequency segment granularity. The first communications device may first determine a frequency segment size of the BSS. If a frequency segment is less than the frequency segment granularity, a center frequency of the frequency segment is a center frequency corresponding to the preset frequency segment. If a frequency segment is greater than the frequency segment granularity, the original frequency segment is divided at the frequency segment granularity, to obtain at least two frequency segments obtained after the division, and a center frequency of each frequency segment obtained after the division is the center frequency corresponding to the preset frequency segment.

In a possible implementation of the first aspect or the second aspect, when the location of the operating channel of the BSS is at least one of the following frequency locations: 20 MHz, 40 MHz, and 80 MHz, the value of the first channel center frequency segment field is a center frequency used by a frequency segment obtained after division, and the value of the second channel center frequency segment field, the value of the third channel center frequency segment field, and the value of the fourth channel center frequency segment field are all 0, or when the location of the operating channel of the BSS is at least one of the following frequency locations: 160 MHz and 80+80 MHz, the value of the first channel center frequency segment field is a primary 80 MHz center frequency, the value of the second channel center frequency segment field is a secondary 80 MHz center frequency, and the value of the third channel center frequency segment field and the value of the fourth channel center frequency segment field are both 0, or when the location of the operating channel of the BSS is at least one of the following frequency locations: 240 MHz, 160+80 MHz, 80+160 MHz, and 80+80+80 MHz, the value of the first channel center frequency segment field is a primary 80 MHz center frequency, the value of the second channel center frequency segment field is a first secondary 80 MHz center frequency, the value of the third channel center frequency segment field is a second secondary 80 MHz center frequency, and the value of the fourth channel center frequency segment field is 0, or when the location of the operating channel of the BSS is at least one of the following frequency locations: 320 MHz, 160+160 MHz, 160+80+80 MHz, 80+80+160 MHz, and 80+80+80+80 MHz, the value of the first channel center frequency segment field is a primary 80 MHz center frequency, the value of the second channel center frequency segment field is a first secondary 80 MHz center frequency, the value of the third channel center frequency segment field is a second secondary 80 MHz center frequency, and the value of the fourth channel center frequency segment field is a third secondary 80 MHz center frequency.

In the foregoing implementation, a value of each channel center frequency segment field may be determined based on a value of each 80 MHz center frequency such that the first frame can carry the values of the four channel center frequency segment fields.

In a possible implementation of the first aspect or the second aspect, the value of the first channel center frequency segment field, the value of the second channel center frequency segment field, the value of the third channel center frequency segment field, and the value of the fourth channel center frequency segment field are obtained using a center frequency corresponding to a frequency segment obtained after frequency values are sorted in ascending or descending order. The first communications device sorts, in ascending or descending order, center frequencies corresponding to all preset frequency segments, and then the first communications device separately determines the value of the first channel center frequency segment field, the value of the second channel center frequency segment field, the value of the third channel center frequency segment field, and the value of the fourth channel center frequency segment field based on the center frequencies sorted in ascending or descending order. For example, four center frequencies sorted in ascending order may be respectively used as values of CCFS0, CCFS1, CCFS3, and CCFS4.

In a possible implementation of the second aspect, when the value of the second channel center frequency segment field is equal to 0, the value of the third channel center frequency segment field is equal to 0, and the value of the fourth channel center frequency segment field is equal to 0, the BSS bandwidth is 20 MHz, 40 MHz, or 80 MHz, or when the value of the second channel center frequency segment field is greater than 0, |the value of the second channel center frequency segment field–the value of the first channel center frequency segment field| is equal to 8, the value of the third channel center frequency segment field is equal to 0, and the value of the fourth channel center frequency segment field is equal to 0, the BSS bandwidth is 160 MHz, or when the value of the second channel center frequency segment field is greater than 0, |the value of the second channel center frequency segment field–the value of the first channel center frequency segment field| is greater than 16, the value of the third channel center frequency segment field is equal to 0, and the value of the fourth channel center frequency segment field is equal to 0, the BSS bandwidth is 80+80 MHz, or when the value of the second channel center frequency segment field is greater than 0, the value of the third channel center frequency segment field is greater than 0, |the value of the second channel center frequency segment field–the value of the first channel center frequency segment field| is equal to 8, |the value of the third channel center frequency segment field–the value of the second channel center frequency segment field| is equal to 16, and the value of the fourth channel center frequency segment field is equal to 0, the BSS bandwidth is 320 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is equal to 8, |the value of the fourth channel center frequency segment field–the value of the third channel center frequency segment field| is equal to 8, and |the value of the fourth channel center frequency segment field–the value of the second channel center frequency segment field| is greater than 32, the BSS bandwidth is 160+160 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is equal to 8, |the value of the third channel center frequency segment field–the value of the second channel center frequency segment field| is greater than 24, |the value of the fourth channel center frequency segment field–the value of the second channel center frequency segment field| is greater than 24, and |the value of the fourth channel center frequency segment field–the value of the third channel center frequency segment field| is greater than 16, the BSS bandwidth is 160+80+80 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is greater than 16, |the value of the fourth channel center frequency segment field–the value of the first channel center frequency segment field| is greater than 24, |the value of the fourth channel center frequency segment field–the value of the second channel center frequency segment field| is greater than 24, and |the value of the fourth channel center frequency segment field–the value of the third channel center frequency segment field| is equal to 8, the BSS bandwidth is 80+80+160 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is greater than 16, |the value of the fourth channel center frequency segment field–the value of the first channel center frequency segment field| is greater than 16, |the value of the fourth channel center frequency segment field–the value of the second channel center frequency segment field| is greater than 16, and |the value of the fourth channel center frequency segment field–the value of the third channel center frequency segment field| is greater than 16, the BSS bandwidth is 80+80+80+80 MHz, or when the value of the second channel center frequency segment field is greater than 0, the value of the third channel center frequency segment field is greater than 0, |the value of the second channel center frequency segment field–the value of the first channel center frequency segment field| is equal to 8, |the value of the third channel center frequency segment field–the value of the second channel center frequency segment field| is equal to 8, and the value of the fourth channel center frequency segment field is equal to 0, the BSS bandwidth is 240 MHz, or when the value of the second channel center frequency segment field is greater than 0, the value of the third channel center frequency segment field is greater than 0, |the value of the second channel center frequency segment field–the value of the first channel center frequency segment field| is equal to 8, |the value of the third channel center frequency segment field–the value of the second channel center frequency segment field| is greater than 24, and the value of the fourth channel center frequency segment field is equal to 0, the BSS bandwidth is 160+80 MHz, or when the value of the third channel center frequency segment field is greater than 0, the value of the fourth channel center frequency segment field is greater than 0, |the value of the fourth channel center frequency segment field–the value of the third channel center frequency segment field| is equal to 8, |the value of the fourth channel center frequency segment field–the value of the first channel center frequency segment field| is greater than 24, and the value of the second channel center frequency segment field is equal to 0, the BSS bandwidth is 80+160 MHz, or when the value of the second channel center frequency segment field is greater than 0, the value of the third channel center frequency segment field is greater than 0, |the value of the second channel center frequency segment field–the value of the first channel center frequency segment field| is greater than 16, |the value of the third channel center frequency segment field–the value of the first channel center frequency segment field| is greater than 16, |the value of the third channel center frequency segment field–the value of the second channel center frequency segment field| is greater than 16, and the value of the fourth channel center frequency segment field is equal to 0, the BSS bandwidth is 80+80+80 MHz, where || is an absolute value sign, and – is a minus sign.

In the foregoing implementation, after the second communications device determines the values of the channel bandwidth field, the first channel center frequency segment field, the second channel center frequency segment field, the third channel center frequency segment field, and the fourth channel center frequency segment field, the second communications device may determine a size and the location of the operating channel of the BSS using the foregoing calculation formula, to determine a specific BSS bandwidth indication of the first communications device when a maximum bandwidth exceeds 160 MHz.

In a possible implementation of the second aspect, when the value of the second channel center frequency segment field is equal to 0, the value of the third channel center frequency segment field is equal to 0, and the value of the fourth channel center frequency segment field is equal to 0, the BSS bandwidth is 20 MHz, 40 MHz, or 80 MHz, or when the value of the second channel center frequency segment field is greater than 0, |the value of the second channel center frequency segment field–the value of the first channel center frequency segment field| is equal to 16, the value of the third channel center frequency segment field is equal to 0, and the value of the fourth channel center frequency segment field is equal to 0, the BSS bandwidth is 160 MHz, or when the value of the second channel center frequency segment field is greater than 0, |the value of the second channel center frequency segment field–the value of the first channel center frequency segment field| is greater than 16, the value of the third channel center frequency segment field is equal to 0, and the value of the fourth channel center frequency segment field is equal to 0, the BSS bandwidth is 80+80 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is equal to 16, |the value of the fourth channel center frequency segment field–the value of the third channel center frequency segment field| is equal to 16, and |the value of the third channel center frequency segment field+the value of the fourth channel center frequency segment field–the value of the first channel center frequency segment field–the value of the second channel center frequency segment field| is equal to 64, the BSS bandwidth is 320 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is equal to 16, |the value of the fourth channel center frequency segment field–the value of the third channel center frequency segment field| is equal to 16, and |the value of the third channel center frequency segment field+the value of the fourth channel center frequency segment field–the value of the first channel center frequency segment field–the value of the second channel center frequency segment field| is greater than 64, the BSS bandwidth is 160+160 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is equal to 16, and |the value of the fourth channel center frequency segment field–the value of the third channel center frequency segment field| is greater than 16, the BSS bandwidth is 160+80+80 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is greater than 16, and |the value of the fourth channel center frequency segment field–the value of the third channel center frequency segment field| is equal to 16, the BSS bandwidth is 80+80+160 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is greater than 16, |the value of the fourth channel center frequency segment field−the value of the third channel center frequency segment field| is greater than 16, and |the value of the third channel center frequency segment field+the value of the fourth channel center frequency segment field−the value of the first channel center frequency segment field−the value of the second channel center frequency segment field| is greater than 64, the BSS bandwidth is 80+80+80+80 MHz, or when the value of the second channel center frequency segment field is greater than 0, the value of the third channel center frequency segment field is greater than 0, |the value of the second channel center frequency segment field−the value of the first channel center frequency segment field| is equal to 16, |2*the value of the third channel center frequency segment field−the value of the second channel center frequency segment field−the value of the first channel center frequency segment field| is equal to 48, and the value of the fourth channel center frequency segment field is equal to 0, the BSS bandwidth is 240 MHz, or when the value of the second channel center frequency segment field is greater than 0, the value of the third channel center frequency segment field is greater than 0, |the value of the second channel center frequency segment field−the value of the first channel center frequency segment field| is equal to 16, |2*the value of the third channel center frequency segment field−the value of the second channel center frequency segment field−the value of the first channel center frequency segment field| is greater than 48, and the value of the fourth channel center frequency segment field is equal to 0, the BSS bandwidth is 160+80 MHz, or when the value of the second channel center frequency segment field is greater than 0, the value of the third channel center frequency segment field is greater than 0, |the value of the third channel center frequency segment field−the value of the second channel center frequency segment field| is equal to 16, |2*the value of the first channel center frequency segment field−the value of the second channel center frequency segment field−the value of the third channel center frequency segment field| is greater than 48, and the value of the fourth channel center frequency segment field is equal to 0, the BSS bandwidth is 80+160 MHz, or when the value of the second channel center frequency segment field is greater than 0, the value of the third channel center frequency segment field is greater than 0, |the value of the second channel center frequency segment field−the value of the first channel center frequency segment field| is greater than 16, |the value of the third channel center frequency segment field−the value of the second channel center frequency segment field| is greater than 16, and the value of the fourth channel center frequency segment field is equal to 0, the BSS bandwidth is 80+80+80 MHz, where || is an absolute value sign, − is a minus sign, + is a plus sign, and * is a multiplication sign.

In the foregoing implementation, after the second communications device determines the values of the channel bandwidth field, the first channel center frequency segment field, the second channel center frequency segment field, the third channel center frequency segment field, and the fourth channel center frequency segment field, the second communications device may determine a size and the location of the operating channel of the BSS using the foregoing calculation formula, to determine a specific BSS bandwidth indication of the first communications device when a maximum bandwidth exceeds 160 MHz.

In a possible implementation of the first aspect or the second aspect, the first frame further includes a fifth channel center frequency segment field and a sixth channel center frequency segment field, and the first channel center frequency segment field, the second channel center frequency segment field, the third channel center frequency segment field, the fourth channel center frequency segment field, the fifth channel center frequency segment field, and the sixth channel center frequency segment field are used to indicate the location of the operating channel of the BSS.

In a possible implementation of the first aspect or the second aspect, the first channel center frequency segment field and the second channel center frequency segment field are in a first operation element field, the channel bandwidth field, the third channel center frequency segment field, the fourth channel center frequency segment field, the fifth channel center frequency segment field, and the sixth channel center frequency segment field are in a second operation element field, and the first operation element field and the second operation element field are located at different locations in the first frame.

In a possible implementation of the first aspect or the second aspect, the channel bandwidth field, the first channel center frequency segment field, the second channel center frequency segment field, the third channel center frequency segment field, the fourth channel center frequency segment field, the fifth channel center frequency segment field, and the sixth channel center frequency segment field are in a same operation element field, and the operation element field is in the first frame.

In a possible implementation of the first aspect, a value of the first channel center frequency segment field, a value of the second channel center frequency segment field, a value of the third channel center frequency segment field, a value of the fourth channel center frequency segment field, a value of the fifth channel center frequency segment field, and a value of the sixth channel center frequency segment field are obtained using a value of a current channel center frequency indicator 0, a value of a current channel center frequency indicator 1, a value of a current channel center frequency indicator 2, a value of a current channel center frequency indicator 3, a value of a current channel center frequency indicator 4, and a value of a current channel center frequency indicator 5.

In a possible implementation of the first aspect, when the location of the operating channel of the BSS is the following frequency location: 160+80+40+40 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, the value of the fourth channel center frequency segment field is 0, the value of the fifth channel center frequency segment field is the value of the current channel center frequency indicator 2, and the value of the sixth channel center frequency segment field is the value of the current channel center frequency indicator 3, or when the location of the operating channel of the BSS is the following frequency location: 160+40+40+80 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, the value of the fourth channel center frequency segment field is the value of the current channel center frequency indicator 2, the value of the fifth channel center frequency segment field is the value of the current channel center frequency indicator 3, and the value of the sixth channel center frequency segment field is 0, or when the location of the operating channel of the BSS is the following frequency location: 160+40+40+40+40 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, the value of the fourth channel center frequency segment field is the value of the current channel center frequency indicator 2, the value of the fifth channel center frequency segment field is the value of the current channel center frequency indicator 3, and the value of the sixth channel center frequency segment field is the value of the current channel center frequency indicator 4, or when the location of the operating channel of the BSS is the following frequency location: 80+80+80+40+40 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, the value of the fourth channel center frequency segment field is 0, the value of the fifth channel center frequency segment field is the value of the current channel center frequency indicator 3, and the value of the sixth channel center frequency segment field is the value of the current channel center frequency indicator 4, or when the location of the operating channel of the BSS is the following frequency location: 80+80+40+40+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, the value of the fourth channel center frequency segment field is the value of the current channel center frequency indicator 3, the value of the fifth channel center frequency segment field is the value of the current channel center frequency indicator 4, and the value of the sixth channel center frequency segment field is 0, or when the location of the operating channel of the BSS is the following frequency location: 80+80+40+40+40+40 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, the value of the fourth channel center frequency segment field is the value of the current channel center frequency indicator 3, the value of the fifth channel center frequency segment field is the value of the current channel center frequency indicator 4, and the value of the sixth channel center frequency segment field is the value of the current channel center frequency indicator 5, or when the location of the operating channel of the BSS is the following frequency location: 160+40+40 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, the value of the fourth channel center frequency segment field is the value of the current channel center frequency indicator 2, the value of the fifth channel center frequency segment field is 0, and the value of the sixth channel center frequency segment field is 0, or when the location of the operating channel of the BSS is the following frequency location: 80+80+40+40 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, the value of the fourth channel center frequency segment field is the value of the current channel center frequency indicator 3, the value of the fifth channel center frequency segment field is 0, and the value of the sixth channel center frequency segment field is 0.

In a possible implementation of the first aspect, when the location of the operating channel of the BSS is at least one of the following frequency locations: 20 MHz, 40 MHz, 80 MHz, 160 MHz, 240 MHz, and 320 MHz, the current channel center frequency indicator 0 is used to indicate a channel center frequency, or when the location of the operating channel of the BSS is at least one of the following frequency locations: 80+80 MHz, 160+160 MHz, 160+80+80 MHz, 80+80+160 MHz, 80+80+80+80 MHz, 160+80+40+40 MHz, 160+40+40+80 MHz, 160+40+40+40+40 MHz, 80+80+80+40+40 MHz, 80+80+40+40+80 MHz, 80+80+40+40+40+40 MHz, 160+80 MHz, 80+160 MHz, 80+80+80 MHz, 160+40+40 MHz, and 80+80+40+40 MHz, the current channel center frequency indicator 0 is used to indicate a center frequency of a frequency segment that includes a primary channel, and + indicates that a total bandwidth includes two or more different frequency segments, or when the location of the operating channel of the BSS is at least one of the following frequency locations: 20 MHz, 40 MHz, 80 MHz, 160 MHz, 240 MHz, and 320 MHz, the value of the current channel center frequency indicator 1 is 0, or when the location of the operating channel of the BSS is at least one of the following frequency locations:

80+80 MHz, 160+160 MHz, 160+80 MHz, and 80+160 MHz, the current channel center frequency indicator 1 is used to indicate a center frequency of a frequency segment that does not include a primary channel, or when the location of the operating channel of the BSS is the following frequency location: 160+80+80 MHz, the current channel center frequency indicator 1 is used to indicate a center frequency of one of two 80 MHz frequency segments, or when the location of the operating channel of the BSS is the following frequency location: 80+80+160 MHz, the current channel center frequency indicator 1 is used to indicate a center frequency of an 80 MHz frequency segment that does not include a primary channel, or when the location of the operating channel of the BSS is at least one of the following frequency locations: 80+80+80+80 MHz, 80+80+80 MHz, 80+80+80+40+40 MHz, 80+80+40+40+80 MHz, 80+80+40+40+40+40 MHz, and 80+80+40+40 MHz, the current channel center frequency indicator 1 is used to indicate a center frequency of a frequency segment of a secondary 80 MHz channel, or when the location of the operating channel of the BSS is the following frequency location: 160+80+40+40 MHz, the current channel center frequency indicator 1 is used to indicate a center frequency of a frequency segment of an 80 MHz channel, or when the location of the operating channel of the BSS is at least one of the following frequency locations: 160+40+40+80 MHz and 160+40+40 MHz, the current channel center frequency indicator 1 is used to indicate a center frequency of one of two 40 MHz frequency segments, or when the location of the operating channel of the BSS is the following frequency location: 160+40+40+40+40 MHz, the current channel center frequency indicator 1 is used to indicate a center frequency of one of four 40 MHz frequency segments, or when the location of the operating channel of the BSS is at least one of the following frequency locations: 20 MHz, 40 MHz, 80 MHz, 160 MHz, 80+80 MHz, 320 MHz, 160+160 MHz, 240 MHz, 160+80 MHz, and 80+160 MHz, the value of the current channel center frequency indicator 2 is 0, or when the location of the operating channel of the BSS is the following frequency location: 160+80+80 MHz, the current channel center frequency indicator 2 is used to indicate a center frequency of a frequency segment that is in two 80 MHz frequency segments and that is other than a frequency segment indicated by the current channel center frequency indicator 1, or when the location of the operating channel of the BSS is the following frequency location: 80+80+160 MHz, the current channel center frequency indicator 2 is used to indicate a center frequency of a 160 MHz frequency segment, or when the location of the operating channel of the BSS is the following frequency location: 80+80+80+80 MHz, the current channel center frequency indicator 2 is used to indicate a center frequency of a frequency segment other than frequency segments indicated by the current channel center frequency indicator 0 and the current channel center frequency indicator 1, or when the location of the operating channel of the BSS is the following frequency location: 160+80+40+40 MHz, the current channel center frequency indicator 2 is used to indicate a center frequency of one of two 40 MHz frequency segments, or when the location of the operating channel of the BSS is the following frequency location: 160+40+40+80 MHz, the current channel center frequency indicator 2 is used to indicate a center frequency of a frequency segment other than a frequency segment indicated by the current channel center frequency indicator 1, or when the location of the operating channel of the BSS is used to indicate a center frequency of a frequency segment other than a frequency segment indicated by the current channel center frequency indicator 1, or when the location of the operating channel of the BSS is the following frequency location: 80+80+80+40+40 MHz, the current channel center frequency indicator 2 is used to indicate a center frequency of a frequency segment other than frequency segments indicated by the current channel center frequency indicator 0 and the current channel center frequency indicator 1, or when the location of the operating channel of the BSS is the following frequency location: 80+80+40+40+80 MHz, the current channel center frequency indicator 2 is used to indicate a center frequency of one of two 40 MHz frequency segments, or when the location of the operating channel of the BSS is the following frequency location: 80+80+40+40+40+40 MHz, the current channel center frequency indicator 2 is used to indicate a center frequency of one of four 40 MHz frequency segments, or when the location of the operating channel of the BSS is the following frequency location: 80+80+80 MHz, the current channel center frequency indicator 2 is used to indicate a center frequency of a frequency segment other than frequency segments indicated by the current channel center frequency indicator 0 and the current channel center frequency indicator 1, or when the location of the operating channel of the BSS is the following frequency location: 160+40+40 MHz, the current channel center frequency indicator 2 is used to indicate a center frequency of a frequency segment other than a frequency segment indicated by the current channel center frequency indicator 1, or when the location of the operating channel of the BSS is the following frequency location: 80+80+40+40 MHz, the current channel center frequency indicator 2 is used to indicate a center frequency of one of two 40 MHz frequency segments, or when the location of the operating channel of the BSS is the following frequency location: 80+80+80+80 MHz, the current channel center frequency indicator 3 is used to indicate a center frequency of a frequency segment other than frequency segments indicated by the current channel center frequency indicator 0, the current channel center frequency indicator 1, and the current channel center frequency indicator 2, or when the location of the operating channel of the BSS is the following frequency location: 160+80+40+40 MHz, the current channel center frequency indicator 3 is used to indicate a center frequency of a 40 MHz frequency segment other than a frequency segment indicated by the current channel center frequency indicator 2, or when the location of the operating channel of the BSS is the following frequency location: 160+40+40+80 MHz, the current channel center frequency indicator 3 is used to indicate a center frequency of an 80 MHz frequency segment, or when the location of the operating channel of the BSS is the following frequency location: 160+40+40+40+40 MHz, the current channel center frequency indicator 3 is used to indicate a center frequency of a 40 MHz frequency segment other than frequency segments indicated by the current channel center frequency indicator 0, the current channel center frequency indicator 1, and the current channel center frequency indicator 2, or when the location of the operating channel of the BSS is the following frequency location: 80+80+80+40+40 MHz, the current channel center frequency indicator 3 is used to indicate a center frequency of one of two 40 MHz frequency segments, or when the location of the operating channel of the BSS is the following frequency location: 80+80+40+40+80 MHz, the current channel center frequency indicator 3 is used to indicate a center frequency of a 40 MHz frequency segment other than a frequency segment indicated by the current channel center frequency indicator 2, or when the location of the operating channel of the BSS is the following frequency location: 80+80+40+40+40+40 MHz, the current channel center frequency indicator 3 is used to indicate a center frequency of a 40 MHz frequency segment other than a frequency segment indicated by the current channel center frequency indicator 2, or when the location of the operating channel of the BSS is the following frequency location: 80+80+40+40 MHz, the current channel center frequency indicator 3 is used to indicate a center frequency of a 40 MHz frequency segment other than a frequency segment indicated by the current channel center frequency indicator 2, or when the location of the operating channel of the BSS is at least one of the following frequency locations: 20 MHz, 40 MHz, 80 MHz, 160 MHz, 80+80 MHz, 320 MHz, 160+160 MHz, 160+80+80 MHz, 80+80+160 MHz, 240 MHz, 160+80 MHz, 80+160 MHz, 160+40+40 MHz, and 80+80+80 MHz, the value of the current channel center frequency indicator 3 is 0, or when the location of the operating channel of the BSS is the following frequency location: 160+40+40+40+40 MHz, the current channel center frequency indicator 4 is used to indicate a center frequency of a frequency segment other than frequency segments indicated by the current channel center frequency indicator 1, the current channel center frequency indicator 2, and the current channel center frequency indicator 3, or when the location of the operating channel of the BSS is the following frequency location: 80+80+80+40+40 MHz, the current channel center frequency indicator 4 is used to indicate a center frequency of a 40 MHz frequency segment other than a frequency segment indicated by the current channel center frequency indicator 3, or when the location of the operating channel of the BSS is the following frequency location: 80+80+40+40+80 MHz, the current channel center frequency indicator 4 is used to indicate a center frequency of an 80 MHz frequency segment other than frequency segments indicated by the current channel center frequency indicator 0 and the current channel center frequency indicator 1, or when the location of the operating channel of the BSS is the following frequency location: 80+80+40+40+40+40 MHz, the current channel center frequency indicator 4 is used to indicate a center frequency of a 40 MHz frequency segment other than frequency segments indicated by the current channel center frequency indicator 2 and the current channel center frequency indicator 3, or when the location of the operating channel of the BSS is at least one of the following frequency locations: 20 MHz, 40 MHz, 80 MHz, 160 MHz, 80+80 MHz, 320 MHz, 160+160 MHz, 160+80+80 MHz, 80+80+160 MHz, 160+80+40+40 MHz, 160+40+40+80 MHz, 240 MHz, 160+80 MHz, 80+160 MHz, 160+40+40 MHz, 80+80+40+40 MHz, and 80+80+80 MHz, the value of the current channel center frequency indicator 4 is 0, or when the location of the operating channel of the BSS is the following frequency location: 80+80+40+40+40+40 MHz, the current channel center frequency indicator 5 is used to indicate a center frequency of a 40 MHz frequency segment other than frequency segments indicated by the current channel center frequency indicator 2, the current channel center frequency indicator 3, and the current channel center frequency indicator 4, or when the location of the operating channel of the BSS is at least one of the following frequency locations: 20 MHz, 40 MHz, 80 MHz, 160 MHz, 80+80 MHz, 320 MHz, 160+160 MHz, 160+80+80 MHz, 80+80+160 MHz, 160+80+40+40 MHz, 160+40+40+80 MHz, 160+40+40+40+40 MHz, 80+80+80+40+40 MHz, 80+80+40+40+80 MHz, 240 MHz, 160+80 MHz, 80+160 MHz, 160+40+40 MHz, 80+80+40+40 MHz, and 80+80+80 MHz, the value of the current channel center frequency indicator 5 is 0.

In a possible implementation of the second aspect, the method further includes parsing, by the second communications device, the first frame to obtain a channel bandwidth field, a first channel center frequency segment field, a second channel center frequency segment field, a third channel center frequency segment field, a fourth channel center frequency segment field, a fifth channel center frequency segment field, and a sixth channel center frequency segment field, and determining, by the second communications device, a BSS bandwidth and a location of an operating channel of a BSS based on the channel bandwidth field, the first channel center frequency segment field, the second channel center frequency segment field, the third channel center frequency segment field, the fourth channel center frequency segment field, the fifth channel center frequency field, and the sixth channel center frequency field.

In a possible implementation of the second aspect, when the value of the second channel center frequency segment field is greater than 0, the value of the third channel center frequency segment field is greater than 0, the value of the fifth channel center frequency segment field is greater than 0, the value of the sixth channel center frequency segment field is greater than 0, |the value of the second channel center frequency segment field−the value of the first channel center frequency segment field| is equal to 8, and the value of the fourth channel center frequency segment field is equal to 0, the BSS bandwidth is 160+80+40+40 MHz, or when the value of the second channel center frequency segment field is greater than 0, the value of the third channel center frequency segment field is greater than 0, the value of the fourth channel center frequency segment field is greater than 0, the value of the fifth channel center frequency segment field is greater than 0, |the value of the second channel center frequency segment field−the value of the first channel center frequency segment field| is equal to 8, and the value of the sixth channel center frequency segment field is equal to 0, the BSS bandwidth is 160+40+40+80 MHz, or when the value of the second channel center frequency segment field is greater than 0, the value of the third channel center frequency segment field is greater than 0, the value of the fourth channel center frequency segment field is greater than 0, the value of the fifth channel center frequency segment field is greater than 0, the value of the sixth channel center frequency segment field is greater than 0, |the value of the second channel center frequency segment field−the value of the first channel center frequency segment field| is equal to 8, and the BSS bandwidth is 160+40+40+40+40 MHz, or when the value of the second channel center frequency segment field is greater than 0, the value of the third channel center frequency segment field is greater than 0, the value of the fifth channel center frequency segment field is greater than 0, the value of the sixth channel center frequency segment field is greater than 0, |the value of the second channel center frequency segment field−the value of the first channel center frequency segment field| is greater than 16, and the value of the fourth channel center frequency segment field is equal to 0, the BSS bandwidth is 80+80+80+40+40 MHz, or when the value of the second channel center frequency segment field is greater than 0, the value of the third channel center frequency segment field is greater than 0, the value of the fourth channel center frequency segment field is greater than 0, the value of the fifth channel center frequency segment field is greater than 0, |the value of the second channel center frequency segment field−the value of the first channel center frequency segment field| is greater than 16, and the value of the sixth channel center frequency segment field is equal to 0, the BSS bandwidth is 80+80+40+40+80 MHz, or when the value of the second channel center frequency segment field is greater than 0, the value of the third channel center frequency segment field is greater than 0, the value of the fourth channel center frequency segment field is greater than 0, the value of the fifth channel center frequency segment field is greater than 0, the value of the sixth channel center frequency segment field is greater than 0, |the value of the second channel center frequency segment field−the value of the first channel center frequency segment field| is greater than 16, and the BSS bandwidth is 80+80+40+40+40+40 MHz, or when the value of the second channel center frequency segment field is greater than 0, the value of the third channel center frequency segment field is greater than 0, the value of the fourth channel center frequency segment field is greater than 0, |the value of the second channel center frequency segment field−the value of the first channel center frequency segment field| is equal to 8, the value of the fifth channel center frequency segment field is equal to 0, and the value of the sixth channel center frequency segment field is equal to 0, the BSS bandwidth is 160+40+40 MHz, or when the value of the second channel center frequency segment field is greater than 0, the value of the third channel center frequency segment field is greater than 0, the value of the fourth channel center frequency segment field is greater than 0, |the value of the second channel center frequency segment field−the value of the first channel center frequency segment field| is greater than 16, the value of the fifth channel center frequency segment field is equal to 0, and the value of the sixth channel center frequency segment field is equal to 0, the BSS bandwidth is 80+80+40+40 MHz, where || is an absolute value sign, and − is a minus sign.

According to a third aspect, an embodiment of this application provides a communications device. The communications device is a first communications device, and the first communications device includes a processing module configured to generate a first frame, where the first frame includes a channel bandwidth field, a first channel center frequency segment field, a second channel center frequency segment field, a third channel center frequency segment field, and a fourth channel center frequency segment field, the channel bandwidth field is used to indicate a BSS bandwidth, and the first channel center frequency segment field, the second channel center frequency segment field, the third channel center frequency segment field, and the fourth channel center frequency segment field are used to indicate a location of an operating channel of a BSS, and a sending module configured to send the first frame.

In this embodiment of this application, the first communications device first generates first frame, where the first frame may include the following fields: the channel bandwidth field, the first channel center frequency segment field, the second channel center frequency segment field, the third channel center frequency segment field, and the fourth channel center frequency segment field, the channel bandwidth field is used to indicate the BSS bandwidth, and the first channel center frequency segment field, the second channel center frequency segment field, the third channel center frequency segment field, and the fourth channel center frequency segment field are used to indicate the location of the operating channel of the BSS, the first communications device sends the first frame. For example, a second communications device receives the first frame. In this embodiment of this application, because the first frame generated by the first communications device includes four channel center frequency segment fields, and the four channel center frequency segment fields may indicate a BSS bandwidth greater than 160 MHz and the location of the operating channel of the BSS, a BSS bandwidth indication when a maximum bandwidth exceeds 160 MHz can be implemented.

According to a fourth aspect, an embodiment of this application provides a communications device. The communications device is a second communications device, and the second communications device includes a receiving module configured to receive a first frame from a first communications device, a processing module configured to parse the first frame to obtain a channel bandwidth field, a first channel center frequency segment field, a second channel center frequency segment field, a third channel center frequency segment field, and a fourth channel center frequency segment field, and a processing module configured to determine a BSS bandwidth and a location of an operating channel of a BSS based on the channel bandwidth field, the first channel center frequency segment field, the second channel center frequency segment field, the third channel center frequency segment field, and the fourth channel center frequency segment field.

In this embodiment of this application, the second communications device parses the first frame, where the first frame may include the following fields: the channel bandwidth field, the first channel center frequency segment field, the second channel center frequency segment field, the third channel center frequency segment field, and the fourth channel center frequency segment field, the channel bandwidth field is used to indicate the BSS bandwidth, and the first channel center frequency segment field, the second channel center frequency segment field, the third channel center frequency segment field, and the fourth channel center frequency segment field are used to indicate the location of the operating channel of the BSS. In this embodiment of this application, because the first frame generated by the first communications device includes four channel center frequency segment fields, and the four channel center frequency segment fields may indicate a BSS bandwidth greater than 160 MHz and the location of the operating channel of the BSS, the second communications device can determine, based on the received first frame, a BSS bandwidth indication of the first communications device when a maximum bandwidth exceeds 160 MHz.

According to a fifth aspect, an embodiment of this application provides a communications device. The communications device is a first communications device, and the first communications device includes a processor and a memory, where the processor and the memory communicate with each other, the memory is configured to store an instruction, and the processor is configured to execute the instruction in the memory, to perform the method according to any one of the first aspect.

According to a sixth aspect, an embodiment of this application provides a communications device. The communications device is a second communications device, and the second communications device includes a processor and a memory, where the processor and the memory communicate with each other, the memory is configured to store an instruction, and the processor is configured to execute the instruction in the memory, to perform the method according to any one of the second aspect.

According to a seventh aspect, an embodiment of this application provides a bandwidth information indication method, including generating, by a first communications device, a first frame, where the first frame includes a channel bandwidth field, a first channel center frequency segment field, a second channel center frequency segment field, and a bitmap for preamble puncture field, the channel bandwidth field is used to indicate a BSS bandwidth, the first channel center frequency segment field and the second channel center frequency segment field are used to indicate a location of an operating channel of a BSS, and each bit status in the bitmap for preamble puncture field is used to indicate whether a subchannel is available, and sending, by the first communications device, the first frame.

In a possible implementation of the seventh aspect, the bitmap for preamble puncture field is obtained by reconfiguring a reserved field in a high efficiency (HE) operation parameter field, and the operation parameter field is in the first frame, or the bitmap for preamble puncture field is a newly added field in an HE operation element field, and the operation element field is in the first frame, or the bitmap for preamble puncture field is obtained by reconfiguring a reserved field in a high throughput (HT) operation information field, and the operation information field is in the first frame.

In a possible implementation of the seventh aspect, the first frame further includes a preamble punctured BSS field, and the preamble punctured BSS field is used to indicate whether the bitmap for preamble puncture field in the first frame appears.

In a possible implementation of the seventh aspect, the first channel center frequency segment field is a first channel center frequency for preamble puncture field, the second channel center frequency segment field is a second channel center frequency segment for preamble puncture field, and the bitmap for preamble puncture field, the first channel center frequency for preamble puncture field, and the second channel center frequency segment for preamble puncture field are newly added fields in an operation element field, and the operation element field is in the first frame.

According to an eighth aspect, an embodiment of this application provides a bandwidth information indication method, including receiving, by a second communications device, a first frame from a first communications device, parsing, by the second communications device, the first frame, where the first frame includes a channel bandwidth field, a first channel center frequency segment field, a second channel center frequency segment field, and a bitmap for preamble puncture field, determining, by the second communications device, a BSS bandwidth and a location of an operating channel of a BSS based on the channel bandwidth field, the first channel center frequency segment field, and the second channel center frequency segment field, and determining, by the second communications device based on each bit status in the bitmap for preamble puncture field, whether each subchannel is available.

In a possible implementation of the eighth aspect, the bitmap for preamble puncture field is obtained by reconfiguring a reserved field in an HE operation parameter field, and the operation parameter field is in the first frame, or the bitmap for preamble puncture field is a newly added field in an HE operation element field, and the operation element field is in the first frame, or the bitmap for preamble puncture field is obtained by reconfiguring a reserved field in an HT operation information field, and the operation information field is in the first frame.

In a possible implementation of the eighth aspect, the first frame further includes a preamble punctured BSS field, and the preamble punctured BSS field is used to indicate whether the bitmap for preamble puncture field in the first frame appears.

In a possible implementation of the eighth aspect, the first channel center frequency segment field is a first channel center frequency for preamble puncture field, the second channel center frequency segment field is a second channel center frequency segment for preamble puncture field, and the bitmap for preamble puncture field, the first channel center frequency for preamble puncture field, and the second channel center frequency segment for preamble puncture field are newly added fields in an HE operation element field, and the operation element field is in the first frame.

According to a ninth aspect, an embodiment of this application provides a communications device. The communications device is a first communications device, and the first communications device includes a processing module configured to generate a first frame, where the first frame includes a channel bandwidth field, a first channel center frequency segment field, a second channel center frequency segment field, and a bitmap for preamble puncture field, the channel bandwidth field is used to indicate a BSS bandwidth, the first channel center frequency segment field and the second channel center frequency segment field are used to indicate a location of an operating channel of a BSS, and each bit status in the bitmap for preamble puncture field is used to indicate whether a subchannel is available, and a sending module configured to send the first frame.

According to a tenth aspect, an embodiment of this application provides a communications device. The communications device is a second communications device, and the second communications device includes a receiving module configured to receive a first frame from a first communications device, and a processing module configured to parse the first frame, where the first frame includes a channel bandwidth field, a first channel center frequency segment field, a second channel center frequency segment field, and a bitmap for preamble puncture field, where the processing module is configured to determine a BSS bandwidth and a location of an operating channel of a BSS based on the channel bandwidth field, the first channel center frequency segment field, and the second channel center frequency segment field, and determine, based on each bit status in the bitmap for preamble puncture field, whether each subchannel is available.

According to an eleventh aspect, an embodiment of this application provides a communications device. The communications device is a first communications device, and the first communications device includes a processor and a memory, where the processor and the memory communicate with each other, the memory is configured to store an instruction, and the processor is configured to execute the instruction in the memory, to perform the method according to any one of the seventh aspect.

According to a twelfth aspect, an embodiment of this application provides a communications device. The communications device is a second communications device, and the second communications device includes a processor and a memory, where the processor and the memory communicate with each other, the memory is configured to store an instruction, and the processor is configured to execute the instruction in the memory, to perform the method according to any one of the eighth aspect.

According to a thirteenth aspect, an embodiment of this application provides a computer-readable storage medium. The computer-readable storage medium stores an instruction. When the instruction is run on a computer, the computer is enabled to perform the method according to the first aspect.

According to a fourteenth aspect, an embodiment of this application provides a computer-readable storage medium. The computer-readable storage medium stores an instruction. When the instruction is run on a computer, the computer is enabled to perform the method according to the second aspect.

According to a fifteenth aspect, an embodiment of this application provides a computer-readable storage medium. The computer-readable storage medium stores an instruction. When the instruction is run on a computer, the computer is enabled to perform the method according to the seventh aspect.

According to a sixteenth aspect, an embodiment of this application provides a computer-readable storage medium. The computer-readable storage medium stores an instruction. When the instruction is run on a computer, the computer is enabled to perform the method according to the eighth aspect.

According to a seventeenth aspect, an embodiment of this application provides a computer program product including an instruction. When the instruction is run on a computer, the computer is enabled to perform the method in the first aspect.

According to an eighteenth aspect, an embodiment of this application provides a computer program product including an instruction. When the instruction is run on a computer, the computer is enabled to perform the method in the second aspect.

According to a nineteenth aspect, an embodiment of this application provides a computer program product including an instruction. When the instruction is run on a computer, the computer is enabled to perform the method in the seventh aspect.

According to a twentieth aspect, an embodiment of this application provides a computer program product including an instruction. When the instruction is run on a computer, the computer is enabled to perform the method in the eighth aspect.

According to a twenty-first aspect, this application provides a chip system. The chip system includes a processor that is configured to support a communications device in implementing functions in the foregoing first aspect, for example, sending or processing data and/or information in the foregoing method. In a possible design, the chip system further includes a memory. The memory is configured to store a program instruction and data that are necessary for the communications device. The chip system may include a chip, or may include a chip and another discrete component.

According to a twenty-second aspect, this application provides a chip system. The chip system includes a processor that is configured to support a communications device in implementing functions in the foregoing second aspect, for example, sending or processing data and/or information in the foregoing method. In a possible design, the chip system further includes a memory. The memory is configured to store a program instruction and data that are necessary for the communications device. The chip system may include a chip, or may include a chip and another discrete component.

According to a twenty-third aspect, this application provides a chip system. The chip system includes a processor that is configured to support a communications device in implementing functions in the foregoing seventh aspect, for example, sending or processing data and/or information in the foregoing method. In a possible design, the chip system further includes a memory. The memory is configured to store a program instruction and data that are necessary for the communications device. The chip system may include a chip, or may include a chip and another discrete component.

According to a twenty-fourth aspect, this application provides a chip system. The chip system includes a processor that is configured to support a communications device in implementing functions in the foregoing eighth aspect, for example, sending or processing data and/or information in the foregoing method. In a possible design, the chip system further includes a memory. The memory is configured to store a program instruction and data that are necessary for the communications device. The chip system may include a chip, or may include a chip and another discrete component.

BRIEF DESCRIPTION OF DRAWINGS

FIG. 12 is a schematic diagram of a beacon frame transmission manner according to an embodiment of this application;

FIG. 13A is a schematic diagram of a frame structure of an EHT operation information field according to an embodiment of this application;

FIG. 13B is a schematic diagram of a frame structure of another EHT operation information field according to an embodiment of this application;

FIG. 14A is a schematic diagram of a frame structure of another EHT operation information field according to an embodiment of this application;

FIG. 14B is a schematic diagram of a frame structure of another EHT operation information field according to an embodiment of this application;

FIG. 15 is a schematic diagram of a frame structure of an HE operation parameter field according to an embodiment of this application;

FIG. 16A is a schematic diagram of a frame structure of an HE operation parameter field according to an embodiment of this application;

FIG. 17 is a schematic diagram of a frame structure of an HT operation information field according to an embodiment of this application;

DESCRIPTION OF EMBODIMENTS

Embodiments of this application provide a bandwidth information indication method and a communications device, to implement a BSS bandwidth indication when a maximum bandwidth exceeds 160 MHz.

The following describes the embodiments of this application with reference to accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, and this is merely a discrimination manner for describing objects having a same attribute in the embodiments of this application. In addition, the terms "include", "have" and any other variants mean to cover the non-exclusive inclusion such that a process, method, system, product, or device that includes a series of units is not necessarily limited to those units, but may include other units not expressly listed or inherent to such a process, method, system, product, or device.

Figure 1:
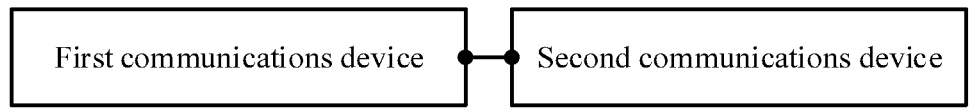
FIG. 1 is a schematic diagram of a system architecture to which a bandwidth information indication method is applied according to an embodiment of this application.

The technical solutions in the embodiments of this application may be applied to a communications system. As shown in FIG. 1, the communications system provided in the embodiments of this application may include at least two communications devices: a first communications device and a second communications device. The first communications device may be a network device, the network device may further include an AP, the second communications device may be a terminal device, and the terminal device may further include a STA. Alternatively, the first communications device may be a terminal device, and the second communications device may be a network device. Alternatively, the first communications device may be a network device, and the second communications device may be another network device. Alternatively, the first communications device may be a terminal device, and the second communications device may be another terminal device. A specific implementation of the communications device may be flexibly selected with reference to an actual application scenario. This is not limited herein.

Technical solutions in the embodiments of this application may be applied to various communications systems for data processing, for example, a code-division multiple access (CDMA) system, a time-division multiple access (TDMA) system, a frequency-division multiple access (FDMA) system, an orthogonal FDMA (OFDMA) system, a single-carrier FDMA (SC-FDMA) system, and another system. The terms "system" and "network" can be interchanged with each other. The CDMA system may implement radio technologies such as Universal Radio Terrestrial Access (UTRA) and CDMA2000. The UTRA may include a wideband CDMA (WCDMA) technology and other variant technologies of CDMA. The CDMA2000 may cover interim standard (IS) 2000 (IS-2000), IS-95, and IS-856. The TDMA system may implement radio technologies such as a Global System for Mobile Communications (GSM). The OFDMA system may implement radio technologies such as Evolved Universal Radio Terrestrial Access (E-UTRA), Ultra Mobile Broadband (UMB), IEEE 802.11 (WI-FI), IEEE 802.16 (Worldwide Interoperability for Microwave Access (WIMAX)), IEEE 802.20, and Flash OFDMA. The UTRA and the E-UTRA are a UMTS and an evolved version of the UMTS. A new version of the UMTS, namely, the E-UTRA, is used in 3rd Generation Partnership Project (3GPP) Long-Term Evolution (LTE) and various versions evolved based on LTE. A 5th generation (5G) communications system or New Radio (NR) is a next generation communications system under study. In addition, the communications system may be further applicable to a future-oriented communications technology, and is applicable to all the technical solutions provided in the embodiments of this application. System architectures and service scenarios described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of new service scenarios, the technical solutions provided in the embodiments of this application are also applicable to similar technical problems.

Figure 2:
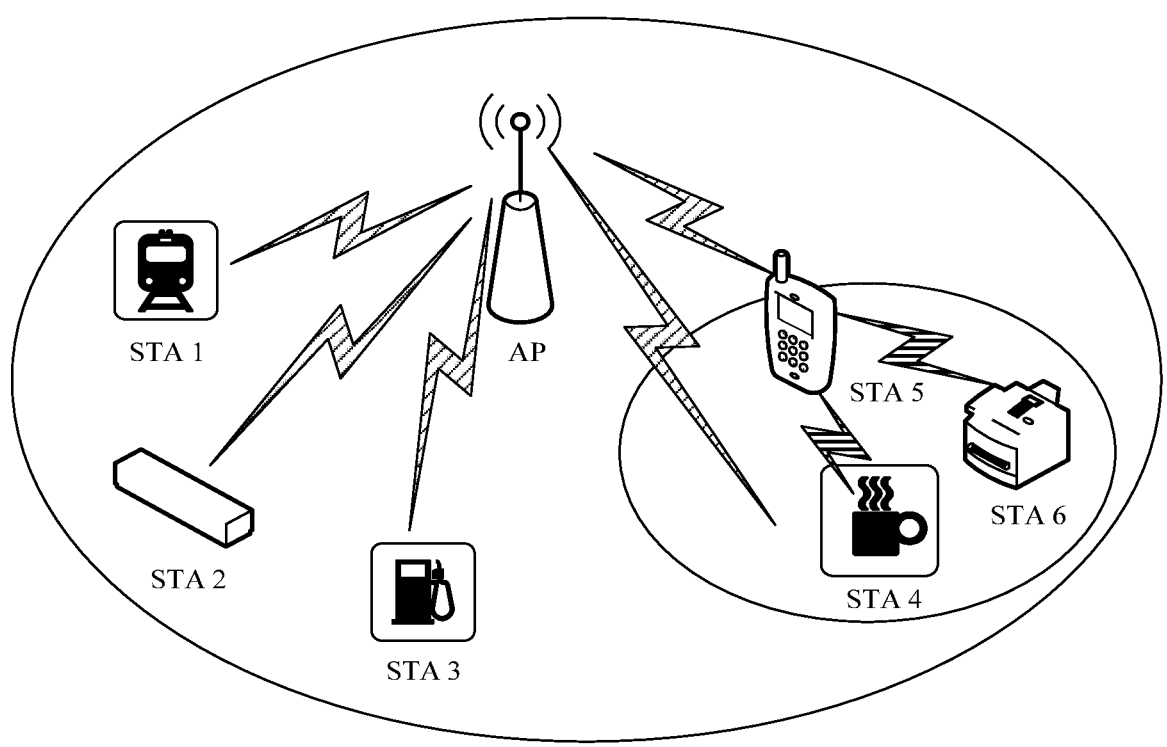
FIG. 2 is a schematic diagram of another system architecture to which a bandwidth information indication method is applied according to an embodiment of this application.

FIG. 2 is a schematic structural diagram of a possible radio access network (RAN) according to an embodiment of this application. The RAN may be a base station access system of a second generation (2G) network (to be specific, the RAN includes a base station and a base station controller), may be a base station access system of a third generation (3G) network (to be specific, the RAN includes a base station and a Radio Network Controller (RNC)), may be a base station access system of a fourth generation (4G) network (to be specific, the RAN includes an Evolved Node B (eNB or eNodeB) and an RNC), or may be a base station access system of a 5G network.

The first communications device provided in the embodiments of this application may be one or more network devices. In FIG. 2, an example in which the network device is further an AP is used. The second communications device may be one or more terminal devices. In FIG. 2, an example in which the terminal device is a STA is used. The network device may be any device with a wireless transceiver function, or a chip disposed in a device with a wireless transceiver function. The network device includes but is not limited to a base station (for example, a base station (BS), a NodeB, an eNodeB or eNB, a gNodeB gNodeB or gNB in a 5G communications system, a base station in a future communications system, an access node in a WI-FI system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. The core network may support a network using the foregoing one or more technologies, or a future evolved network. The base station may include one or more co-site or non-co-site transmission reception points (TRP). The network device may alternatively be a radio controller, a centralized unit (CU), or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting a 5G network, or may support a dual connection to a base station in an LTE network and a base station in a 5G network. For example, the terminal is connected to a RAN node of a wireless network. Currently, for example, the RAN node is a gNB, a TRP, an eNB, an RNC, a NodeB (NB), a base station controller (BSC), a base transceiver station (BTS), a home base station (for example, a home evolved NodeB or a home NodeB (HNB), a baseband unit (BBU), or a WI-FI AP. In a network structure, the network device may include a centralized unit (CU) node, a distributed unit (DU) node, or a RAN device including a CU node and a DU node.

The terminal devices 1 to 6 each are also referred to as user equipment (UE), a mobile station (MS), a mobile terminal (MT), a terminal, or the like, and is a device that provides voice and/or data connectivity for a user, or is a chip disposed in the device, for example, a handheld device or a vehicle-mounted device with a wireless connection function. Currently, for example, the terminal device is a mobile phone, a tablet, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

In the embodiments of this application, a base station and a STA 1 to a STA 6 form a communications system. In the communications system, the base station sends one or more of system information, a Re-Auth-Request (RAR) message, and a paging message to one or more of the STA 1 to the STA 6. In addition, the STA 4 to the STA 6 also form a communications system. In the communications system, the STA 5 may function as a base station, and the STA 5 may send one or more of system information, control information, and a paging message to one or more of the STA 4 and the STA 6.

Figure 3:
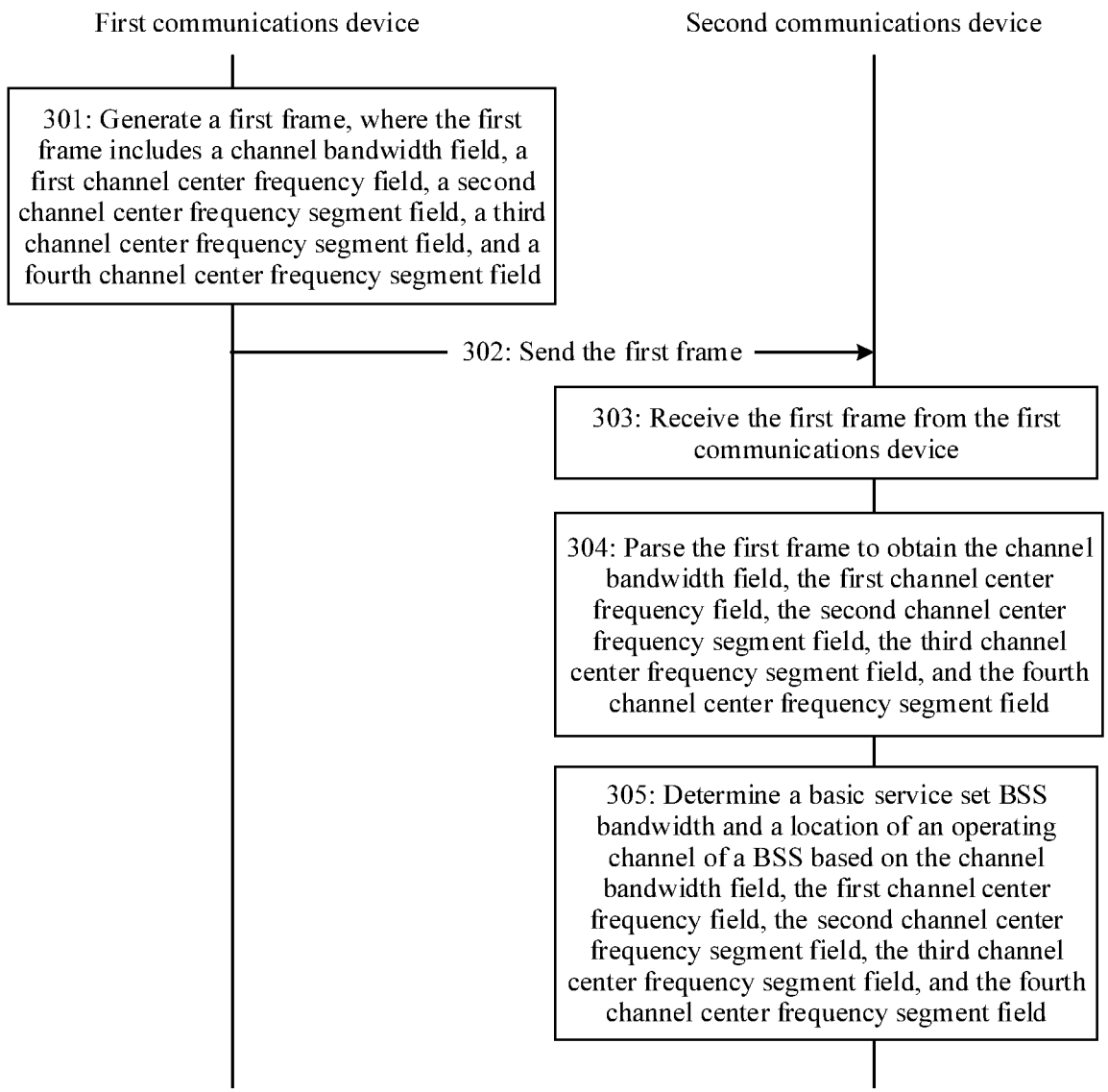
FIG. 3 is a schematic interaction flowchart between a terminal device and a network device according to an embodiment of this application.

FIG. 3 is a schematic interaction flowchart between two communications devices according to an embodiment of this application. A bandwidth information indication method provided in this embodiment of this application mainly includes the following steps.

301: A first communications device generates a first frame, where the first frame includes a channel bandwidth field, a first channel center frequency segment field, a second channel center frequency segment field, a third channel center frequency segment field, and a fourth channel center frequency segment field, the channel bandwidth field is used to indicate a BSS bandwidth, and the first channel center frequency segment field, the second channel center frequency segment field, the third channel center frequency segment field, and the fourth channel center frequency segment field are used to indicate a location of an operating channel of a BSS.

In this embodiment of this application, when establishing the BSS, the first communications device needs to indicate an operating bandwidth of the BSS and the location of the operating channel in the first frame. For example, the first communications device may use an operation information field in an operation element field in the first frame for indication. In addition, each generation of standards is compatible with previous generations of standards. Therefore, design of operation information of previous generations needs to be considered in design of new-generation operation information.

In this embodiment of this application, the first frame generated by the first communications device may include a management frame. For example, the first frame may be a beacon frame, or the first frame is another management frame. For example, the first frame may be an association response frame. A specific implementation of the first frame may be determined with reference to an application scenario.

An EHT is used as a next-generation WI-FI standard, and a maximum bandwidth of the next-generation WI-FI standard is to be extended. For example, the maximum bandwidth may be extended to 240 MHz or 320 MHz. Therefore, a new frame structure format needs to be designed for the first frame after bandwidth extension, and in this embodiment of this application, the first communications device may generate the first frame. The first frame may include the following five fields: the channel bandwidth field and the four channel center frequency fields. The four channel center frequency fields include the first channel center frequency segment field, the second channel center frequency segment field, the third channel center frequency segment field, and the fourth channel center frequency segment field. The channel bandwidth field is used to indicate the BSS bandwidth, and the first channel center frequency segment field, the second channel center frequency segment field, the third channel center frequency segment field, and the fourth channel center frequency segment field are used to indicate the location of the operating channel of the BSS.

For example, in an EHT standard, there is an EHT operation element field. An EHT Operation information field is a field in the EHT operation element field, and the EHT Operation information field may be used to describe a channel-related parameter in the EHT standard. The channel bandwidth field in the first frame may be an EHT channel bandwidth field, and the channel bandwidth field is used to indicate the BSS bandwidth. For example, there may be a plurality of BSS bandwidths. When the BSS bandwidth is extended to 320 MHz, a specific mode of the BSS bandwidth may be further classified into several different forms of 320 MHz, 160+160 MHz, 160+80+80 MHz, 80+80+160 MHz, and 80+80+80+80 MHz. "+" indicates that a total bandwidth includes two or more different frequency segments. The channel center frequency field in the first frame may be a channel center frequency segment (CCFS) field. Further, the first channel center frequency segment field may be CCFS0, the second channel center frequency segment field may be CCFS1, the third channel center frequency segment field may be CCFS3, and the fourth channel center frequency segment field may be CCFS4. The location of the operating channel of the BSS may be indicated using CCFS0, CCFS1, CCFS3, and CCFS4. For example, a center frequency of each operating channel may be indicated.

Figure 4:
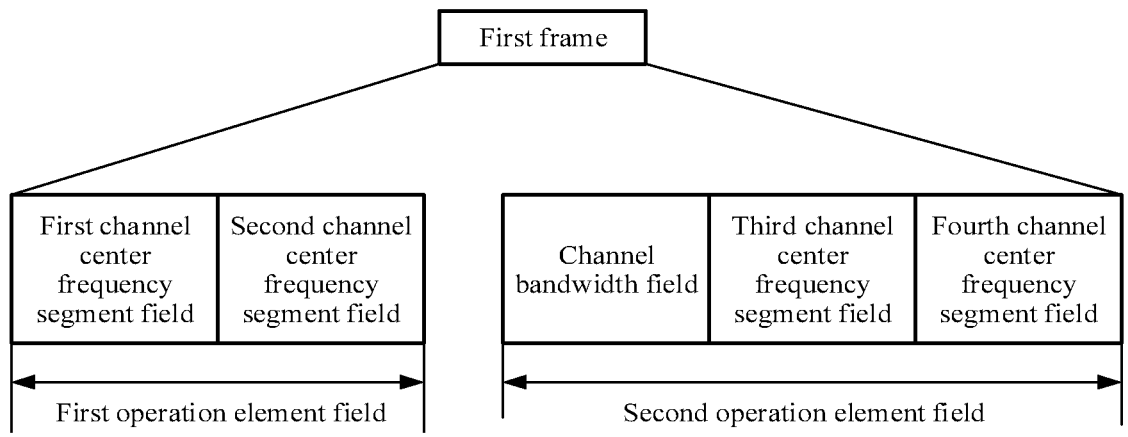
FIG. 4 is a schematic diagram of a frame structure of a first frame according to an embodiment of this application.

In some embodiments of this application, FIG. 4 is a schematic diagram of a frame structure of the first frame according to an embodiment of this application. The first channel center frequency segment field and a second channel center frequency segment field are in a first operation element field, the channel bandwidth field, the third channel center frequency segment field, and the fourth channel center frequency segment field are in a second operation element field, and the first operation element field and the second operation element field are in the first frame.

In FIG. 4, the first frame may include two operation element fields: the first operation element field and the second operation element field. The first operation element field may be a VHT operation information field, and the first channel center frequency segment field and the second channel center frequency segment field are in the first operation element field. For example, the first channel center frequency segment field may be CCFS0, and the second channel center frequency segment field may be CCFS1. The channel bandwidth field, the third channel center frequency segment field, and the fourth channel center frequency segment field are in the second operation element field. The second operation element field may be further an EHT operation information field, the third channel center frequency segment field may be CCFS3, and the fourth channel center frequency segment field may be CCFS4. One channel bandwidth field and four channel center frequency segment fields may be carried in the first frame using two different operation element fields, to implement a BSS bandwidth indication when a maximum bandwidth exceeds 160 MHz.

Figure 5:
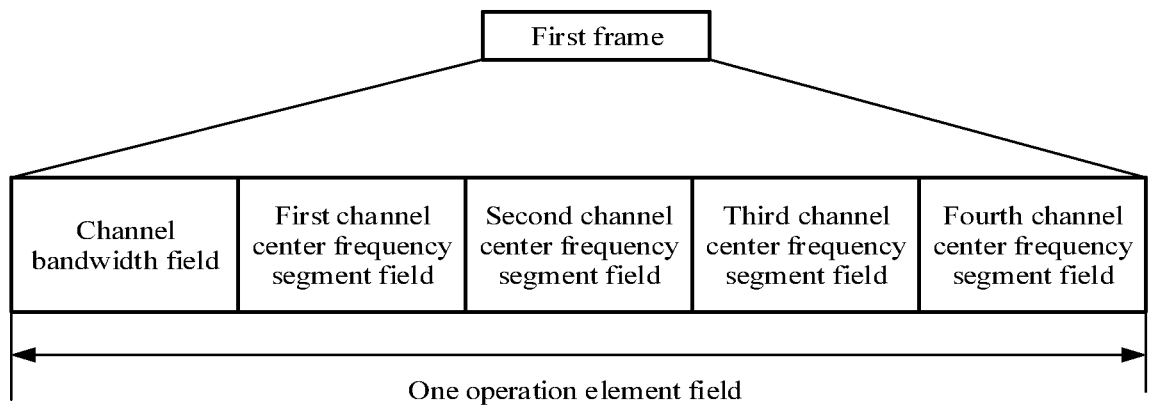
FIG. 5 is a schematic diagram of a frame structure of another first frame according to an embodiment of this application.

In some embodiments of this application, FIG. 5 is a schematic diagram of another frame structure of the first frame according to an embodiment of this application. The channel bandwidth field, the first channel center frequency segment field, the second channel center frequency segment field, the third channel center frequency segment field, and the fourth channel center frequency segment field are in a same operation element field, and the operation element field is in the first frame.

In FIG. 5, the first frame may include one operation element field, and the operation element field may be an EHT operation information field. One channel bandwidth field and four channel center frequency segment fields may be carried in the first frame using a same operation element field, to implement a BSS bandwidth indication when a maximum bandwidth exceeds 160 MHz.

For example, CCFS0 and CCFS1 may be used in a VHT operation element field. However, in this embodiment of this application, because the EHT supports a higher bandwidth, CCFS3 and CCFS4 need to be newly added for indication. CCFS0 and CCFS1 are processed in two ways. One is to reuse CCFS0 and CCFS1 in the VHT operation element field. The other is to migrate CCFS0 and CCFS1 to an EHT operation information field. An advantage of the first method is that no repeated indication is required, and signaling overheads are reduced. An advantage of the second method is that all CCFSs related to the EHT may be placed in a same element, a frame structure is relatively simple, and joint using with VHT operation is not required.

In some embodiments of this application, a length of the channel bandwidth field is one byte, and when a value of the channel bandwidth field is 0, the channel bandwidth field is used to indicate that the BSS bandwidth is 20 MHz, 40 MHz, 80 MHz, 160 MHz, or 80+80 MHz, and when a value of the channel bandwidth field is 1, the channel bandwidth field is used to indicate that the BSS bandwidth is 240 MHz, 160+80 MHz, 80+160 MHz, 80+80+80 MHz, 320 MHz, 160+160 MHz, 160+80+80 MHz, 80+80+160 MHz, or 80+80+80+80 MHz, or when a value of the channel bandwidth field is 0, the channel bandwidth field is used to indicate that the BSS bandwidth is 20 MHz, or when a value of the channel bandwidth field is 1, the channel bandwidth field is used to indicate that the BSS bandwidth is 40 MHz, or when a value of the channel bandwidth field is 2, the channel bandwidth field is used to indicate that the BSS bandwidth is 80 MHz, or when a value of the channel bandwidth field is 3, the channel bandwidth field is used to indicate that the BSS bandwidth is 160 MHz or 80+80 MHz, or when a value of the channel bandwidth field is 4, the channel bandwidth field is used to indicate that the BSS bandwidth is 240 MHz, 160+80 MHz, 80+160 MHz, or 80+80+80 MHz, or when a value of the channel bandwidth field is 5, the channel bandwidth field is used to indicate that the BSS bandwidth is 320 MHz, 160+160 MHz, 160+80+80 MHz, 80+80+160 MHz, or 80+80+80+80 MHz.

Different values of the channel bandwidth field may be used to indicate the BSS bandwidth. It is not limited that one value of the channel bandwidth field may indicate a plurality of BSS bandwidths, and the location of the operating channel of the BSS may be further determined based on the first channel center frequency segment field, the second channel center frequency segment field, the third channel center frequency segment field, and the fourth channel center frequency segment field. The first communications device may determine, based on the BSS established by the first communications device, the BSS bandwidth and the location of the operating channel that needs to be used.

For example, the channel bandwidth field in the first frame may be the EHT Channel Bandwidth field, and the length of the channel bandwidth field is one byte. Table 1 and Table 2 show BSS bandwidths indicated by different values of the channel bandwidth field.

TABLE 1

| EHT Channel Bandwidth | Meaning |
|---|---|
| 0 | The BSS bandwidth is 20 MHz, 40 MHz, 80 MHz, 160 MHz, or 80 + 80 MHz |
| 1 | The BSS bandwidth is 320 MHz, 160 + 160 MHz, 160 + 80 + 80 MHz, 80 + 80 + 160 MHz, 80 + 80 + 80 + 80 MHz, 240 MHz, 160 + 80 MHz, 80 + 160 MHz, or 80 + 80 + 80 MHz |
| 2-255 | Reserved |

TABLE 2

| EHT Channel Bandwidth | Meaning |
| --- | --- |
| 0 | The BSS bandwidth is 20 MHz |
| 1 | The BSS bandwidth is 40 MHz |
| 2 | The BSS bandwidth is 80 MHz |
| 3 | The BSS bandwidth is 160 MHz or 80 + 80 MHz |
| 4 | The BSS bandwidth is 240 MHz, 160 + 80 MHz, 80 + 160 MHz, or 80 + 80 + 80 MHz |
| 5 | The BSS bandwidth is 320 MHz, 160 + 160 MHz, 160 + 80 + 80 MHz, 80 + 80 + 160 MHz, or 80 + 80 + 80 MHz |
| 6-255 | Reserved |

In some embodiments of this application, the first frame further includes a bitmap for preamble puncture field, and each bit status in the bitmap for preamble puncture field is used to indicate whether a subchannel is available.

In addition to including the following five fields: the channel bandwidth field and the four channel center frequency fields, the first frame may further carry the bitmap for preamble puncture field. When the first communications device supports preamble puncture, the first frame may further include one bitmap for preamble puncture field such that a second communications device determines, based on a value of each bitmap for preamble puncture field, whether all subchannels are available.

In a standard protocol, there are two modes: non-preamble puncture and preamble puncture. In the non-preamble puncture mode, the BSS bandwidth has four non-puncture modes: 20, 40, 80, and 160 (80+80), and the preamble puncture mode is a transmission mode obtained after puncturing is performed in a bandwidth of 80 or 160 (80+80). When the BSS supports the preamble puncture mode, in this embodiment of this application, a bitmap for preamble puncture field may be further added to a frame structure of EHT operation information. The bitmap for preamble puncture field has 2 bytes, and each bit corresponds to 20 MHz. If each bit is set to 1, it indicates that a subchannel (for example, a size of 20 MHz) is available, otherwise, it indicates that the subchannel is unavailable.

Figure 6:
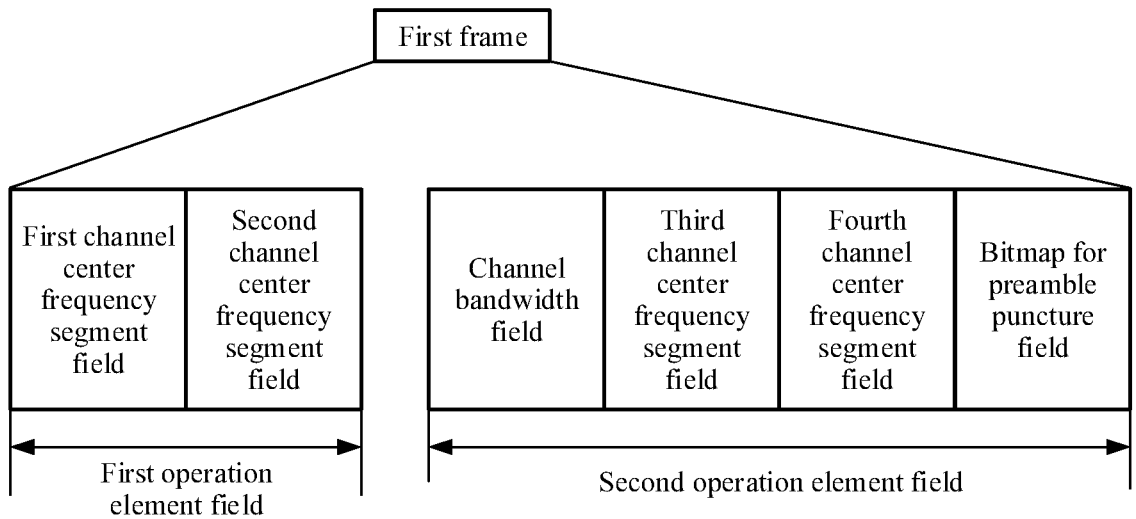
FIG. 6 is a schematic diagram of a frame structure of another first frame according to an embodiment of this application.
Figure 7:
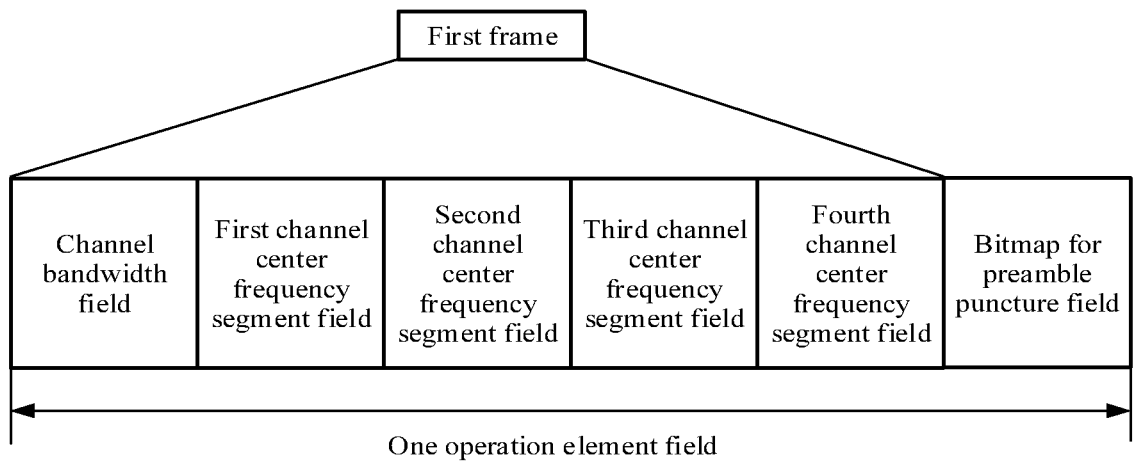
FIG. 7 is a schematic diagram of a frame structure of another first frame according to an embodiment of this application.

In some embodiments of this application, FIG. 6 is a schematic diagram of a frame structure of another first frame according to an embodiment of this application. A bitmap for preamble puncture field, a channel bandwidth field, a third channel center frequency segment field, and a fourth channel center frequency segment field are in a same operation element field, and the bitmap for preamble puncture field is in an operation element field different from an operation element field that the first channel center frequency segment field and the second channel center frequency segment field are in. Alternatively, FIG. 7 is a schematic diagram of a frame structure of another first frame according to an embodiment of this application. A bitmap for preamble puncture field, a channel bandwidth field, a first channel center frequency segment field, a second channel center frequency segment field, a third channel center frequency segment field, and a fourth channel center frequency segment field are in a same operation element field.

In FIG. 6, the first frame may include two operation element fields: the first operation element field and the second operation element field. The first operation element field may be a VHT operation information field, and the first channel center frequency segment field and the second channel center frequency segment field are in the first operation element field. For example, the first channel center frequency segment field may be CCFS0, and the second channel center frequency segment field may be CCFS1. The channel bandwidth field, the third channel center frequency segment field, the fourth channel center frequency segment field, and the bitmap for preamble puncture field are in the second operation element field. The second operation element field may be an EHT operation information field, the third channel center frequency segment field may be CCFS3, and the fourth channel center frequency segment field may be CCFS4. One channel bandwidth field and four channel center frequency segment fields may be carried in the first frame using two different operation element fields, to implement a BSS bandwidth indication when a maximum bandwidth exceeds 160 MHz. In addition, whether each subchannel is available can be indicated using the bitmap for preamble puncture field.

In FIG. 7, the first frame may include one operation element field, and the operation element field may be an EHT operation information field. One channel bandwidth field and four channel center frequency segment fields may be carried in the first frame using a same operation element field, to implement a BSS bandwidth indication when a maximum bandwidth exceeds 160 MHz. In addition, whether each subchannel is available may be indicated using the bitmap for preamble puncture field.

In some embodiments of this application, a value of the first channel center frequency segment field, a value of the second channel center frequency segment field, a value of the third channel center frequency segment field, and a value of the fourth channel center frequency segment field are obtained based on a value of a current channel center frequency indicator 0, a value of a current channel center frequency indicator 1, a value of a current channel center frequency indicator 2, and a value of a current channel center frequency indicator 3.

The first communications device first determines a value of a channel bandwidth field, determines a quantity of frequency segments, and determines the values of the four indicators based on the quantity of frequency segments and a center frequency indicator used by each frequency segment. The values of the four indicators include the value of the current channel center frequency indicator 0, the value of the current channel center frequency indicator 1, the value of the current channel center frequency indicator 2, and the value of the current channel center frequency indicator 3. For example, the current channel center frequency indicator 0 may be dot11CurrentChannelCenterFrequencyIndex0, the current channel center frequency indicator 1 may be dot11CurrentChannelCenterFrequencyIndex1, the current channel center frequency indicator 2 may be dot11CurrentChannelCenterFrequencyIndex2, and the current channel center frequency indicator 3 may be dot11CurrentChannelCenterFrequencyIndex3.

In some embodiments of this application, when the location of the operating channel of the BSS is at least one of the following frequency locations: 20 MHz, 40 MHz, and 80 MHz, the value of the first channel center frequency segment field is the value of the current channel center frequency indicator 0, and the value of the second channel center frequency segment field, the value of the third channel center frequency segment field, and the value of the fourth channel center frequency segment field are all 0, or when the location of the operating channel of the BSS is the following frequency location: 160 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, the value of the second channel center frequency segment field is the value of the current channel center frequency indicator 0, and the value of the third channel center frequency segment field and the value of the fourth channel center frequency segment field are both 0, or when the location of the operating channel of the BSS is the following frequency location: 80+80 MHz, the value of the first channel center frequency segment field is the value of the current channel center frequency indicator 0, the value of the second channel center frequency segment field is the value of the current channel center frequency indicator 1, and the value of the third channel center frequency segment field and the value of the fourth channel center frequency segment field are both 0, or when the location of the operating channel of the BSS is the following frequency location: 320 MHz, if a value of a current primary channel is greater than the value of the current channel center frequency indicator 0 and less than the value of the current channel center frequency indicator 0 plus 16, the value of the first channel center frequency segment field is the value of the current channel center frequency indicator 0 plus 8, or if a value of a current primary channel is greater than the value of the current channel center frequency indicator 0 plus 16, the value of the first channel center frequency segment field is the value of the current channel center frequency indicator 0 plus 24, or if a value of a current primary channel is less than the value of the current channel center frequency indicator 0 and greater than the value of the current channel center frequency indicator 0 minus 16, the value of the first channel center frequency segment field is the value of the current channel center frequency indicator 0 minus 8, or if a value of a current primary channel is less than the value of the current channel center frequency indicator 0 minus 16, the value of the first channel center frequency segment field is the value of the current channel center frequency indicator 0 minus 24, if a value of a current primary channel is greater than the value of the current channel center frequency indicator 0, the value of the second channel center frequency segment field is the value of the current channel center frequency indicator 0 plus 16, or if a value of a current primary channel is less than or equal to the value of the current channel center frequency indicator 0, the value of the second channel center frequency segment field is the value of the current channel center frequency indicator 0 minus 16, and the value of the third channel center frequency segment field is the value of the current channel center frequency indicator 0, and the value of the fourth channel center frequency segment field is 0, or when the location of the operating channel of the BSS is the following frequency location: 160+160 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, the value of the second channel center frequency segment field is the value of the current channel center frequency indicator 0, and the value of the third channel center frequency segment field is the value of the current channel center frequency indicator 1 minus 8 or plus 8, and the value of the fourth channel center frequency segment field is the value of the current channel center frequency indicator 1, or the value of the third channel center frequency segment field is the value of the current channel center frequency indicator 1, and the value of the fourth channel center frequency segment field is the value of the current channel center frequency indicator 1 minus 8 or plus 8, or the value of the third channel center frequency segment field is the value of the current channel center frequency indicator 1, and the value of the fourth channel center frequency segment field is 0, or the value of the third channel center frequency segment field is 0, and the value of the fourth channel center frequency segment field is the value of the current channel center frequency indicator 1, or when the location of the operating channel of the BSS is the following frequency location: 160+80+80 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, and the value of the fourth channel center frequency segment field is the value of the current channel center frequency indicator 2, or when the location of the operating channel of the BSS is the following frequency location: 80+80+160 MHz, the value of the first channel center frequency segment field is the value of the current channel center frequency indicator 0, the value of the second channel center frequency segment field is the value of the current channel center frequency indicator 1, and the value of the third channel center frequency segment field is the value of the current channel center frequency indicator 2 minus 8 or plus 8, and the value of the fourth channel center frequency segment field is the value of the current channel center frequency indicator 2, or the value of the third channel center frequency segment field is the value of the current channel center frequency indicator 2, and the value of the fourth channel center frequency segment field is the value of the current channel center frequency indicator 2 minus 8 or plus 8, or the value of the third channel center frequency segment field is the value of the current channel center frequency indicator 2, and the value of the fourth channel center frequency segment field is 0, or the value of the third channel center frequency segment field is 0, and the value of the fourth channel center frequency segment field is the value of the current channel center frequency indicator 2, or when the location of the operating channel of the BSS is the following frequency location: 80+80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is the value of the current channel center frequency indicator 3, or when the location of the operating channel of the BSS is the following frequency location: 240 MHz, if a value of a current primary channel is greater than the value of the current channel center frequency indicator 0 and less than the value of the current channel center frequency indicator 0 plus 8, the value of the first channel center frequency segment field is the value of the current channel center frequency indicator 0 plus 16, or if a value of a current primary channel is greater than the value of the current channel center frequency indicator 0 minus 8 and less than the value of the current channel center frequency indicator 0 plus 8, the value of the first channel center frequency segment field is the value of the current channel center frequency indicator 0, or if a value of a current primary channel is less than the value of the current channel center frequency indicator 0 minus 8, the value of the first channel center frequency segment field is the value of the current channel center frequency indicator 0 minus 16, if a value of a current primary channel is greater than the value of the current channel center frequency indicator 0 and less than the value of the current channel center frequency indicator 0 plus 8, the value of the second channel center frequency segment field is the value of the current channel center frequency indicator 0 plus 8, if a value of a current primary channel is less than the value of the current channel center frequency indicator 0 minus 8, the value of the second channel center frequency segment field is the value of the current channel center frequency indicator 0 minus 8, or if a value of a current primary channel is greater than the value of the current channel center frequency indicator 0 minus 8 and less than the value of the current channel center frequency indicator 0 plus 8, the value of the second channel center frequency segment field is the value of the current channel center frequency indicator 0 minus 8 or plus 8, the value of the third channel center frequency segment field is the value of the current channel center frequency indicator 0, and the value of the fourth channel center frequency segment field is 0, or when the location of the operating channel of the BSS is the following frequency location: 160+80 MHz, if a value of a current primary channel is greater than the value of the current channel center frequency indicator 0 and less than the value of the current channel center frequency indicator 0, the value of the first channel center frequency segment field is the value of the current channel center frequency indicator 0 plus 8, the value of the second channel center frequency segment field is the value of the current channel center frequency indicator 0, the value of the third channel center frequency segment field is the value of the current channel center frequency indicator 1, and the value of the fourth channel center frequency segment field is 0, or when the location of the operating channel of the BSS is the following frequency location: 80+160 MHz, the value of the first channel center frequency segment field is the value of the current channel center frequency indicator 0, the value of the second channel center frequency segment field is 0, and the value of the third channel center frequency segment field is the value of the current channel center frequency indicator 1 minus 8 or plus 8, and the value of the fourth channel center frequency segment field is the value of the current channel center frequency indicator 1, or the value of the third channel center frequency segment field is the value of the current channel center frequency indicator 1, and the value of the fourth channel center frequency segment field is the value of the current channel center frequency indicator 1 minus 8 or plus 8, or the value of the third channel center frequency segment field is the value of the current channel center frequency indicator 1, and the value of the fourth channel center frequency segment field is 0, or the value of the third channel center frequency segment field is 0, and the value of the fourth channel center frequency segment field is the value of the current channel center frequency indicator 1, or when the location of the operating channel of the BSS is the following frequency location: 80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is 0.

It should be noted that after the first communications device determines the location of the operating channel of the BSS, the first communications device may respectively determine the value of the first channel center frequency segment field, the value of the second channel center frequency segment field, the value of the third channel center frequency segment field, and the value of the fourth channel center frequency segment field based on the value of the current channel center frequency indicator 0, the value of the current channel center frequency indicator 1, the value of the current channel center frequency indicator 2, and the value of the current channel center frequency indicator 3, and then includes the value of the first channel center frequency segment field, the value of the second channel center frequency segment field, the value of the third channel center frequency segment field, and the value of the fourth channel center frequency segment field in the first frame. The values of the four channel center frequency segment fields in the first frame may be indicated using the four current channel center frequency indicators.

Optionally, in some embodiments of this application, when the location of the operating channel of the BSS is at least one of the following frequency locations: 20 MHz, 40 MHz, 80 MHz, 160 MHz, 240 MHz, and 320 MHz, the current channel center frequency indicator 0 is used to indicate a channel center frequency, or when the location of the operating channel of the BSS is at least one of the following frequency locations: 80+80 MHz, 160+160 MHz, 160+80+80 MHz, 80+80+160 MHz, 80+80+80+80 MHz, 160+80 MHz, 80+160 MHz, and 80+80+80 MHz, the current channel center frequency indicator 0 is used to indicate a center frequency of a frequency segment that includes a primary channel, and + indicates that a total bandwidth includes two or more different frequency segments, or when the location of the operating channel of the BSS is at least one of the following frequency locations: 20 MHz, 40 MHz, 80 MHz, 160 MHz, 240 MHz, and 320 MHz, the value of the current channel center frequency indicator 1 is 0, or when the location of the operating channel of the BSS is at least one of the following frequency locations: 80+80 MHz, 160+160 MHz, 160+80 MHz, and 80+160 MHz, the current channel center frequency indicator 1 is used to indicate a center frequency of a frequency segment that does not include a primary channel, or when the location of the operating channel of the BSS is the following frequency location: 160+80+80 MHz, the current channel center frequency indicator 1 is used to indicate a center frequency of one of two 80 MHz frequency segments, or when the location of the operating channel of the BSS is the following frequency location: 80+80+160 MHz, the current channel center frequency indicator 1 is used to indicate a center frequency of an 80 MHz frequency segment that does not include a primary channel, or when the location of the operating channel of the BSS is at least one of the following frequency locations: 80+80+80+80 MHz and 80+80+80 MHz, the current channel center frequency indicator 1 is used to indicate a center frequency of a frequency segment of a secondary 80 MHz channel, or when the location of the operating channel of the BSS is at least one of the following frequency locations: 20 MHz, 40 MHz, 80 MHz, 160 MHz, 80+80 MHz, 320 MHz, 160+160 MHz, 240 MHz, 160+80 MHz, and 80+160 MHz, the value of the current channel center frequency indicator 2 is 0, or when the location of the operating channel of the BSS is the following frequency location: 160+80+80 MHz, the current channel center frequency indicator 2 is used to indicate a center frequency of a frequency segment that is in two 80 MHz frequency segments and that is other than a frequency segment indicated by the current channel center frequency indicator 1, or when the location of the operating channel of the BSS is the following frequency location: 80+80+160 MHz, the current channel center frequency indicator 2 is used to indicate a center frequency of a 160 MHz frequency segment, or when the location of the operating channel of the BSS is the following frequency location: 80+80+80 MHz, the current channel center frequency indicator 2 is used to indicate a center frequency of a frequency segment other than frequency segments that are indicated by the current channel center frequency indicator 0 and the current channel center frequency indicator 1, or when the location of the operating channel of the BSS is the following frequency location: 80+80+80 MHz, the current channel center frequency indicator 2 is used to indicate a center frequency of a frequency segment other than frequency segments that are indicated by the current channel center frequency indicator 0 and the current channel center frequency indicator 1, or when the location of the operating channel of the BSS is at least one of the following frequency locations: 20 MHz, 40 MHz, 80 MHz, 160 MHz, 80+80 MHz, 320 MHz, 160+160 MHz, 160+80+80 MHz, 80+80+160 MHz, 240 MHz, 160+80 MHz, 80+160 MHz, and 80+80+80 MHz, the value of the current channel center frequency indicator 3 is 0, or when the location of the operating channel of the BSS is the following frequency location: 80+80+80+80 MHz, the current channel center frequency indicator 3 is used to indicate a center frequency of a frequency segment other than frequency segments that are indicated by the current channel center frequency indicator 0, the current channel center frequency indicator 1, and the current channel center frequency indicator 2.

It should be noted that after the first communications device determines the location of the operating channel of the BSS, the first communications device may separately determine the value of the current channel center frequency indicator 0, the value of the current channel center frequency indicator 1, the value of the current channel center frequency indicator 2, and the value of the current channel center frequency indicator 3 based on a quantity of frequency segments of the operating bandwidth of the BSS and a center frequency of each frequency segment. The center frequencies of the frequency segments and the current channel center frequency indicators may be determined using a preset mapping relationship.

In some embodiments of this application, a value of the first channel center frequency segment field, a value of the second channel center frequency segment field, a value of the third channel center frequency segment field, a value of the fourth channel center frequency segment field are obtained using a center frequency corresponding to a preset frequency segment.

Further, the first communications device first determines the center frequency corresponding to the preset frequency segment, and then indicates the value of the first channel center frequency segment field, the value of the second channel center frequency segment field, the value of the third channel center frequency segment field, and the value of the fourth channel center frequency segment field using the center frequency corresponding to the preset frequency segment. The values of the four channel center frequency segment fields in the first frame may be indicated using the center frequency corresponding to the preset frequency segment.

In some embodiments of this application, a formula for calculating a center frequency of a channel is as follows: Channel center frequency [MHz]=Channel starting frequency+5 dot11CurrentChannelCenterFrequencyIndex.

Channel starting frequency is a starting frequency of a frequency band (or an operating class) in which the channel is located, and dot11CurrentChannelCenterFrequencyIndex is an index number of the channel.

In some embodiments of this application, the preset frequency segment includes a first frequency segment and a second frequency segment, the first frequency segment is a frequency segment smaller than a frequency segment granularity, and the second frequency segment is a frequency segment obtained after a frequency segment larger than the frequency segment granularity is divided at the frequency segment granularity.

The first communications device may first determine a frequency segment size of the BSS. If a frequency segment is less than the frequency segment granularity, a center frequency of the frequency segment is a center frequency corresponding to the preset frequency segment. If a frequency segment is greater than the frequency segment granularity, the original frequency segment is divided at the frequency segment granularity, to obtain at least two frequency segments obtained after the division, and a center frequency of each frequency segment obtained after the division is the center frequency corresponding to the preset frequency segment.

In some embodiments of this application, when the location of the operating channel of the BSS is at least one of the following frequency locations: 20 MHz, 40 MHz, and 80 MHz, the value of the first channel center frequency segment field is a center frequency used by a frequency segment obtained after division, and the value of the second channel center frequency segment field, the value of the third channel center frequency segment field, and the value of the fourth channel center frequency segment field are all 0, or when the location of the operating channel of the BSS is at least one of the following frequency locations: 160 MHz and 80+80 MHz, the value of the first channel center frequency segment field is a primary 80 MHz center frequency, the value of the second channel center frequency segment field is a secondary 80 MHz center frequency, and the value of the third channel center frequency segment field and the value of the fourth channel center frequency segment field are both 0, or when the location of the operating channel of the BSS is at least one of the following frequency locations: 240 MHz, 160+80 MHz, 80+160 MHz, and 80+80+80 MHz, the value of the first channel center frequency segment field is a primary 80 MHz center frequency, the value of the second channel center frequency segment field is a first secondary 80 MHz center frequency, the value of the third channel center frequency segment field is a second secondary 80 MHz center frequency, and the value of the fourth channel center frequency segment field is 0, or when the location of the operating channel of the BSS is at least one of the following frequency locations: 320 MHz, 160+160 MHz, 160+80+80 MHz, 80+80+160 MHz, and 80+80+80+80

MHz, the value of the first channel center frequency segment field is a primary 80 MHz center frequency, the value of the second channel center frequency segment field is a first secondary 80 MHz center frequency, the value of the third channel center frequency segment field is a second secondary 80 MHz center frequency, and the value of the fourth channel center frequency segment field is a third secondary 80 MHz center frequency.

For example, in this embodiment of this application, a bandwidth greater than 80 MHz is divided into a plurality of 80 MHz channels, and each CCFS is set to a center frequency of an 80 MHz channel. For 20 MHz, 40 MHz, and 80 MHz, CCFS0 is set to a center frequency of a total bandwidth, and CCFS1, CCFS3, and CCFS4 are set to 0. For a bandwidth mode greater than 80 MHz, first N (N=the total bandwidth/80 MHz) CCFSs are used to separately indicate a center frequency of each 80 MHz bandwidth. CCFS0 indicates a center frequency of a primary 80 MHz channel, and CCFS1 indicates a center frequency of a secondary 80 MHz channel. When a bandwidth is greater than 160 MHz, a primary 80 MHz channel and a first secondary 80 MHz channel form a 160 MHz channel.

In some embodiments of this application, the value of the first channel center frequency segment field, the value of the second channel center frequency segment field, the value of the third channel center frequency segment field, and the value of the fourth channel center frequency segment field are obtained using a center frequency corresponding to a frequency segment obtained after frequency values are sorted in ascending or descending order.

The first communications device sorts, in ascending or descending order, center frequencies corresponding to all preset frequency segments, and then the first communications device separately determines the value of the first channel center frequency segment field, the value of the second channel center frequency segment field, the value of the third channel center frequency segment field, and the value of the fourth channel center frequency segment field based on the center frequencies sorted in ascending or descending order. For example, four center frequencies sorted in ascending order may be respectively used as values of CCFS0, CCFS1, CCFS3, and CCFS4.

In some embodiments of this application, the first communications device may further reduce a frequency segment granularity. If the frequency segment granularity in the foregoing embodiment is 80 MHz, in this embodiment of this application, discontinuous channel aggregation may be further performed using 40 MHz as the frequency segment granularity. In this case, in the first frame generated by the first communications device, six channel center frequency segment fields need to be used to indicate the location of the operating channel of the BSS.

In some embodiments of this application, the first frame further includes a fifth channel center frequency segment field and a sixth channel center frequency segment field, and the first channel center frequency segment field, the second channel center frequency segment field, the third channel center frequency segment field, the fourth channel center frequency segment field, the fifth channel center frequency segment field, and the sixth channel center frequency segment field are used to indicate the location of the operating channel of the BSS.

EHT is used as a next-generation WI-FI standard, and a maximum bandwidth of the next-generation WI-FI standard is to be extended. For example, the maximum bandwidth may be extended to 240 MHz or 320 MHz. Therefore, a new frame structure format needs to be designed for the first frame after bandwidth extension, and in this embodiment of this application, the first communications device may generate the first frame. The first frame may include the following five fields: the channel bandwidth field and the four channel center frequency fields. The six channel center frequency fields include the first channel center frequency segment field, the second channel center frequency segment field, the third channel center frequency segment field, the fourth channel center frequency segment field, the fifth channel center frequency segment field, and the sixth channel center frequency segment field. The channel bandwidth field is used to indicate the BSS bandwidth, and the first channel center frequency segment field, the second channel center frequency segment field, the third channel center frequency segment field, the fourth channel center frequency segment field, the fifth channel center frequency segment field, and the sixth channel center frequency segment field are used to indicate the location of the operating channel of the BSS.

Figure 8:
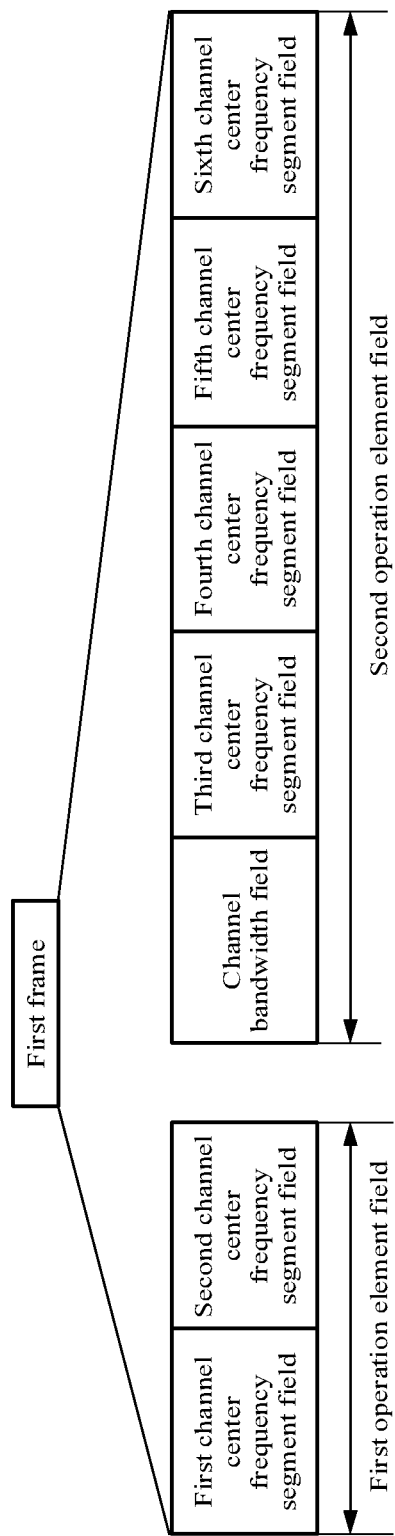
FIG. 8 is a schematic diagram of a frame structure of another first frame according to an embodiment of this application.

In some embodiments of this application, as shown in FIG. 8, the first channel center frequency segment field and the second channel center frequency segment field are in a first operation element field, the channel bandwidth field, the third channel center frequency segment field, the fourth channel center frequency segment field, the fifth channel center frequency segment field, and the sixth channel center frequency segment field are in a second operation element field, and the first operation element field and the second operation element field are located at different locations in the first frame.

In FIG. 8, the first frame may include two operation element fields: the first operation element field and the second operation element field. The first operation element field may be a VHT operation information field, and the first channel center frequency segment field and the second channel center frequency segment field are in the first operation element field. For example, the first channel center frequency segment field may be CCFS0, and the second channel center frequency segment field may be CCFS1. The channel bandwidth field, the third channel center frequency segment field, the fourth channel center frequency segment field, the fifth channel center frequency segment field, and the sixth channel center frequency segment field are in the second operation element field. The second operation element field may be further an EHT operation information field, the third channel center frequency segment field may be CCFS3, the fourth channel center frequency segment field may be CCFS4, the fifth channel center frequency segment field may be CCFS5, and the sixth channel center frequency segment field may be CCFS6. One channel bandwidth field and six channel center frequency segment fields may be carried in the first frame using two different operation element fields, to implement a BSS bandwidth indication when a maximum bandwidth exceeds 160 MHz.

Figure 9:
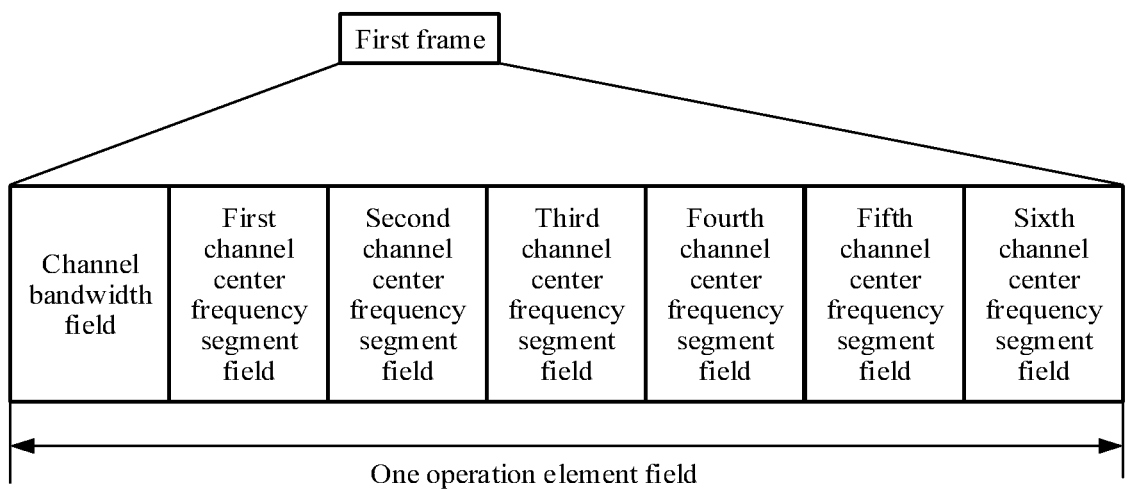
FIG. 9 is a schematic diagram of a frame structure of another first frame according to an embodiment of this application.

In some embodiments of this application, as shown in FIG. 9, the channel bandwidth field, the first channel center frequency segment field, the second channel center frequency segment field, the third channel center frequency segment field, the fourth channel center frequency segment field, the fifth channel center frequency segment field, and the sixth channel center frequency segment field are in a same operation element field, and the operation element field is in the first frame.

In FIG. 9, the first frame may include one operation element field, and the operation element field may be an EHT operation information field. One channel bandwidth field and six channel center frequency segment fields may be carried in the first frame using a same operation element field, to implement a BSS bandwidth indication when a maximum bandwidth exceeds 160 MHz.

In some embodiments of this application, a value of the first channel center frequency segment field, a value of the second channel center frequency segment field, a value of the third channel center frequency segment field, a value of the fourth channel center frequency segment field, a value of the fifth channel center frequency segment field, and a value of the sixth channel center frequency segment field are obtained using a value of a current channel center frequency indicator 0, a value of a current channel center frequency indicator 1, a value of a current channel center frequency indicator 2, a value of a current channel center frequency indicator 3, a value of a current channel center frequency indicator 4, and a value of a current channel center frequency indicator 5.

The first communications device first determines a value of a channel bandwidth field, determines a quantity of frequency segments, and determines the values of the six indicators based on the quantity of frequency segments and a center frequency indicator used by each frequency segment. The values of the six indicators include the value of the current channel center frequency indicator 0, the value of the current channel center frequency indicator 1, the value of the current channel center frequency indicator 2, the value of the current channel center frequency indicator 3, the value of the current channel center frequency indicator 4, and the value of the current channel center frequency indicator 5.

For example, the current channel center frequency indicator 0 may be dot11CurrentChannelCenterFrequencyIndex0, the current channel center frequency indicator 1 may be further dot11CurrentChannelCenterFrequencyIndex1, the current channel center frequency indicator 2 may be dot11CurrentChannelCenterFrequencyIndex2, and the current channel center frequency indicator 3 may be dot11CurrentChannelCenterFrequencyIndex3. The current channel center frequency indicator 4 may be further dot11CurrentChannelCenterFrequencyIndex4, and the current channel center frequency indicator 5 may be dot11CurrentChannelCenterFrequencyIndex5.

In some embodiments of this application, when the location of the operating channel of the BSS is the following frequency location: 160+80+40+40 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, the value of the fourth channel center frequency segment field is 0, the value of the fifth channel center frequency segment field is the value of the current channel center frequency indicator 2, and the value of the sixth channel center frequency segment field is the value of the current channel center frequency indicator 3, or when the location of the operating channel of the BSS is the following frequency location: 160+40+40+80 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, the value of the fourth channel center frequency segment field is the value of the current channel center frequency indicator 2, the value of the fifth channel center frequency segment field is the value of the current channel center frequency indicator 3, and the value of the sixth channel center frequency segment field is 0, or when the location of the operating channel of the BSS is the following frequency location: 160+40+40+40+40 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, the value of the fourth channel center frequency segment field is the value of the current channel center frequency indicator 2, the value of the fifth channel center frequency segment field is the value of the current channel center frequency indicator 3, and the value of the sixth channel center frequency segment field is the value of the current channel center frequency indicator 4, or when the location of the operating channel of the BSS is the following frequency location: 80+80+80+40+40 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, the value of the fourth channel center frequency segment field is 0, the value of the fifth channel center frequency segment field is the value of the current channel center frequency indicator 3, and the value of the sixth channel center frequency segment field is the value of the current channel center frequency indicator 4, or when the location of the operating channel of the BSS is the following frequency location: 80+80+40+40+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, the value of the fourth channel center frequency segment field is the value of the current channel center frequency indicator 3, the value of the fifth channel center frequency segment field is the value of the current channel center frequency indicator 4, and the value of the sixth channel center frequency segment field is 0, or when the location of the operating channel of the BSS is the following frequency location: 80+80+40+40+40+40 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, the value of the fourth channel center frequency segment field is the value of the current channel center frequency indicator 3, the value of the fifth channel center frequency segment field is the value of the current channel center frequency indicator 4, and the value of the sixth channel center frequency segment field is the value of the current channel center frequency indicator 5, or when the location of the operating channel of the BSS is the following frequency location: 160+40+40 MHz, if a value of a current primary channel is greater than the value of the current channel center frequency indicator 0, the value of the first channel center frequency segment field is the value of the current channel center frequency indicator 0 plus 8, or if a value of a current primary channel is less than or equal to the value of the current channel center frequency indicator 0, the value of the first channel center frequency segment field is the value of the current channel center frequency indicator 0 minus 8, and the value of the second channel center frequency segment field is the value of the current channel center frequency indicator 0, the value of the third channel center frequency segment field is the value of the current channel center frequency indicator 1, the value of the fourth channel center frequency segment field is the value of the current channel center frequency indicator 2, the value of the fifth channel center frequency segment field is 0, and the value of the sixth channel center frequency segment field is 0, or when the location of the operating channel of the BSS is the following frequency location: 80+80+40+40 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, the value of the fourth channel center frequency segment field is the value of the current channel center frequency indicator 3, the value of the fifth channel center frequency segment field is 0, and the value of the sixth channel center frequency segment field is 0.

It should be noted that after the first communications device determines the location of the operating channel of the BSS, the first communications device may respectively determine the value of the first channel center frequency segment field, the value of the second channel center frequency segment field, the value of the third channel center frequency segment field, the value of the fourth channel center frequency segment field, the value of the fifth channel center frequency segment field, and the value of the sixth channel center frequency segment field based on the value of the current channel center frequency indicator 0, the value of the current channel center frequency indicator 1, the value of the current channel center frequency indicator 2, the value of the current channel center frequency indicator 3, the value of the current channel center frequency indicator 4, and the value of the current channel center frequency indicator 5, and then include the value of the first channel center frequency segment field, the value of the second channel center frequency segment field, the value of the third channel center frequency segment field, the value of the fourth channel center frequency segment field, the value of the fifth channel center frequency segment field, and the value of the sixth channel center frequency segment field in the first frame. The values of the six channel center frequency segment fields in the first frame may be indicated using the four current channel center frequency indicators.

In some embodiments of this application, when the location of the operating channel of the BSS is at least one of the following frequency locations: 20 MHz, 40 MHz, 80 MHz, 160 MHz, 240 MHz, and 320 MHz, the current channel center frequency indicator 0 is used to indicate a channel center frequency, or when the location of the operating channel of the BSS is at least one of the following frequency locations: 80+80 MHz, 160+160 MHz, 160+80+80 MHz, 80+80+160 MHz, 80+80+80+80 MHz, 160+80+40+40 MHz, 160+40+40+80 MHz, 160+40+40+40+40 MHz, 80+80+80+40+40 MHz, 80+80+40+40+80 MHz, 80+80+40+40+40+40 MHz, 160+80 MHz, 80+160 MHz, 80+80+80 MHz, 160+40+40 MHz, and 80+80+40+40 MHz, the current channel center frequency indicator 0 is used to indicate a center frequency of a frequency segment that includes a primary channel, and + indicates that a total bandwidth includes two or more different frequency segments, or when the location of the operating channel of the BSS is at least one of the following frequency locations: 20 MHz, 40 MHz, 80 MHz, 160 MHz, 240 MHz, and 320 MHz, the value of the current channel center frequency indicator 1 is 0, or when the location of the operating channel of the BSS is at least one of the following frequency locations: 80+80 MHz, 160+160 MHz, 160+80 MHz, and 80+160 MHz, the current channel center frequency indicator 1 is used to indicate a center frequency of a frequency segment that does not include a primary channel, or when the location of the operating channel of the BSS is the following frequency location: 160+80+80 MHz, the current channel center frequency indicator 1 is used to indicate a center frequency of one of two 80 MHz frequency segments, or when the location of the operating channel of the BSS is the following frequency location: 80+80+160 MHz, the current channel center frequency indicator 1 is used to indicate a center frequency of an 80 MHz frequency segment that does not include a primary channel, or when the location of the operating channel of the BSS is at least one of the following frequency locations: 80+80+80+80 MHz, 80+80+80 MHz, 80+80+80+40+40 MHz, 80+80+40+40+80 MHz, 80+80+40+40+40+40 MHz, and 80+80+40+40 MHz, the current channel center frequency indicator 1 is used to indicate a center frequency of a frequency segment of a secondary 80 MHz channel, or when the location of the operating channel of the BSS is the following frequency location: 160+80+40+40 MHz, the current channel center frequency indicator 1 is used to indicate a center frequency of a frequency segment of an 80 MHz channel, or when the location of the operating channel of the BSS is at least one of the following frequency locations: 160+40+40+80 MHz and 160+40+40 MHz, the current channel center frequency indicator 1 is used to indicate a center frequency of one of two 40 MHz frequency segments, or when the location of the operating channel of the BSS is the following frequency location: 160+40+40+40+40 MHz, the current channel center frequency indicator 1 is used to indicate a center frequency of one of four 40 MHz frequency segments, or when the location of the operating channel of the BSS is at least one of the following frequency locations: 20 MHz, 40 MHz, 80 MHz, 160 MHz, 80+80 MHz, 320 MHz, 160+160 MHz, 240 MHz, 160+80 MHz, and 80+160 MHz, the value of the current channel center frequency indicator 2 is 0, or when the location of the operating channel of the BSS is the following frequency location: 160+80+80 MHz, the current channel center frequency indicator 2 is used to indicate a center frequency of a frequency segment that is in two 80 MHz frequency segments and that is other than a frequency segment indicated by the current channel center frequency indicator 1, or when the location of the operating channel of the BSS is the following frequency location: 80+80+160 MHz, the current channel center frequency indicator 2 is used to indicate a center frequency of a 160 MHz frequency segment, or when the location of the operating channel of the BSS is the following frequency location: 80+80+80+80 MHz, the current channel center frequency indicator 2 is used to indicate a center frequency of a frequency segment other than frequency segments indicated by the current channel center frequency indicator 0 and the current channel center frequency indicator 1, or when the location of the operating channel of the BSS is the following frequency location: 160+80+40+40 MHz, the current channel center frequency indicator 2 is used to indicate a center frequency of one of two 40 MHz frequency segments, or when the location of the operating channel of the BSS is the following frequency location: 160+40+40+80 MHz, the current channel center frequency indicator 2 is used to indicate a center frequency of a frequency segment other than a frequency segment indicated by the current channel center frequency indicator 1, or when the location of the operating channel of the BSS is the following frequency location: 160+40+40+40+40 MHz, the current channel center frequency indicator 2 is used to indicate a center frequency of a frequency segment other than a frequency segment indicated by the current channel center frequency indicator 1, or when the location of the operating channel of the BSS is the following frequency location: 80+80+80+40+40 MHz, the current channel center frequency indicator 2 is used to indicate a center frequency of a frequency segment other than frequency segments indicated by the current channel center frequency indicator 0 and the current channel center frequency indicator 1, or when the location of the operating channel of the BSS is the following frequency location: 80+80+40+40+80 MHz, the current channel center frequency indicator 2 is used to indicate a center frequency of one of two 40 MHz frequency segments, or when the location of the operating channel of the BSS is the following frequency location: 80+80+40+40+40+40 MHz, the current channel center frequency indicator 2 is used to indicate a center frequency of one of four 40 MHz frequency segments, or when the location of the operating channel of the BSS is the following frequency location: 80+80+80 MHz, the current channel center frequency indicator 2 is used to indicate a center frequency of a frequency segment other than frequency segments indicated by the current channel center frequency indicator 0 and the current channel center frequency indicator 1, or when the location of the operating channel of the BSS is the following frequency location: 160+40+40 MHz, the current channel center frequency indicator 2 is used to indicate a center frequency of a frequency segment other than a frequency segment indicated by the current channel center frequency indicator 1, or when the location of the operating channel of the BSS is the following frequency location: 80+80+40+40 MHz, the current channel center frequency indicator 2 is used to indicate a center frequency of one of two 40 MHz frequency segments, or when the location of the operating channel of the BSS is the following frequency location: 80+80+80+80 MHz, the current channel center frequency indicator 3 is used to indicate a center frequency of a frequency segment other than frequency segments indicated by the current channel center frequency indicator 0, the current channel center frequency indicator 1, and the current channel center frequency indicator 2, or when the location of the operating channel of the BSS is the following frequency location: 160+80+40+40 MHz, the current channel center frequency indicator 3 is used to indicate a center frequency of a 40 MHz frequency segment other than a frequency segment indicated by the current channel center frequency indicator 2, or when the location of the operating channel of the BSS is the following frequency location: 160+40+40+80 MHz, the current channel center frequency indicator 3 is used to indicate a center frequency of an 80 MHz frequency segment, or when the location of the operating channel of the BSS is the following frequency location: 160+40+40+40+40 MHz, the current channel center frequency indicator 3 is used to indicate a center frequency of a 40 MHz frequency segment other than frequency segments indicated by the current channel center frequency indicator 0, the current channel center frequency indicator 1, and the current channel center frequency indicator 2, or when the location of the operating channel of the BSS is the following frequency location: 80+80+80+40+40 MHz, the current channel center frequency indicator 3 is used to indicate a center frequency of one of two 40 MHz frequency segments, or when the location of the operating channel of the BSS is the following frequency location: 80+80+40+40+80 MHz, the current channel center frequency indicator 3 is used to indicate a center frequency of a 40 MHz frequency segment other than a frequency segment indicated by the current channel center frequency indicator 2, or when the location of the operating channel of the BSS is the following frequency location: 80+80+40+40+40+40 MHz, the current channel center frequency indicator 3 is used to indicate a center frequency of a 40 MHz frequency segment other than a frequency segment indicated by the current channel center frequency indicator 2, or when the location of the operating channel of the BSS is the following frequency location: 80+80+40+40 MHz, the current channel center frequency indicator 3 is used to indicate a center frequency of a 40 MHz frequency segment other than a frequency segment indicated by the current channel center frequency indicator 2, or when the location of the operating channel of the BSS is at least one of the following frequency locations: 20 MHz, 40 MHz, 80 MHz, 160 MHz, 80+80 MHz, 320 MHz, 160+160 MHz, 160+80+80 MHz, 80+80+160 MHz, 240 MHz, 160+80 MHz, 80+160 MHz, 160+40+40 MHz, and 80+80+80 MHz, the value of the current channel center frequency indicator 3 is 0, or when the location of the operating channel of the BSS is the following frequency location: 160+40+40+40+40 MHz, the current channel center frequency indicator 4 is used to indicate a center frequency of a frequency segment other than frequency segments indicated by the current channel center frequency indicator 1, the current channel center frequency indicator 2, and the current channel center frequency indicator 3, or when the location of the operating channel of the BSS is the following frequency location: 80+80+80+40+40 MHz, the current channel center frequency indicator 4 is used to indicate a center frequency of a 40 MHz frequency segment other than a frequency segment indicated by the current channel center frequency indicator 3, or when the location of the operating channel of the BSS is the following frequency location: 80+80+40+40+80 MHz, the current channel center frequency indicator 4 is used to indicate a center frequency of an 80 MHz frequency segment other than frequency segments indicated by the current channel center frequency indicator 0 and the current channel center frequency indicator 1, or when the location of the operating channel of the BSS is the following frequency location: 80+80+40+40+40+40 MHz, the current channel center frequency indicator 4 is used to indicate a center frequency of a 40 MHz frequency segment other than frequency segments indicated by the current channel center frequency indicator 2 and the current channel center frequency indicator 3, or when the location of the operating channel of the BSS is at least one of the following frequency locations: 20 MHz, 40 MHz, 80 MHz, 160 MHz, 80+80 MHz, 320 MHz, 160+160 MHz, 160+80+80 MHz, 80+80+ 160 MHz, 160+80+40+40 MHz, 160+40+40+80 MHz, 240 MHz, 160+80 MHz, 80+160 MHz, 160+40+40 MHz, 80+80+40+40 MHz, and 80+80+80 MHz, the value of the current channel center frequency indicator 4 is 0, or when the location of the operating channel of the BSS is the following frequency location: 80+80+40+40+40+40 MHz, the current channel center frequency indicator 5 is used to indicate a center frequency of a 40 MHz frequency segment other than frequency segments indicated by the current channel center frequency indicator 2, the current channel center frequency indicator 3, and the current channel center frequency indicator 4, or when the location of the operating channel of the BSS is at least one of the following frequency locations: 20 MHz, 40 MHz, 80 MHz, 160 MHz, 80+80 MHz, 320 MHz, 160+160 MHz, 160+80+80 MHz, 80+80+ 160 MHz, 160+80+40+40 MHz, 160+40+40+80 MHz, 160+ 40+40+40+40 MHz, 80+80+80+40+40 MHz, 80+80+40+ 40+80 MHz, 240 MHz, 160+80 MHz, 80+160 MHz, 160+ 40+40 MHz, 80+80+40+40 MHz, and 80+80+80 MHz, the value of the current channel center frequency indicator 5 is 0.

It should be noted that after the first communications device determines the location of the operating channel of the BSS, the first communications device may separately determine the value of the current channel center frequency indicator 0, the value of the current channel center frequency indicator 1, the value of the current channel center frequency indicator 2, the value of the current channel center frequency indicator 3, the value of the current channel center frequency indicator 4, and the value of the current channel center frequency indicator 5 based on a quantity of frequency segments of the operating bandwidth of the BSS and a center frequency of each frequency segment. The center frequencies of the frequency segments and the current channel center frequency indicators may be determined using a preset mapping relationship.

302: The first communications device sends the first frame.

In this embodiment of this application, after the first communications device generates the first frame, the first communications device may send the first frame through a communications network. For example, if the first communications device and the second communications device are in a same communications network, the first communications device may send the first frame to the second communications device. For details about descriptions of a frame structure of the first frame, refer to the detailed descriptions of the foregoing content.

For example, the first frame may be a beacon frame, and is periodically sent by an AP. The beacon frame is used to indicate the BSS bandwidth and the location of the operating channel of the BSS, that is, information about a maximum operating bandwidth supported by the BSS such that a station that receives the beacon frame is enabled to learn of a size and the location of the operating channel of the BSS. The AP and the STA between two adjacent beacon frames send a downlink or uplink data frame in a time division manner through contention, and the data frame may be sent using a channel that does not exceed the maximum operating bandwidth supported by the BSS. BSS bandwidth information may alternatively be sent using another management frame, for example, an association response frame, in addition to a beacon frame. For example, an AP of an EHT notifies, using EHT operation information, the station that the maximum bandwidth supported by the BSS to which the AP belongs is 320 MHz. In this case, the AP may communicate with the station using a channel whose bandwidth does not exceed 320 MHz, and the bandwidth may be one of 20 MHz, 40 MHz, 80 MHz, 160 MHz, 240 MHz, or 320 MHz. A bandwidth used each time the AP sends data is determined based on a clear channel assessment (CCA) result before the AP sends the data.

303: The second communications device receives the first frame from the first communications device.

In this embodiment of this application, if the first communications device and the second communications device are located in a same communications network, the first communications device may send the first frame to the second communications device, and the second communications device may receive the first frame using the communications network.

The first frame received by the second communications device may include a management frame. For example, the first frame may be a beacon frame, or the first frame is another management frame. For example, the first frame may be an association response frame. A specific implementation of the first frame may be determined with reference to an application scenario.

304: The second communications device parses the first frame to obtain the channel bandwidth field, the first channel center frequency segment field, the second channel center frequency segment field, the third channel center frequency segment field, and the fourth channel center frequency segment field.

After generating the first frame, the first communications device sends the first frame to the second communications device. After receiving the first frame, the second communications device may parse out the channel bandwidth field, the first channel center frequency segment field, the second channel center frequency segment field, the third channel center frequency segment field, and the fourth channel center frequency segment field from the first frame in a preconfigured frame structure parsing manner, and separately obtain a value of each field.

305: The second communications device determines the BSS bandwidth and the location of the operating channel of the BSS based on the channel bandwidth field, the first channel center frequency segment field, the second channel center frequency segment field, the third channel center frequency segment field, and the fourth channel center frequency segment field.

In this embodiment of this application, after the second communications device determines the values of the channel bandwidth field, the first channel center frequency segment field, the second channel center frequency segment field, the third channel center frequency segment field, and the fourth channel center frequency segment field, the second communications device may determine a size and the location of the operating channel of the BSS in a preconfigured frame parsing manner, to determine a specific BSS bandwidth indication of the first communications device when a maximum bandwidth exceeds 160 MHz.

In some embodiments of this application, when the value of the second channel center frequency segment field is equal to 0, the value of the third channel center frequency segment field is equal to 0, and the value of the fourth channel center frequency segment field is equal to 0, the BSS bandwidth is 20 MHz, 40 MHz, or 80 MHz, or when the value of the second channel center frequency segment field is greater than 0, |the value of the second channel center frequency segment field–the value of the first channel center frequency segment field| is equal to 8, the value of the third channel center frequency segment field is equal to 0, and the value of the fourth channel center frequency segment field is equal to 0, the BSS bandwidth is 160 MHz, or when the value of the second channel center frequency segment field is greater than 0, |the value of the second channel center frequency segment field–the value of the first channel center frequency segment field| is greater than 16, the value of the third channel center frequency segment field is equal to 0, and the value of the fourth channel center frequency segment field is equal to 0, the BSS bandwidth is 80+80 MHz, or when the value of the second channel center frequency segment field is greater than 0, the value of the third channel center frequency segment field is greater than 0, |the value of the second channel center frequency segment field–the value of the first channel center frequency segment field| is equal to 8, |the value of the third channel center frequency segment field–the value of the second channel center frequency segment field| is equal to 16, and the value of the fourth channel center frequency segment field is equal to 0, the BSS bandwidth is 320 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is equal to 8, |the value of the fourth channel center frequency segment field–the value of the third channel center frequency segment field| is equal to 8, and |the value of the fourth channel center frequency segment field–the value of the second channel center frequency segment field| is greater than 32, the BSS bandwidth is 160+160 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is equal to 8, |the value of the third channel center frequency segment field–the value of the second channel center frequency segment field| is greater than 24, |the value of the fourth channel center frequency segment field–the value of the second channel center frequency segment field| is greater than 24, and |the value of the fourth channel center frequency segment field–the value of the third channel center frequency segment field| is greater than 16, the BSS bandwidth is 160+80+80 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is greater than 16, |the value of the fourth channel center frequency segment field–the value of the first channel center frequency segment field| is greater than 24, |the value of the fourth channel center frequency segment field–the value of the second channel center frequency segment field| is greater than 24, and |the value of the fourth channel center frequency segment field–the value of the third channel center frequency segment field| is equal to 8, the BSS bandwidth is 80+80+160 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is greater than 16, |the value of the fourth channel center frequency segment field–the value of the first channel center frequency segment field| is greater than 16, |the value of the fourth channel center frequency segment field–the value of the second channel center frequency segment field| is greater than 16, and |the value of the fourth channel center frequency segment field–the value of the third channel center frequency segment field| is greater than 16, the BSS bandwidth is 80+80+80+80 MHz, or when the value of the second channel center frequency segment field is greater than 0, the value of the third channel center frequency segment field is greater than 0, |the value of the second channel center frequency segment field–the value of the first channel center frequency segment field| is equal to 8, |the value of the third channel center frequency segment field–the value of the second channel center frequency segment field| is equal to 8, and the value of the fourth channel center frequency segment field is equal to 0, the BSS bandwidth is 240 MHz, or when the value of the second channel center frequency segment field is greater than 0, the value of the third channel center frequency segment field is greater than 0, |the value of the second channel center frequency segment field–the value of the first channel center frequency segment field| is equal to 8, |the value of the third channel center frequency segment field–the value of the second channel center frequency segment field| is greater than 24, and the value of the fourth channel center frequency segment field is equal to 0, the BSS bandwidth is 160+80 MHz, or when the value of the third channel center frequency segment field is greater than 0, the value of the fourth channel center frequency segment field is greater than 0, |the value of the fourth channel center frequency segment field–the value of the third channel center frequency segment field| is equal to 8, |the value of the fourth channel center frequency segment field–the value of the first channel center frequency segment field| is greater than 24, and the value of the second channel center frequency segment field is equal to 0, the BSS bandwidth is 80+160 MHz, or when the value of the second channel center frequency segment field is greater than 0, the value of the third channel center frequency segment field is greater than 0, |the value of the second channel center frequency segment field–the value of the first channel center frequency segment field| is greater than 16, |the value of the third channel center frequency segment field–the value of the first channel center frequency segment field| is greater than 16, |the value of the third channel center frequency segment field–the value of the second channel center frequency segment field| is greater than 16, and the value of the fourth channel center frequency segment field is equal to 0, the BSS bandwidth is 80+80+80 MHz, where || is an absolute value sign, and – is a minus sign.

Further, after the second communications device determines the values of the channel bandwidth field, the first channel center frequency segment field, the second channel center frequency segment field, the third channel center frequency segment field, and the fourth channel center frequency segment field, the second communications device may determine a size and the location of the operating channel of the BSS using the foregoing calculation formula, to determine a specific BSS bandwidth indication of the first communications device when a maximum bandwidth exceeds 160 MHz. For example, the second communications device first determines that the value of the second channel center frequency segment field is greater than 0, |the value of the second channel center frequency segment field−the value of the first channel center frequency segment field| is equal to 8, the value of the third channel center frequency segment field is equal to 0, and the value of the fourth channel center frequency segment field is equal to 0. When the foregoing conditions are met, the second communications device determines that the BSS bandwidth is 160 MHz.

In some embodiments of this application, the second communications device may determine the BSS bandwidth in the following manner. For example, when the value of the second channel center frequency segment field is equal to 0, the value of the third channel center frequency segment field is equal to 0, and the value of the fourth channel center frequency segment field is equal to 0, the BSS bandwidth is 20 MHz, 40 MHz, or 80 MHz, or when the value of the second channel center frequency segment field is greater than 0, |the value of the second channel center frequency segment field−the value of the first channel center frequency segment field| is equal to 16, the value of the third channel center frequency segment field is equal to 0, and the value of the fourth channel center frequency segment field is equal to 0, the BSS bandwidth is 160 MHz, or when the value of the second channel center frequency segment field is greater than 0, |the value of the second channel center frequency segment field−the value of the first channel center frequency segment field| is greater than 16, the value of the third channel center frequency segment field is equal to 0, and the value of the fourth channel center frequency segment field is equal to 0, the BSS bandwidth is 80+80 MHz, or when the value of the second channel center frequency segment field is greater than 0, the value of the third channel center frequency segment field is greater than 0, the value of the fourth channel center frequency segment field is greater than 0, |the value of the second channel center frequency segment field−the value of the first channel center frequency segment field| is equal to 16, |the value of the fourth channel center frequency segment field−the value of the third channel center frequency segment field| is equal to 16, and |the value of the third channel center frequency segment field+the value of the fourth channel center frequency segment field−the value of the first channel center frequency segment field−the value of the second channel center frequency segment field| is equal to 64, the BSS bandwidth is 320 MHz, or when the value of the second channel center frequency segment field is greater than 0, the value of the third channel center frequency segment field is greater than 0, the value of the fourth channel center frequency segment field is greater than 0, |the value of the second channel center frequency segment field−the value of the first channel center frequency segment field| is equal to 16, |the value of the fourth channel center frequency segment field−the value of the third channel center frequency segment field| is equal to 16, and |the value of the third channel center frequency segment field+the value of the fourth channel center frequency segment field−the value of the first channel center frequency segment field−the value of the second channel center frequency segment field| is greater than 64, the BSS bandwidth is 160+160 MHz, or when the value of the second channel center frequency segment field is greater than 0, the value of the third channel center frequency segment field is greater than 0, the value of the fourth channel center frequency segment field is greater than 0, |the value of the second channel center frequency segment field−the value of the first channel center frequency segment field| is equal to 16, and |the value of the fourth channel center frequency segment field−the value of the third channel center frequency segment field| is greater than 16, the BSS bandwidth is 160+80+80 MHz, or when the value of the second channel center frequency segment field is greater than 0, the value of the third channel center frequency segment field is greater than 0, the value of the fourth channel center frequency segment field is greater than 0, |the value of the second channel center frequency segment field−the value of the first channel center frequency segment field| is greater than 16, |the value of the fourth channel center frequency segment field−the value of the third channel center frequency segment field| is equal to 16, the BSS bandwidth is 80+80+160 MHz, or when the value of the second channel center frequency segment field is greater than 0, the value of the third channel center frequency segment field is greater than 0, the value of the fourth channel center frequency segment field is greater than 0, |the value of the second channel center frequency segment field−the value of the first channel center frequency segment field| is greater than 16, |the value of the fourth channel center frequency segment field−the value of the third channel center frequency segment field| is greater than 16, and |the value of the third channel center frequency segment field+the value of the fourth channel center frequency segment field−the value of the first channel center frequency segment field−the value of the second channel center frequency segment field| is greater than 64, the BSS bandwidth is 80+80+80+80 MHz, or when the value of the second channel center frequency segment field is greater than 0, the value of the third channel center frequency segment field is greater than 0, |the value of the second channel center frequency segment field−the value of the first channel center frequency segment field| is equal to 16, 12*the value of the third channel center frequency segment field−the value of the second channel center frequency segment field−the value of the first channel center frequency segment field| is equal to 48, and the value of the fourth channel center frequency segment field is equal to 0, the BSS bandwidth is 240 MHz, or when the value of the second channel center frequency segment field is greater than 0, the value of the third channel center frequency segment field is greater than 0, |the value of the second channel center frequency segment field−the value of the first channel center frequency segment field| is equal to 16, |2*the value of the third channel center frequency segment field−the value of the second channel center frequency segment field−the value of the first channel center frequency segment field| is greater than 48, and the value of the fourth channel center frequency segment field is equal to 0, the BSS bandwidth is 160+80 MHz, or when the value of the second channel center frequency segment field is greater than 0, the value of the third channel center frequency segment field is greater than 0, |the value of the third channel center frequency segment field−the value of the second channel center frequency segment field| is equal to 16, |2*the value of the first channel center frequency segment field−the value of the second channel center frequency segment field−the value of the third channel center frequency segment field| is greater than 48, and the value of the fourth channel center frequency segment field is equal to 0, the BSS bandwidth is 80+160 MHz, or when the value of the second channel center frequency segment field is greater than 0, the value of the third channel center frequency segment field is greater than 0, |the value of the second channel center frequency segment field–the value of the first channel center frequency segment field| is greater than 16, |the value of the third channel center frequency segment field–the value of the second channel center frequency segment field| is greater than 16, and the value of the fourth channel center frequency segment field is equal to 0, the BSS bandwidth is 80+80+80 MHz, where || is an absolute value sign, – is a minus sign, + is a plus sign, and * is a multiplication sign.

Further, after the second communications device determines the values of the channel bandwidth field, the first channel center frequency segment field, the second channel center frequency segment field, the third channel center frequency segment field, and the fourth channel center frequency segment field, the second communications device may determine a size and the location of the operating channel of the BSS using the foregoing calculation formula, to determine a specific BSS bandwidth indication of the first communications device when a maximum bandwidth exceeds 160 MHz.

In some embodiments of this application, the bandwidth information indication method provided in this embodiment of this application further includes parsing, by the second communications device, the first frame to obtain a channel bandwidth field, a first channel center frequency segment field, a second channel center frequency segment field, a third channel center frequency segment field, a fourth channel center frequency segment field, a fifth channel center frequency segment field, and a sixth channel center frequency segment field, and determining, by the second communications device, a BSS bandwidth and a location of an operating channel of a BSS based on the channel bandwidth field, the first channel center frequency segment field, the second channel center frequency segment field, the third channel center frequency segment field, the fourth channel center frequency segment field, the fifth channel center frequency field, and the sixth channel center frequency field.

The first communications device may further reduce a frequency segment granularity. If the frequency segment granularity in the foregoing embodiment is 80 MHz, in this embodiment of this application, discontinuous channel aggregation may be further performed using 40 MHz as the frequency segment granularity. In this case, in the first frame generated by the first communications device, six channel center frequency segment fields need to be used to indicate the location of the operating channel of the BSS. The second communications device obtains the first channel center frequency segment field, the second channel center frequency segment field, the third channel center frequency segment field, the fourth channel center frequency segment field, the fifth channel center frequency segment field, and the sixth channel center frequency segment field from the first frame and then determines the BSS bandwidth indicated by the first communications device.

In some embodiments of this application, when the value of the second channel center frequency segment field is greater than 0, the value of the third channel center frequency segment field is greater than 0, the value of the fifth channel center frequency segment field is greater than 0, the value of the sixth channel center frequency segment field is greater than 0, |the value of the second channel center frequency segment field–the value of the first channel center frequency segment field| is equal to 8, and the value of the fourth channel center frequency segment field is equal to 0, the BSS bandwidth is 160+80+40+40 MHz, or when the value of the second channel center frequency segment field is greater than 0, the value of the third channel center frequency segment field is greater than 0, the value of the fourth channel center frequency segment field is greater than 0, the value of the fifth channel center frequency segment field is greater than 0, |the value of the second channel center frequency segment field–the value of the first channel center frequency segment field| is equal to 8, and the value of the sixth channel center frequency segment field is equal to 0, the BSS bandwidth is 160+40+40+80 MHz, or when the value of the second channel center frequency segment field is greater than 0, the value of the third channel center frequency segment field is greater than 0, the value of the fourth channel center frequency segment field is greater than 0, the value of the fifth channel center frequency segment field is greater than 0, the value of the sixth channel center frequency segment field is greater than 0, |the value of the second channel center frequency segment field–the value of the first channel center frequency segment field| is equal to 8, and the BSS bandwidth is 160+40+40+40+40 MHz, or when the value of the second channel center frequency segment field is greater than 0, the value of the third channel center frequency segment field is greater than 0, the value of the fifth channel center frequency segment field is greater than 0, the value of the sixth channel center frequency segment field is greater than 0, |the value of the second channel center frequency segment field–the value of the first channel center frequency segment field| is greater than 16, and the value of the fourth channel center frequency segment field is equal to 0, the BSS bandwidth is 80+80+80+40+40 MHz, or when the value of the second channel center frequency segment field is greater than 0, the value of the third channel center frequency segment field is greater than 0, the value of the fourth channel center frequency segment field is greater than 0, the value of the fifth channel center frequency segment field is greater than 0, |the value of the second channel center frequency segment field–the value of the first channel center frequency segment field| is greater than 16, and the value of the sixth channel center frequency segment field is equal to 0, the BSS bandwidth is 80+80+40+40+80 MHz, or when the value of the second channel center frequency segment field is greater than 0, the value of the third channel center frequency segment field is greater than 0, the value of the fourth channel center frequency segment field is greater than 0, the value of the fifth channel center frequency segment field is greater than 0, the value of the sixth channel center frequency segment field is greater than 0, |the value of the second channel center frequency segment field–the value of the first channel center frequency segment field| is greater than 16, and the BSS bandwidth is 80+80+40+40+40+40 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is equal to 8, the value of the fifth channel center frequency segment field is equal to 0, and the value of the sixth channel center frequency segment field is equal to 0, the BSS bandwidth is 160+40+40 MHz, or when the value of the second channel center frequency segment field is greater than 0, the value of the third channel center frequency segment field is greater than 0, the value of the fourth channel center frequency segment field is greater than 0, |the value of the second channel center frequency segment field–the value of the first channel center frequency segment field| is greater than 16, the value of the fifth channel center frequency segment field is equal to 0, and the value of the sixth channel center frequency segment field is equal to 0, the BSS bandwidth is 80+80+40+40 MHz, where ‖ is an absolute value sign, and − is a minus sign.

Further, after the second communications device determines the values of the channel bandwidth field, the first channel center frequency segment field, the second channel center frequency segment field, the third channel center frequency segment field, the fourth channel center frequency segment field, the fifth channel center frequency segment field, and the sixth channel center frequency segment field, the second communications device may determine a size and the location of the operating channel of the BSS using the foregoing calculation formula, to determine a specific BSS bandwidth indication of the first communications device when a maximum bandwidth exceeds 160 MHz.

It can be learned from descriptions of examples of the foregoing embodiments, the first communications device first generates first frame, where the first frame may include the following fields: the channel bandwidth field, the first channel center frequency segment field, the second channel center frequency segment field, the third channel center frequency segment field, and the fourth channel center frequency segment field, the channel bandwidth field is used to indicate the BSS bandwidth, and the first channel center frequency segment field, the second channel center frequency segment field, the third channel center frequency segment field, and the fourth channel center frequency segment field are used to indicate the location of the operating channel of the BSS, the first communications device sends the first frame. For example, the second communications device receives the first frame. In this embodiment of this application, because the first frame generated by the first communications device includes four channel center frequency segment fields, and the four channel center frequency segment fields may indicate a BSS bandwidth greater than 160 MHz and the location of the operating channel of the BSS, a BSS bandwidth indication when a maximum bandwidth exceeds 160 MHz can be implemented.

Figure 10:
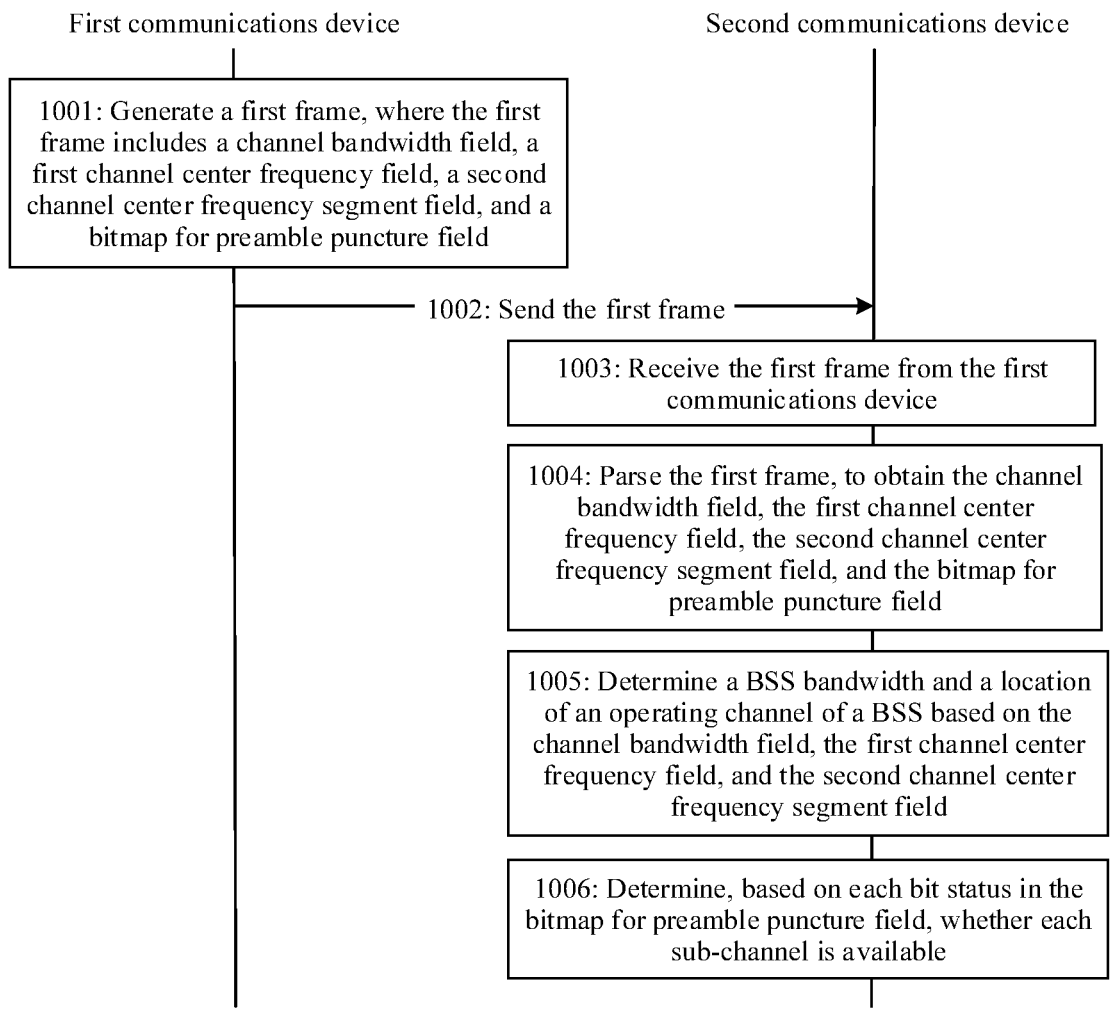
FIG. 10 is another schematic interaction flowchart between a terminal device and a network device according to an embodiment of this application.

FIG. 10 is a schematic interaction flowchart between a terminal device and a network device according to an embodiment of this application. This embodiment of this application provides a bandwidth information indication method, including the following steps.

1001: A first communications device generates a first frame, where the first frame includes a channel bandwidth field, a first channel center frequency segment field, a second channel center frequency segment field, and a bitmap for preamble puncture field.

The channel bandwidth field is used to indicate a BSS bandwidth, and the first channel center frequency segment field and the second channel center frequency segment field are used to indicate a location of an operating channel of a BSS.

In this embodiment of this application, for a structure description of the first frame by the first communications device, refer to the foregoing embodiment. A difference from the foregoing embodiment is that the first frame includes two channel center frequency fields: the first channel center frequency segment field and the second channel center frequency segment field. In addition, the first frame further includes a bitmap for preamble puncture field, and each bit status in the bitmap for preamble puncture field is used to indicate whether a subchannel is available. When the first communications device supports preamble puncture (Preamble puncture), the first frame may further include one bitmap for preamble puncture field such that a second communications device determines, based on a value of each bitmap for preamble puncture field, whether all subchannels are available.

For example, when the BSS works in some frequency bands, after an interference signal is detected on a channel, the channel cannot be used for communication within a period of time. In this case, if the BSS can be established only in a fixed bandwidth mode such as 20 MHz, 40 MHz, 80 MHz, or 160 (80+80) MHz, after a secondary channel is unavailable, the BSS is forced to reduce an operating bandwidth. For example, after a secondary 20 MHz channel of a 160 MHz BSS is unavailable, only a primary 20 MHz channel can be used for communication, and a bandwidth is greatly reduced. In this embodiment of this application, the BSS is allowed to be established in a preamble puncture mode. In this scenario mentioned above, the BSS only needs to send no data on the 20 MHz channel, and can still use the remaining 140 MHz channel for communication. Because only some secondary channels are punctured in 80 MHz or 160 (80+80) MHz during preamble puncture, and a channel location does not change, a high-throughput (high-throughput, HT) operation information field and a VHT operation information field may still be used to indicate an operating channel of a BSS to which an AP belongs. However, in addition, a bitmap is further needed to indicate which 20 MHz secondary channels are unavailable. In this embodiment of this application, a bit in HE operation element or HT operation information is used as bitmap for preamble puncture to indicate a channel usage status when the BSS works in a preamble puncture mode.

1002: The first communications device sends the first frame.

In this embodiment of this application, after the first communications device generates the first frame, the first communications device may send the first frame through a communications network. For example, if the first communications device and the second communications device are in a same communications network, the first communications device may send the first frame to the second communications device. For details about descriptions of a frame structure of the first frame, refer to the detailed descriptions of the foregoing content.

1003: The second communications device receives the first frame from the first communications device.

In this embodiment of this application, if the first communications device and the second communications device are located in a same communications network, the first communications device may send the first frame to the second communications device, and the second communications device may receive the first frame using the communications network.

The first frame received by the second communications device may include a management frame. For example, the first frame may be a beacon frame, or the first frame is another management frame. For example, the first frame may be an association response frame. A specific implementation of the first frame may be determined with reference to an application scenario.

1004: The second communications device parses the first frame, where the first frame includes a channel bandwidth field, a first channel center frequency segment field, a second channel center frequency segment field, and a bitmap for preamble puncture field.

After generating the first frame, the first communications device sends the first frame to the second communications device. After receiving the first frame, the second communications device may parse out the channel bandwidth field, the first channel center frequency segment field, the second channel center frequency segment field, and the bitmap for preamble puncture field from the first frame in a preconfigured frame structure parsing manner, and separately obtain a value of each field.

1005: The second communications device determines the BSS bandwidth and the location of the operating channel of the BSS based on the channel bandwidth field, the first channel center frequency segment field, and the second channel center frequency segment field.

1006: The second communications device determines, based on each bit status in the bitmap for preamble puncture field, whether each subchannel is available.

In this embodiment of this application, the first frame further includes a bitmap for preamble puncture field, and each bit status in the bitmap for preamble puncture field is used to indicate whether a subchannel is available. When the first communications device supports preamble puncture, the first frame may further include one bitmap for preamble puncture field such that the second communications device determines, based on a value of each bitmap for preamble puncture field, whether all subchannels are available.

Figure 11A:
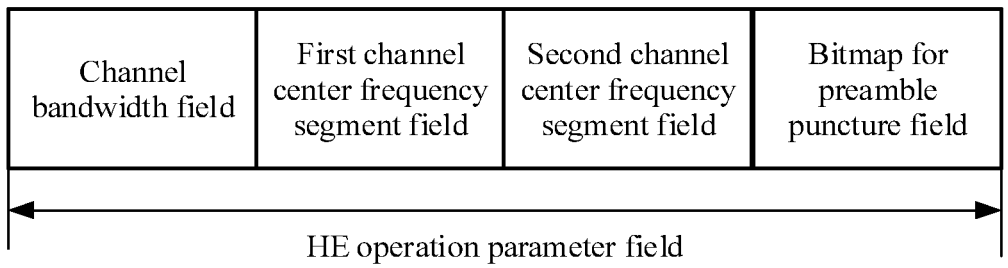
FIG. 11A is a schematic diagram of a frame structure of a first frame according to an embodiment of this application.
Figure 11B:
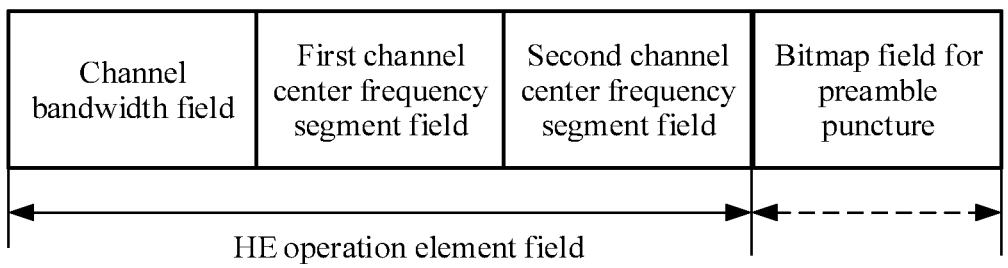
FIG. 11B is a schematic diagram of a frame structure of another first frame according to an embodiment of this application.
Figure 11C:
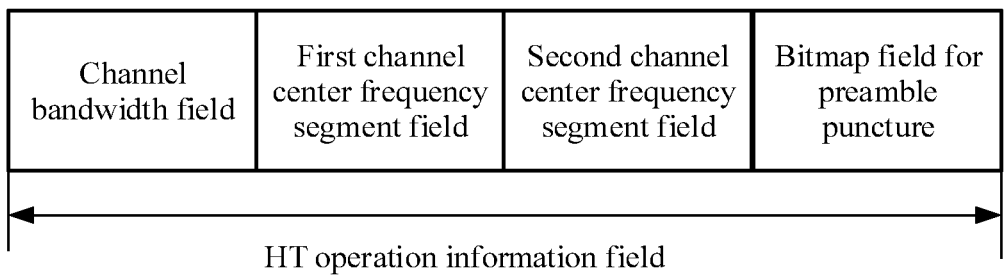
FIG. 11C is a schematic diagram of a frame structure of another first frame according to an embodiment of this application.

In some embodiments of this application, as shown in FIG. 11A to FIG. 11C, the bitmap for preamble puncture field is obtained by reconfiguring a reserved field in an HE operation parameter field, and the operation parameter field is in the first frame, or the bitmap for preamble puncture field is a newly added field in an HE operation element field, and the operation element field is in the first frame, or the bitmap for preamble puncture field is obtained by reconfiguring a reserved field in an HT operation information field, and the operation information field is in the first frame.

The bitmap for preamble puncture field may be determined by reconfiguring the HE operation parameter field, the HE operation element field, and the HT operation information field.

In some embodiments of this application, the first frame further includes a preamble puncture BSS (bitmap for preamble puncture) field, and the preamble puncture BSS field is used to indicate whether the bitmap for preamble puncture field in the first frame appears.

The first communications device includes the preamble puncture BSS field in the first frame. The second communications device may obtain the preamble punctured BSS field by parsing the first frame, and may determine, based on the preamble punctured BSS field, whether the bitmap for preamble puncture field in the first frame appears.

Figure 11D:
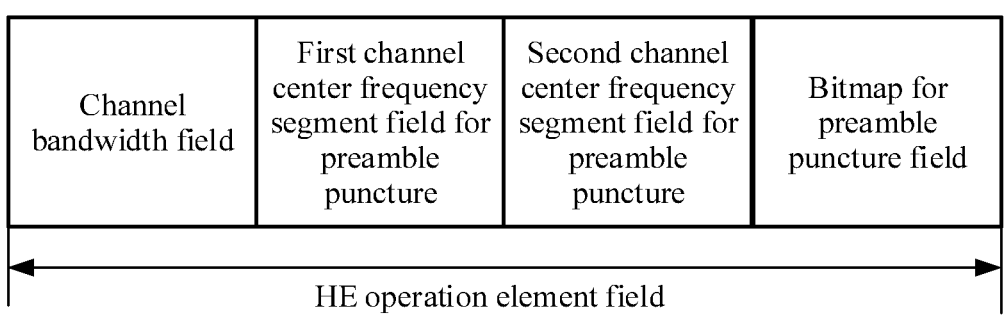
FIG. 11D is a schematic diagram of a frame structure of another first frame according to an embodiment of this application.

In some embodiments of this application, as shown in FIG. 11D, the first channel center frequency segment field is a first channel center frequency for preamble puncture field, the second channel center frequency segment field is a second channel center frequency segment for preamble puncture field, and the bitmap for preamble puncture field, the first channel center frequency for preamble puncture field, and the second channel center frequency segment for preamble puncture field are newly added fields in an HE operation element field, and the operation element field is in the first frame.

In this embodiment of this application, the first frame may carry a first channel center frequency for preamble puncture field and a second channel center frequency segment for preamble puncture field. The first channel center frequency for preamble puncture field and the second channel center frequency segment for preamble puncture field are newly added fields in the first frame. If the bitmap for preamble puncture field appears in the first frame, the second communications device may further parse the first channel center frequency for preamble puncture field and the second channel center frequency segment for preamble puncture field. If the bitmap for preamble puncture field does not appear in the first frame, the second communications device may parse the first channel center frequency segment field and the second channel center frequency field in the first frame, to implement compatibility with various channel center frequency fields.

For example, to ensure backward compatibility, an old station may obtain the BSS bandwidth using HT operation information and VHT operation information, and a new station may obtain a BSS bandwidth in a preamble puncture mode using a CCFS0 for preamble puncture field, a CCFS1 for preamble puncture field, and the bitmap for preamble puncture field that are introduced in this embodiment of this application. For example, when an AP finds, through channel detection, that a secondary 40 MHz channel is unavailable, the AP may use an HT operation information field and a VHT operation information field to indicate that a BSS bandwidth is 40 MHz, set the BSS bandwidth to 160 MHz using a CCFS0 for preamble puncture field and a CCFS1 for preamble puncture field, and set, using bitmap for preamble puncture, secondary 40 MHz in 160 MHz to be unavailable and all remaining channels to be available. In this way, the old station may send a frame in an HT, VHT, or HE format using a primary 40 MHz channel, and the new station may select, from the 160 MHz channel, a BSS bandwidth in a preamble puncture mode that does not include secondary 40 MHz, to send data.

To better understand and implement the foregoing solutions in the embodiments of this application, the following uses a corresponding application scenario as an example for specific description.

This embodiment of this application can resolve a problem of how to indicate a size and the location of the operating channel of the BSS after a 320 MHz bandwidth mode is introduced. A CCFS3 field and a CCFS4 field are introduced into the EHT operation information field, and the CCFS3 field and the CCFS4 field, together with CCFS0 and CCFS1, indicate a bandwidth mode above 160 MHz. CCFS0 and CCFS1 may be CCFS0 and CCFS1 in the VHT operation information field, or may be newly added fields in EHT operation information.

FIG. 12 is a schematic operation diagram of a wireless local area network (Wireless Local Area Network, WLAN) system. A beacon frame is periodically sent by an AP, and the beacon frame carries the BSS bandwidth, that is, information about a maximum operating bandwidth supported by the BSS such that a station that receives the beacon frame is enabled to learn of the size and the location of the operating channel of the BSS. The AP and the STA between two adjacent beacon frames send a downlink or uplink data frame in a time division manner through contention, and the data frame may be sent using a channel that does not exceed the maximum operating bandwidth supported by the BSS. BSS bandwidth information may alternatively be sent using another management frame, for example, an association response frame, in addition to a beacon frame.

For example, an AP of VHT notifies, using VHT operation information, the station that the maximum bandwidth supported by the BSS to which the AP belongs is 160 MHz. In this case, the AP may communicate with the station using a channel whose bandwidth does not exceed 160 MHz, and the bandwidth may be one of 20 MHz, 40 MHz, 80 MHz, or 160 MHz. A bandwidth used each time the AP sends data is determined based on a CCA result before the AP sends the data.

FIG. 12 shows that the beacon frame is periodically sent, and EHT Operation may be placed in the beacon frame to describe a bandwidth capability of the BSS. When specific data is sent, a bandwidth size that can be supported by a capability is selected based on a CCA result for communication.

This embodiment of this application is applicable to an AP and a STA in a WLAN system. The AP is a wireless router, and the STA is a wireless mobile device and includes a smartphone, an IPAD, a vehicle-mounted mobile apparatus, and the like. This application relates to soft reconstruction of the AP and the STA. When the AP sends a management frame that carries an EHT operation information field, the EHT operation information field needs to be constructed in a manner of this application. The STA also needs to parse the EHT operation information field in a manner of this application.

In this embodiment of this application, in next-generation WI-FI standard EHT, a bandwidth is extended to 320 MHz, and a specific mode of the bandwidth may be further classified into several different forms: 320 MHz, 160+160 MHz, 160+80+80 MHz, 80+80+160 MHz, and 80+80+80+ 80 MHz. "+" indicates that a total bandwidth includes two or more different frequency segments.

Optionally, a bandwidth of 240 MHz may be supported, and a specific mode of the bandwidth of 240 MHz may be divided into different forms: 240 MHz, 160+80 MHz, 80+160 MHz, and 80+80+80 MHz.

In this embodiment of this application, the EHT operation information field is provided, and is carried in EHT operation element. EHT operation element may be carried in a management frame, such as a beacon frame or an association response frame, that is sent by the AP. A structure of the EHT operation information field is shown in FIG. 13A and FIG. 13B. The EHT Channel Bandwidth field has a length of one byte. For setting of the field, refer to Table 1. It should be noted that if 240 MHz is not supported in an EHT standard, several bandwidth modes: 240 MHz, 160+80 MHz, 80+160 MHz, and 80+80+80 MHz are not included when EHT Channel Bandwidth is set to 1.

CCFS0 and CCFS1 are used in VHT operation element. However, in this embodiment of this application, because the EHT supports a higher bandwidth, CCFS3 and CCFS4 need to be newly added for indication. CCFS0 and CCFS1 are processed in two ways. One is to reuse CCFS0 and CCFS1 in VHT operation element. The other is to migrate CCFS0 and CCFS1 to EHT operation. An advantage of the first method is that no repeated indication is required, and signaling overheads are reduced. An advantage of the second method is that all CCFSs related to the EHT may be placed in a same element, a protocol is relatively simple, and joint using with VHT operation is not required.

Optionally, in this embodiment, the frame structure of EHT operation information may alternatively be shown in FIG. 13B, and includes EHT channel bandwidth, CCFS0, CCFS1, CCFS3, and CCFS4. Each CCFS occupies one byte (8 bits).

Optionally, a manner of setting the EHT channel bandwidth field may be alternatively shown in Table 2. That is, each state is used to indicate a BSS bandwidth mode. When 240 MHz is not supported, a state corresponding to 240 MHz may be deleted from Table 2.

Optionally, when the BSS supports the preamble puncture mode, in this embodiment, the frame structure of EHT operation information may be alternatively shown in FIG. 14A or FIG. 14B, and only a bitmap for preamble puncture field is added. The bitmap for preamble puncture field has 2 bytes, and each bit corresponds to 20 MHz. If the field is set to 1, it indicates that 20 MHz is available, otherwise, it indicates that 20 MHz is unavailable.

Preamble puncture means that when the AP or the STA uses a bandwidth of 80 MHz or 160 (80+80) MHz to send data, if some 20 MHz secondary channels are unavailable (because a CCA result is busy or it is not allowed by a regulation), where it is not allowed by a regulation generally means that WI-FI is not allowed to be used because a radar or WECHAT is in use at a current moment, no sending is performed on the unavailable 20 MHz channels in the bandwidth of 80 MHz or 160 (80+80) MHz, and sending is performed using a primary 20 MHz channel and a secondary channel that is allowed to be used. Currently, in 802.11ax, preamble puncture is used only for data sending, and an operating bandwidth of a BSS to which a sending station belongs can still only be one of 20 MHz, 40 MHz, 80 MHz, and 160 (80+80) MHz. In this embodiment of this application, that the BSS works in the preamble puncture mode means that the BSS bandwidth is set to the preamble puncture mode. That is, in a subsequent data sending process, selection can be performed only in an available subchannel (that is, a subchannel whose bitmap for preamble puncture is set to 1) that is set in the BSS bandwidth. In this embodiment of this application, a total bandwidth is not limited to 160 MHz, and may be extended to 320 MHz. Therefore, two bytes are used for bitmap for preamble puncture.

For ease of description of settings of CCFS0, CCFS1, CCFS3, and CCFS4, value manners of dot11CurrentChannelCenterFrequencyIndex0, dot11CurrentChannelCenterFrequencyIndex1, dot11CurrentChannelCenterFrequencyIndex2, and dot11CurrentChannelCenterFrequencyIndex3 are first described herein in Table 3.

TABLE 3

| Field | Meaning |
| --- | --- |
| dot11CurrentChannelCenterFrequencyIndex0 | for a 20 MHz, 40 MHz, 80 MHz, 160 MHz, 240 MHz, or 320 MHz channel, indicating a center frequency of the channel for an 80 + 80 MHz channel, indicating a center frequency of a frequency segment 0, that is, a frequency segment including a primary channel for a 160 + 160 MHz channel, indicating a center frequency of a frequency segment 0, that is, a frequency segment including a primary channel for a 160 + 80 + 80 MHz channel, indicating a center frequency of a frequency segment 0, that is, a frequency segment including a primary channel |

TABLE 3-continued

| Field | Meaning |
|---|---|
| | for an 80 + 80 + 160 MHz channel, indicating a center frequency of a frequency segment 0, that is, a frequency segment including a primary channel
for an 80 + 80 + 80 + 80 MHz channel, indicating a center frequency of a frequency segment 0, that is, a frequency segment including a primary channel
for a 160 + 80 MHz channel, indicating a center frequency of a frequency segment 0, that is, a frequency segment including a primary channel
for an 80 + 160 MHz channel, indicating a center frequency of a frequency segment 0, that is, a frequency segment including a primary channel
for an 80 + 80 + 80 MHz channel, indicating a center frequency of a frequency segment 0, that is, a frequency segment including a primary channel |
| dot11CurrentChannelCenterFrequencyIndex1 | for an 80 + 80 MHz channel, indicating a center frequency of a frequency segment 1, that is, a frequency segment not including a primary channel
for a 160 + 160 MHz channel, indicating a center frequency of a frequency segment 1, that is, a frequency segment not including a primary channel
for a 160 + 80 + 80 MHz channel, indicating a center frequency a frequency segment 1, that is, one of two 80 MHz frequency of segments
for an 80 + 80 + 160 MHz channel, indicating a center frequency of a frequency segment 1, that is, an 80 MHz frequency segment not including a primary channel
for an 80 + 80 + 80 + 80 MHz channel, indicating a center frequency of a frequency segment 1, that is, a frequency segment of a secondary 80 MHz channel
for a 160 + 80 MHz channel, indicating a center frequency of a frequency segment 1, that is, a frequency segment not including a primary channel
for an 80 + 160 MHz channel, indicating a center frequency of a frequency segment 1, that is, a frequency segment not including a primary channel
for an 80 + 80 + 80 MHz channel, indicating a center frequency of a frequency segment 1, that is, a frequency segment of a secondary 80 MHz channel
for a 20 MHz, 40 MHz, 80 MHz, 160 MHz, 240 MHz, or 320 MHz channel, set to 0 |
| dot11CurrentChannelCenterFrequencyIndex2 | for a 160 + 80 + 80 MHz channel, indicating a center frequency of a frequency segment 2, that is, the other one of two 80 MHz frequency segments
for an 80 + 80 + 160 MHz channel, indicating a center frequency of a frequency segment 2, that is, a 160 MHz frequency segment
for an 80 + 80 + 80 + 80 MHz channel, indicating a center frequency of a frequency segment 2, that is, an 80 MHz frequency segment not indicated using dot11CurrentChannelCenterFrequencyIndex0 or dot11CurrentChannelCenterFrequencyIndex1
for an 80 + 80 + 80 MHz channel, indicating a center frequency of a frequency segment 2, that is, an 80 MHz frequency segment not indicated using dot11CurrentChannelCenterFrequencyIndex0 or dot11CurrentChannelCenterFrequencyIndex1
for a 20 MHz, 40 MHz, 80 MHz, 160 MHz, 80 + 80 MHz, 320 MHz, 160 + 160 MHz, 240 MHz,160 + 80 MHz or 80 + 160 MHz channel, set to 0 |
| dot11CurrentChannelCenterFrequencyIndex3 | for an 80 + 80 + 80 + 80 MHz channel, indicating a center frequency of a frequency segment 3, that is, an 80 MHz frequency segment not indicated using dot11CurrentChannelCenterFrequencyIndex0, dot11CurrentChannelCenterFrequencyIndex1, or dot11CurrentChannelCenterFrequencyIndex2
for a 20 MHz, 40 MHz, 80 MHz, 160 MHz, 80 + 80 MHz, 320 MHz, 160 + 160 MHz, 160 + 80 + 80 MHz, 80 + 80 + 160 MHz, 240 MHz, 160 + 80 MHz, 80 + 160 MHz, or 80 + 80 + 80 MHz channel, set to 0 |

In this embodiment, CCFS0 and CCFS1 are in the VHT operation information field, and CCFS3 and CCFS4 are in the EHT operation information field. Because CCFS2 is already used in an 11ac standard, CCFS2 is not used herein.

Table 4 describes setting manners of CCFS0, CCFS1, CCFS3, and CCFS4.

In bandwidth modes of 20 MHz, 40 MHz, 80 MHz, 160 MHz, and 80+80 MHz, the setting manners of CCFS0 and CCFS1 are exactly the same as those in VHT operation information. CCFS3 and CCFS4 are set to 0.

Bandwidth modes of 320 MHz, 160+160 MHz, 160+80+80 MHz, 80+80+160 MHz, and 80+80+80+80 MHz correspond to that of a bandwidth of 320 MHz. Bandwidth modes of 240 MHz, 160+80 MHz, 80+160 MHz, and 80+80+80 MHz correspond to that of a bandwidth of 240 MHz. If the EHT standard does not support the bandwidth of 240 MHz, the mode corresponding to the bandwidth of 240 MHz may be deleted.

Four setting manners of CCFS3 and CCFS4 are provided in three bandwidth modes of 160+160 MHz, 80+80+160 MHz, and 80+160 MHz. During specific implementation, one of the four setting manners may be used.

TABLE 4

|  | CCFS0 | CCFS1 | CCFS3 | CCFS4 |
|---|---|---|---|---|
| 20 MHz | dot11CurrentChannelCenterFrequencyIndex0 | 0 | 0 | 0 |
| 40 MHz | dot11CurrentChannelCenterFrequencyIndex0 | 0 | 0 | 0 |
| 80 MHz | dot11CurrentChannelCenterFrequencyIndex0 | 0 | 0 | 0 |
| 160 MHz | If dot11CurrentPrimaryChannel is greater than dot11CurrentChannelCenterFrequencyIndex0, a value is dot11CurrentChannelCenterFrequencyIndex0 + 8. Otherwise, the value is dot11CurrentChannelCenterFrequencyIndex0 − 8. | dot11CurrentChannelCenterFrequencyIndex0 | 0 | 0 |
| 80 + 80 MHz | dot11CurrentChannelCenterFrequencyIndex0 | dot11CurrentChannelCenterFrequencyIndex1 | 0 | 0 |
| 320 MHz | If dot11CurrentPrimaryChannel is greater than dot11CurrentChannelCenterFrequencyIndex0 and less than dot11CurrentChannelCenterFrequencyIndex0 + 16, the value is dot11CurrentChannelCenterFrequencyIndex0 + 8. If dot11CurrentPrimaryChannel is greater than dot11CurrentChannelCenterFrequencyIndex0 + 16, the value is dot11CurrentChannelCenterFrequencyIndex0 + 24. If dot11CurrentPrimaryChannel is less than dot11CurrentChannelCenterFrequencyIndex0 and greater than dot11CurrentChannelCenterFrequencyIndex0 − 16, the value is dot11CurrentChannelCenterFrequencyIndex0 − 8. If dot11CurrentPrimaryChannel is less than dot11CurrentChannelCenterFrequencyIndex0 − 16, the value is dot11CurrentChannelCenterFrequencyIndex0 − 24. | If dot11CurrentPrimaryChannel is greater than dot11CurrentChannelCenterFrequencyIndex0, the value is dot11CurrentChannelCenterFrequencyIndex0 + 16. Otherwise, the value is dot11CurrentChannelCenterFrequencyIndex0 − 16. | dot11CurrentChannelCenterFrequencyIndex0 | 0 |

TABLE 4-continued

|  | CCFS0 | CCFS1 | CCFS3 | CCFS4 |
|---|---|---|---|---|
| 160 + 160 MHz | If dot11CurrentPrimaryChannel is greater than dot11CurrentChannelCenterFrequencyIndex0, a value is dot11CurrentChannelCenterFrequencyIndex0 + 8. Otherwise, the value is dot11CurrentChannelCenterFrequencyIndex0 − 8. | dot11CurrentChannelCenterFrequencyIndex0 | dot11CurrentChannelCenterFrequencyIndex1 − 8 or + 8<br>dot11CurrentChannelCenterFrequencyIndex1<br>dot11CurrentChannelCenterFrequencyIndex1<br>0 | dot11CurrentChannelCenterFrequencyIndex1<br>dot11CurrentChannelCenterFrequencyIndex1 − 8 or + 8<br>0<br>dot11CurrentChannelCenterFrequencyIndex1 |
| 160 + 80 + 80 MHz | If dot11CurrentPrimaryChannel is greater than dot11CurrentChannelCenterFrequencyIndex0, the value is dot11CurrentChannelCenterFrequencyIndex0 + 8. Otherwise, the value is dot11CurrentChannelCenterFrequencyIndex0 − 8. | dot11CurrentChannelCenterFrequencyIndex0 | dot11CurrentChannelCenterFrequencyIndex1 | dot11CurrentChannelCenterFrequencyIndex2 |
| 80 + 80 + 160 MHz | dot11CurrentChannelCenterFrequencyIndex0 | dot11CurrentChannelCenterFrequencyIndex1 | dot11CurrentChannelCenterFrequencyIndex2 − 8 or + 8<br>dot11CurrentChannelCenterFrequencyIndex2<br>dot11CurrentChannelCenterFrequencyIndex2<br>0 | dot11CurrentChannelCenterFrequencyIndex2<br>dot11CurrentChannelCenterFrequencyIndex2 − 8 or + 8<br>0<br>dot11CurrentChannelCenterFrequencyIndex2 |
| 80 + 80 + 80 + 80 MHz | dot11CurrentChannelCenterFrequencyIndex0 | dot11CurrentChannelCenterFrequencyIndex1 | dot11CurrentChannelCenterFrequencyIndex2 | dot11CurrentChannelCenterFrequencyIndex3 |
| 240 MHz | If dot11CurrentPrimaryChannel is greater than dot11CurrentChannelCenterFrequencyIndex0 + 8, the value is dot11CurrentChannelCenterFrequencyIndex0 + 16. If dot11CurrentPrimaryChannel is greater than dot11CurrentChannelCenterFrequencyIndex0 − 8 | If dot11CurrentPrimaryChannel is greater than dot11CurrentChannelCenterFrequencyIndex0 + 8, the value is dot11CurrentChannelCenterFrequencyIndex0 + 8. If dot11CurrentPrimaryChannel is less than dot11CurrentChannelCenterFrequencyIndex0 − 8, | dot11CurrentChannelCenterFrequencyIndex0 | 0 |

TABLE 4-continued

| | CCFS0 | CCFS1 | CCFS3 | CCFS4 |
|---|---|---|---|---|
| | and less than dot11CurrentChannelCenterFrequencyIndex0 + 8, the value is dot11CurrentChannelCenterFrequencyIndex0. If dot11CurrentPrimaryChannel is less that dot11CurrentChannelCenterFrequencyIndex0 − 8, the value is dot11CurrentChannelCenterFrequencyIndex0 −16. | the value is dot11CurrentChannelCenterFrequencyIndex0 − 8. If dot11CurrentPrimaryChannel is greater than dot11CurrentChannelCenterFrequencyIndex0 − 8 and less than dot11CurrentChannelCenterFrequencyIndex0 + 8, the value is dot11CurrentChannelCenterFrequencyIndex0 + 8 (when secondary 80 MHz is above primary 80 MHz) or dot11CurrentChannelCenterFrequencyIndex0 − 8 (when secondary 80 MHz is below primary 80 MHz). | | |
| 160 + 80 MHz | If dot11CurrentPrimaryChannel is greater than dot11CurrentChannelCenterFrequencyIndex0, the value is dot11CurrentChannelCenterFrequencyIndex0 + 8. Otherwise, the value is dot11CurrentChannelCenterFrequencyIndex0 − 8. | dot11CurrentChannelCenterFrequencyIndex0 | dot11CurrentChannelCenterFrequencyIndex1 | 0 |
| 80 + 160 MHz | dot11CurrentChannelCenterFrequencyIndex0 | 0 | dot11CurrentChannelCenterFrequencyIndex1 − 8 or + 8 dot11CurrentChannelCenterFrequencyIndex1 dot11CurrentChannelCenterFrequencyIndex1 0 | dot11CurrentChannelCenterFrequencyIndex1 dot11CurrentChannelCenterFrequencyIndex1 − 8 or + 8 0 dot11CurrentChannelCenterFrequencyIndex1 |
| 80 + 80 + 80 MHz | dot11CurrentChannelCenterFrequencyIndex0 | dot11CurrentChannelCenterFrequencyIndex1 | dot11CurrentChannelCenterFrequencyIndex2 | 0 |

After receiving the EHT operation information field sent by the AP, the STA may determine the BSS bandwidth mode based on CCFS values shown in Table 5. For example, Table 5 shows a manner of calculating the BSS bandwidth.

TABLE 5

| CCFS value | BSS bandwidth |
| --- | --- |
| CCFS1 = 0, CCFS3 = 0, and CCFS4 = 0 | 20 MHz, 40 MHz, or 80 MHz |
| CCFS1 >0, \|CCFS1 − CCFS0\| = 8, CCFS3 = 0, and CCFS4 = 0 | 160 MHz |
| CCFS1 >0, \|CCFS1 − CCFS0\| >16, CCFS3 = 0, and CCFS4 = 0 | 80 + 80 MHz |
| CCFS1 >0, CCFS3 >0, \|CCFS1 − CCFS0\| = 8, \|CCFS3 − CCFS1\| = 16, and CCFS4 = 0 | 320 MHz |
| CCFS1 >0, CCFS3 >0, CCFS4 >0, \|CCFS1 − CCFS0\| = 8, \|CCFS4 − CCFS31\| = 8, and \|CCFS4 − CCFS1\| >32 | 160 + 160 MHz |
| CCFS1 >0, CCFS3 >0, CCFS4 >0, \|CCFS1 − CCFS0\| = 8, \|CCFS3 − CCFS1\| >24, \|CCFS4 − CCFS1\| >24, and \|CCFS4 − CCFS31\| >16 | 160 + 80 + 80 MHz |
| CCFS1 >0, CCFS3 >0, CCFS4 >0, \|CCFS1 − CCFS0\| >16, \|CCFS4 − CCFS0\| >24, \|CCFS4 − CCFS1\| >24, and \|CCFS4 − CCFS31\| = 8 | 80 + 80 + 160 MHz |
| CCFS1 >0, CCFS3 >0, CCFS4 >0, \|CCFS1 − CCFS0\| >16, \|CCFS4 − CCFS0\| >16, \|CCFS4 − CCFS1\| >16, and \|CCFS4 − CCFS31\| >16 | 80 + 80 + 80 + 80 MHz |
| CCFS1 >0, CCFS3 >0, \|CCFS1 − CCFS0\| = 8, \|CCFS3 − CCFS1\| = 8, and CCFS4 = 0 | 240 MHz |
| CCFS1 >0, CCFS3 >0, \|CCFS1 − CCFS0\| = 8, \|CCFS3 − CCFS1\| >24, and CCFS4 = 0 | 160 + 80 MHz |
| CCFS3 >0, CCFS4 >0, \|CCFS4 − CCFS3\| = 8, \|CCFS4 − CCFS0\| >24, and CCFS1 = 0 | 80 + 160 MHz |
| CCFS1 >0, CCFS3 >0, \|CCFS1 − CCFS0\| >16, \|CCFS3 − CCFS0\| >16, \|CCFS3 − CCFS1\| >16, and CCFS4 = 0 | 80 + 80 + 80 MHz |

In the foregoing embodiment, the EHT operation information field is used to indicate a BSS bandwidth mode greater than 160 MHz. In the other approaches, only a BSS bandwidth mode of 160 MHz or lower can be indicated. However, this embodiment provides indication manners of BSS bandwidth modes of 320 MHz and 240 MHz.

Next, another embodiment is described, where backward compatibility is not considered when CCFSs of EHT operation information are set. In this embodiment, a bandwidth greater than 80 MHz is divided into a plurality of 80 MHz channels, and each CCFS is set to a center frequency of an 80 MHz channel.

In this embodiment, a frame structure of EHT operation information is shown in FIG. 13B, and a manner of setting EHT Channel Bandwidth is shown in Table 2. Setting manners of CCFS0, CCFS1, CCFS3, and CCFS4 are shown in Table 6.

For 20 MHz, 40 MHz, and 80 MHz, CCFS0 is set to a center frequency of a total bandwidth, and CCFS1, CCFS3, and CCFS4 are set to 0.

For a bandwidth mode greater than 80 MHz, first N (N=the total bandwidth/80 MHz) CCFSs are used to separately indicate a center frequency of each 80 MHz bandwidth. CCFS0 indicates a center frequency of a primary 80 MHz channel, and CCFS1 indicates a center frequency of a secondary 80 MHz channel. When a bandwidth is greater than 160 MHz, a primary 80 MHz channel and a first secondary 80 MHz channel form a 160 MHz channel.

TABLE 6

| EHT Channel Bandwidth | CCFS0 | CCFS1 | CCFS3 | CCFS4 |
| --- | --- | --- | --- | --- |
| 20 MHz | 20 MHz center frequency | 0 | 0 | 0 |
| 40 MHz | 40 MHz center frequency | 0 | 0 | 0 |
| 80 MHz | 80 MHz center frequency | 0 | 0 | 0 |
| 160 MHz or 80 + 80 MHz | Primary 80 MHz center frequency | Secondary 80 MHz center frequency | 0 | 0 |
| 240 MHz, 160 + 80 MHz, 80 + 160 MHz or 80 + 80 + 80 MHz | Primary 80 MHz center frequency | First secondary 80 MHz center frequency | Second secondary 80 MHz center frequency | 0 |
| 320 MHz, 160 + 160 MHz, 160 + 80 + 80 MHz, 80 + 80 + 160 MHz, or 80 + 80 + 80 + 80 MHz | Primary 80 MHz center frequency | First secondary 80 MHz center frequency | Second secondary 80 MHz center frequency | Third secondary 80 MHz center frequency |

After receiving the EHT operation information field sent by the AP, the STA may determine the BSS bandwidth mode based on CCFS values shown in Table 7.

TABLE 7

| CCFS value | BSS bandwidth |
| --- | --- |
| CCFS1 = 0, CCFS3 = 0, and CCFS4 = 0 | 20 MHz, 40 MHz, or 80 MHz |
| CCFS1 >0, \|CCFS1 − CCFS0\| = 16, CCFS3 = 0, and CCFS4 = 0 | 160 MHz |
| CCFS1 >0, \|CCFS1 − CCFS0\| >16, CCFS3 = 0, and CCFS4 = 0 | 80 + 80 MHz |
| CCFS1 >0, CCFS3 >0, CCFS4 >0, \|CCFS1 − CCFS0\| = 16, \|CCFS4 − CCFS3\| = 16, and\|CCFS3 +CCFS4 − CCFS0 − CCFS1\| = 64 | 320 MHz |
| CCFS1 >0, CCFS3 >0, CCFS4 >0, \|CCFS1 − CCFS0\| = 16, \|CCFS4 − CCFS31 = 16, and \|CCFS3 +CCFS4 − CCFS0 − CCFS11 >64 | 160 + 160 MHz |
| CCFS1 >0, CCFS3 >0, CCFS4 >0, \|CCFS1 − CCFS0\| = 16, and \|CCFS4 − CCFS3\| >16 | 160 + 80 + 80 MHz |
| CCFS1 >0, CCFS3 >0, CCFS4 >0, \|CCFS1 − CCFS0\| >16, and \|CCFS4 − CCFS3\| = 16 | 80 + 80 + 160 MHz |
| CCFS1 >0, CCFS3 >0, CCFS4 >0, \|CCFS1 − CCFS0\| >16, \|CCFS4 − CCFS3\| >16, and \|CCFS3 + CCFS4 − CCFS0 − CCFS1\| >64 | 80 + 80 + 80 + 80 MHz |
| CCFS1 >0, CCFS3 >0, \|CCFS1 − CCFS0\| = 16, \|2 * CCFS3 − CCFS1 − CCFS0\| = 48, and CCFS4 = 0 | 240 MHz |
| CCFS1 >0, CCFS3 >0, \|CCFS1 − CCFS0\| = 16, \|2 * CCFS3 − CCFS1 − CCFS0\| >48, and CCFS4 = 0 | 160 + 80 MHz |
| CCFS1 >0, CCFS3 >0, \|CCFS3 − CCFS1\| = 16, \|2*CCFS0 − CCFS1 − CCFS3\| >48, and CCFS4 = 0 | 80 + 160 MHz |
| CCFS1 >0, CCFS3 >0,\|CCFS1 − CCFS0\| >16,\|CCFS3 − CCFS1\| >16, and CCFS4 = 0 | 80 + 80 + 80 MHz |

This embodiment uses a CCFS definition manner different from that in the foregoing embodiment. The CCFS definition manner is more intuitive and simple in this embodiment of this application, but is different from an existing definition of 160 (80+80) MHz. As a result, 160 MHz has a same indication manner in different protocols.

The following describes another embodiment. A difference from the foregoing embodiment lies in that channels other than primary 160 MHz in 320 MHz and 240 MHz may be aggregated using discontinuous channels with a granularity of 40 MHz.

Further, the total bandwidth is extended to 320 MHz, and modes of the total bandwidth may be classified into different forms such as 320 MHz, 160+160 MHz, 160+80+80 MHz, 80+80+160 MHz, 80+80+80+80 MHz, 160+80+40+40 MHz, 160+40+40+80 MHz, 160+40+40+40+40 MHz, 80+80+80+40+40 MHz, 80+80+40+40+80 MHz, and 80+80+40+40+40+40 MHz.

Optionally, a bandwidth of 240 MHz may be supported, and modes of the bandwidth of 240 MHz may be classified into different forms such as 240 MHz, 160+80 MHz, 80+160 MHz, 80+80+80 MHz, 160+40+40 MHz, and 80+80+40+40 MHz. Current 160 MHz is used as an example. Channels are classified into primary 20 MHz, secondary 20 MHz, secondary 40 MHz, and secondary 80 MHz. A combination of primary 20 MHz and secondary 20 MHz is referred to as primary 40 MHz, and a combination of primary 40 MHz and secondary 40 MHz is referred to as primary 80 MHz.

Definitions of dot11CurrentChannelCenterFrequencyIndex0 to dot11CurrentChannelCenterFrequencyIndex5 are shown in Table 8.

Each index corresponds to a center frequency of one frequency segment. Because there is a maximum of six frequency (an 80+80+40+40+40+40 MHz mode) segments, six indexes are needed.

An existing bandwidth mode in the foregoing embodiment may be set in a manner the same as that in the foregoing embodiment. For a newly added mode in this embodiment of this application, a manner in Table 9 may be used to set CCFS0, CCFS1, and CCFS3 to CCFS6. Because there is a maximum of six frequency (an 80+80+40+40+40+40 MHz mode) segments, six CCFS fields are needed in a frame format. The name of CCFS2 is not used herein to avoid ambiguity because of special use of CCFS2 in an existing standard. In an actual process, CCFS0 to CCFS5 may also be used for definition, are only different in names, and does not affect a specific indication manner of the CCFSs.

TABLE 8

| Field | Meaning |
|---|---|
| dot11CurrentChannelCenterFrequencyIndex0 | for a 20 MHz, 40 MHz, 80 MHz, 160 MHz, 240 MHz, or 320 MHz channel, indicating a center frequency of the channel
for an 80 + 80 MHz channel, indicating a center frequency of a frequency segment 0, that is, a frequency segment including a primary channel
for a 160 + 160 MHz channel, indicating a center frequency of a frequency segment 0, that is, a frequency segment including a primary channel
for a 160 + 80 + 80 MHz channel, indicating a center frequency of a frequency segment 0, that is, a frequency segment including a primary channel
for an 80 + 80 + 160 MHz channel, indicating a center frequency of a frequency segment 0, that is, a frequency segment including a primary channel
for an 80 + 80 + 80 + 80 MHz channel, indicating a center frequency of a frequency segment 0, that is, a frequency segment including a primary channel
for a 160 + 80 + 40 + 40 MHz channel, indicating a center frequency of a frequency segment 0, that is, a frequency segment including a primary channel
for a 160 + 40 + 40 + 80 MHz channel, indicating a center frequency of a frequency segment 0, that is, a frequency segment including a primary channel
for a 160 + 40 + 40 + 40 + 40 MHz channel, indicating a center frequency of a frequency segment 0, that is, a frequency segment including a primary channel
for an 80 + 80 + 80 + 40 + 40 MHz channel, indicating a center frequency of a frequency segment 0, that is, a frequency segment including a primary channel
for an 80 + 80 + 40 + 40 + 80 MHz channel, indicating a center frequency of a frequency segment 0, that is, a frequency segment including a primary channel
for an 80 + 80 + 40 + 40 + 40 + 40 MHz channel, indicating a center frequency of a frequency segment 0, that is, a frequency segment including a primary channel
for a 160 + 80 MHz channel, indicating a center frequency of a frequency segment 0, that is, a frequency segment including a primary channel
for an 80 + 160 MHz channel, indicating a center frequency of a frequency segment 0, that is, a frequency segment including a primary channel
for an 80 + 80 + 80 MHz channel, indicating a center frequency of a frequency segment 0, that is, a frequency segment including a primary channel
for a 160 + 40 + 40 MHz channel, indicating a center frequency of a frequency segment 0, that is, a frequency segment including a primary channel
for an 80 + 80 + 40 + 40 MHz channel, indicating a center frequency of a frequency segment 0, that is, a frequency segment including a primary channel |
| dot11CurrentChannelCenterFrequencyIndex1 | for an 80 + 80 MHz channel, indicating a center frequency of a frequency segment 1, that is, a frequency segment not including a primary channel
for a 160 + 160 MHz channel, indicating a center frequency of a frequency segment 1, that is, a frequency segment not including a primary channel
for a 160 + 80 + 80 MHz channel, indicating a center frequency of a frequency segment 1, that is, one of two 80 MHz frequency segments
for an 80 + 80 + 160 MHz channel, indicating a center frequency of a frequency segment 1, that is, an 80 MHz frequency segment not including a primary channel
for an 80 + 80 + 80 + 80 MHz channel, indicating a center frequency of a frequency segment 1, that is, a frequency segment of a secondary 80 MHz channel
for a 160 + 80 + 40 + 40 MHz channel, indicating a center frequency of a frequency segment 1, that is, an 80 MHz frequency segment
for a 160 + 40 + 40 + 80 MHz channel, indicating a center frequency of a frequency segment 1, that is, one of two 40 MHz frequency segments
for a 160 + 40 + 40 + 40 + 40 MHz channel, indicating a center frequency of a frequency segment 1, that is, one of four 40 MHz frequency segments
for an 80 + 80 + 80 + 40 + 40 MHz channel, indicating a center frequency of a frequency segment 1, that is, a frequency segment of a secondary 80 MHz channel
for an 80 + 80 + 40 + 40 + 80 MHz channel, indicating a center frequency of a frequency segment 1, that is, a frequency segment of a secondary 80 MHz channel |

TABLE 8-continued

| Field | Meaning |
|---|---|
| | for an 80 + 80 + 40 + 40 + 40 + 40 MHz channel, indicating a center frequency of a frequency segment 1, that is, a frequency segment of a secondary 80 MHz channel |
| | for a 160 + 80 MHz channel, indicating a center frequency of a frequency segment 1, that is, a frequency segment not including a primary channel |
| | for an 80 + 160 MHz channel, indicating a center frequency of a frequency segment 1, that is, a frequency segment not including a primary channel |
| | for an 80 + 80 + 80 MHz channel, indicating a center frequency of a frequency segment 1, that is, a frequency segment of a secondary 80 MHz channel |
| | for a 160 + 40 + 40 MHz channel, indicating a center frequency of a frequency segment 1, that is, one of two 40 MHz frequency segments |
| | for an 80 + 80 + 40 + 40 MHz channel, indicating a center frequency of a frequency segment 1, that is, a frequency segment of a secondary 80 MHz channel |
| | for a 20 MHz, 40 MHz, 80 MHz, 160 MHz, 240 MHz, or 320 MHz channel, set to 0 |
| dot11CurrentChannelCenterFrequencyIndex2 | for a 160 + 80 + 80 MHz channel, indicating a center frequency of a frequency segment 2, that is, the other one of two 80 MHz frequency segments |
| | for an 80 + 80 + 160 MHz channel, indicating a center frequency of a frequency segment 2, that is, a 160 MHz frequency segment |
| | for an 80 + 80 + 80 MHz channel, indicating a center frequency of a frequency segment 2, that is, an 80 MHz frequency segment not indicated using dot11CurrentChannelCenterFrequencyIndex0 or dot11CurrentChannelCenterFrequencyIndex1 |
| | for a 160 + 80 + 40 + 40 MHz channel, indicating a center frequency of a frequency segment 2, that is, one of two 40 MHz frequency segments |
| | for a 160 + 40 + 40 + 80 MHz channel, indicating a center frequency of a frequency segment 2, that is, a 40 MHz frequency segment not indicated using dot11CurrentChannelCenterFrequencyIndex1 |
| | for a 160 + 40 + 40 + 40 + 40 MHz channel, indicating a center frequency of a frequency segment 2, that is, a 40 MHz frequency segment not indicated using dot11CurrentChannelCenterFrequencyIndex1 |
| | for an 80 + 80 + 80 + 40 + 40 MHz channel, indicating a center frequency of a frequency segment 2, that is, an 80 MHz frequency segment not indicated using dot11CurrentChannelCenterFrequencyIndex0 or dot11CurrentChannelCenterFrequencyIndex1 |
| | for an 80 + 80 + 40 + 40 + 80 MHz channel, indicating a center frequency of a frequency segment 2, that is, one of two 40 MHz frequency segments |
| | for an 80 + 80 + 40 + 40 + 40 + 40 MHz channel, indicating a center frequency of a frequency segment 2, that is, one of four 40 MHz frequency segments |
| | for an 80 + 80 + 80 MHz channel, indicating a center frequency of a frequency segment 2, that is, an 80 MHz frequency segment not indicated using dot11CurrentChannelCenterFrequencyIndex0 or dot11CurrentChannelCenterFrequencyIndex1 |
| | for a 160 + 40 + 40 MHz channel, indicating a center frequency of a frequency segment 2, that is, a 40 MHz frequency segment not indicated using dot11CurrentChannelCenterFrequencyIndex1 |
| | for an 80 + 80 + 40 + 40 MHz channel, indicating a center frequency of a frequency segment 2, that is, one of two 40 MHz frequency segments |
| | for a 20 MHz, 40 MHz, 80 MHz, 160 MHz, 80 + 80 MHz, 320 MHz, 160 + 160 MHz, 240 MHz,160 + 80 MHz or 80 + 160 MHz channel, set to 0 |
| dot11CurrentChannelCenterFrequencyIndex3 | for an 80 + 80 + 80 + 80 MHz channel, indicating a center frequency of a frequency segment 3, that is, an 80 MHz frequency segment not indicated using dot11CurrentChannelCenterFrequencyIndex0, dot11CurrentChannelCenterFrequencyIndex1, or dot11CurrentChannelCenterFrequencyIndex2 |
| | for a 160 + 80 + 40 + 40 MHz channel, indicating a center frequency of a frequency segment 3, that is, a 40 MHz frequency segment not indicated using dot11CurrentChannelCenterFrequencyIndex2 |
| | for a 160 + 40 + 40 + 80 MHz channel, indicating a center frequency of a frequency segment 3, that is, an 80 MHz frequency segment |
| | for a 160 + 40 + 40 + 40 + 40 MHz channel, indicating a center frequency of a frequency segment 3, that is, a 40 MHz frequency segment not indicated using dot11CurrentChannelCenterFrequencyIndex1 or dot11CurrentChannelCenterFrequencyIndex2 |
| | for an 80 + 80 + 80 + 40 + 40 MHz channel, indicating a center frequency of a frequency segment 3, that is, one of two 40 MHz frequency segments |
| | for an 80 + 80 + 40 + 40 + 80 MHz channel, indicating a center frequency of a frequency segment 3, that is, a 40 MHz frequency segment not indicated using dot11CurrentChannelCenterFrequencyIndex2 |

TABLE 8-continued

| Field | Meaning |
|---|---|
| | for an 80 + 80 + 40 + 40 + 40 + 40 MHz channel, indicating a center frequency of a frequency segment 3, that is, a 40 MHz frequency segment not indicated using dot11CurrentChannelCenterFrequencyIndex2
for an 80 + 80 + 40 + 40 MHz channel, indicating a center frequency of a frequency segment 2, that is, a 40 MHz frequency segment not indicated using dot11CurrentChannelCenterFrequencyIndex2
for a 20 MHz, 40 MHz, 80 MHz, 160 MHz, 80 + 80 MHz, 320 MHz, 160 + 160 MHz, 160 + 80 + 80 MHz, 80 + 80 + 160 MHz, 240 MHz, 160 + 80 MHz, 80 + 160 MHz, 160 + 40 + 40 MHz, or 80 + 80 + 80 MHz channel, set to 0 |
| dot11CurrentChannelCenterFrequencyIndex4 | for a 160 + 40 + 40 + 40 + 40 MHz channel, indicating a center frequency of a frequency segment 4, that is, a 40 MHz frequency segment not indicated using dot11CurrentChannelCenterFrequencyIndex1, dot11CurrentChannelCenterFrequencyIndex2, or dot11CurrentChannelCenterFrequencyIndex3
for an 80 + 80 + 80 + 40 + 40 MHz channel, indicating a center frequency of a frequency segment 4, that is, a 40 MHz frequency segment not indicated using dot11CurrentChannelCenterFrequencyIndex3
for an 80 + 80 + 40 + 40 + 80 MHz channel, indicating a center frequency of a frequency segment 4, that is, an 80 MHz frequency segment not indicated using dot11CurrentChannelCenterFrequencyIndex0 or dot11CurrentChannelCenterFrequencyIndex1
for an 80 + 80 + 40 + 40 + 40 + 40 MHz channel, indicating a center frequency of a frequency segment 4, that is, a 40 MHz frequency segment not indicated using dot11CurrentChannelCenterFrequencyIndex2 or dot11CurrentChannelCenterFrequencyIndex3
for a 20 MHz, 40 MHz, 80 MHz, 160 MHz, 80 + 80 MHz, 320 MHz, 160 + 160 MHz, 160 + 80 + 80 MHz, 80 + 80 + 160 MHz, 160 + 80 + 40 + 40 MHz, 160 + 40 + 40 + 80 MHz, 240 MHz, 160 + 80 MHz, 80 + 160 MHz, 160 + 40 + 40 MHz, 80 + 80 + 40 + 40 MHz, or 80 + 80 + 80 MHz, set to 0 |
| dot11CurrentChannelCenterFrequencyIndex5 | for an 80 + 80 + 40 + 40 + 40 + 40 MHz channel, indicating a center frequency of a frequency segment 4, that is, a 40 MHz frequency segment not indicated using dot11CurrentChannelCenterFrequencyIndex2, dot11CurrentChannelCenterFrequencyIndex3, or dot11CurrentChannelCenterFrequencyIndex4
for a 20 MHz, 40 MHz, 80 MHz, 160 MHz, 80 + 80 MHz, 320 MHz, 160 + 160 MHz, 160 + 80 + 80 MHz, 80 + 80 + 160 MHz, 160 + 80 + 40 + 40 MHz, 160 + 40 + 40 + 80 MHz, 160 + 40 + 40 + 40 + 40 MHz, 80 + 80 + 80 + 40 + 40 MHz, 80 + 80 + 40 + 40 + 80 MHz, 240 MHz, 160 + 80 MHz, 80 + 160 MHz, 160 + 40 + 40 MHz, 80 + 80 + 40 + 40 MHz, or 80 + 80 + 80 MHz channel, set to 0 |

Table 9 shows a calculation manner of the CCFSs.

TABLE 9

| | CCFS0 | CCFS1 | CCFS3 | CCFS4 | CCFS5 | CCFS6 |
|---|---|---|---|---|---|---|
| 160 + 80 + 40 + 40 MHz | If dot11CurrentPrimaryChannel is greater than dot11CurrentChannelCenterFrequencyIndex0, a value is dot11CurrentChannelCenterFrequencyIndex 0 + 8. Otherwise, the value is dot11CurrentChannelCenterFrequencyIndex 0 − 8. | dot11CurrentChannelCenterFrequencyIndex0 | dot11CurrentChannelCenterFrequencyIndex1 | 0 | dot11CurrentChannelCenterFrequencyIndex2 | dot11CurrentChannelCenterFrequencyIndex3 |

TABLE 9-continued

| | CCFS0 | CCFS1 | CCFS3 | CCFS4 | CCFS5 | CCFS6 |
|---|---|---|---|---|---|---|
| 160 + 40 + 40 + 80 MHz | If dot11CurrentPrimaryChannel is greater than dot11CurrentChannelCenterFrequencyIndex0, a value is dot11CurrentChannelCenterFrequencyIndex 0 + 8. Otherwise, the value is dot11CurrentChannelCenterFrequencyIndex 0 − 8. | dot11CurrentChannelCenterFrequencyIndex0 | dot11CurrentChannelCenterFrequencyIndex1 | dot11CurrentChannelCenterFrequencyIndex2 | dot11CurrentChannelCenterFrequencyIndex3 | 0 |
| 160 + 40 + 40 + 40 MHz | If dot11CurrentPrimaryChannel is greater than dot11CurrentChannelCenterFrequencyIndex0, a value is dot11CurrentChannelCenterFrequencyIndex 0 + 8. Otherwise, the value is dot11CurrentChannelCenterFrequencyIndex 0 − 8. | dot11CurrentChannelCenterFrequencyIndex0 | dot11CurrentChannelCenterFrequencyIndex1 | dot11CurrentChannelCenterFrequencyIndex2 | dot11CurrentChannelCenterFrequencyIndex3 | dot11CurrentChannelCenterFrequencyIndex4 |
| 80 + 80 + 80 + 40 + 40 MHz | dot11CurrentChannelCenterFrequencyIndex0 | dot11CurrentChannelCenterFrequencyIndex1 | dot11CurrentChannelCenterFrequencyIndex2 | 0 | dot11CurrentChannelCenterFrequencyIndex3 | dot11CurrentChannelCenterFrequencyIndex4 |
| 80 + 80 + 40 + 40 + 80 MHz | dot11CurrentChannelCenterFrequencyIndex0 | dot11CurrentChannelCenterFrequencyIndex1 | dot11CurrentChannelCenterFrequencyIndex2 | dot11CurrentChannelCenterFrequencyIndex3 | dot11CurrentChannelCenterFrequencyIndex4 | 0 |
| 80 + 80 + 40 + 40 + 40 MHz | dot11CurrentChannelCenterFrequencyIndex0 | dot11CurrentChannelCenterFrequencyIndex1 | dot11CurrentChannelCenterFrequencyIndex2 | dot11CurrentChannelCenterFrequencyIndex3 | dot11CurrentChannelCenterFrequencyIndex4 | dot11CurrentChannelCenterFrequencyIndex5 |

TABLE 9-continued

| | CCFS0 | CCFS1 | CCFS3 | CCFS4 | CCFS5 | CCFS6 |
|---|---|---|---|---|---|---|
| 160 + 40 + 40 MHz | If dot11CurrentPrimaryChannel is greater than dot11CurrentChannelCenterFrequencyIndex0, a value is dot11CurrentChannelCenterFrequencyIndex 0 + 8. Otherwise, the value is dot11CurrentChannelCenterFrequencyIndex 0 − 8. | dot11CurrentChannelCenterFrequencyIndex0 | dot11CurrentChannelCenterFrequencyIndex1 | dot11CurrentChannelCenterFrequencyIndex2 | 0 | 0 |
| 80 + 80 + 40 + 40 MHz | dot11CurrentChannelCenterFrequencyIndex0 | dot11CurrentChannelCenterFrequencyIndex1 | dot11CurrentChannelCenterFrequencyIndex2 | dot11CurrentChannel1CenterFrequencyIndex3 | 0 | 0 |

After receiving the EHT operation information field sent by the AP, the STA may determine the BSS bandwidth mode based on CCFS values shown in Table 10. For example, the CCFS values shown in the following Table 10 are used.

TABLE 10

| CCFS value | BSS bandwidth |
|---|---|
| CCFS1 >0, CCFS3 >0, CCFS5 >0, CCFS6 >0, ¦CCFS1 − CCFS0¦ = 8, and CCFS4 = 0 | 160 + 80 + 40 + 40 MHz |
| CCFS1 >0, CCFS3 >0, CCFS4 >0, CCFS5 >0, ¦CCFS1 − CCFS0¦ = 8, and CCFS6 = 0 | 160 + 40 + 40 + 80 MHz |
| CCFS1 >0, CCFS3 >0, CCFS4 >0, CCFS5 >0, CCFS6 >0, and¦CCFS1 − CCFS0¦ = 8 | 160 + 40 + 40 + 40 + 40 MHz |
| CCFS1 >0, CCFS3 >0, CCFS5 >0, CCFS6 >0, ¦CCFS1 − CCFS0¦ >16, and CCFS4 = 0 | 80 + 80 + 80 + 40 + 40 MHz |
| CCFS1 >0, CCFS3 >0, CCFS4 >0, CCFS5 >0, ¦CCFS1 − CCFS0¦ >16, and CCFS6 = 0 | 80 + 80 + 40 + 40 + 80 MHz |
| CCFS1 >0, CCFS3 >0, CCFS4 >0, CCFS5 >0, CCFS6 >0, and¦CCFS1 − CCFS01 >16 | 80 + 80 + 40 + 40 + 40 + 40 MHz |
| CCFS1 >0, CCFS3 >0, CCFS4 >0, ¦CCFS1 − CCFS0¦ = 8, CCFS5 = 0, and CCFS6 = 0 | 160 + 40 + 40 MHz |
| CCFS1 >0, CCFS3 >0, CCFS4 >0, ¦CCFS1 − CCFS0¦ >16, CCFS5 = 0, and CCFS6 = 0 | 80 + 80 + 40 + 40 MHz |

According to this embodiment, the solution in this embodiment of this application may support channel bonding at a smaller frequency granularity, that is, 40 MHz. Using a smaller frequency granularity may make channel aggregation more flexible, and improve channel use efficiency.

A main difference between this embodiment and the foregoing two embodiments lies in that effects are different. However, it is mainly because in the first two embodiments, it is assumed that channels are aggregated at a granularity of 80 MHz, but in this embodiment, it is assumed that channels may be aggregated at a smaller granularity: 40 MHz.

In some embodiments of this application, when the BSS works in a radar frequency band, after a radar signal is detected on a channel, the channel cannot be used for communication within a period of time. In this case, if the BSS can be established only in a fixed bandwidth mode such as 20 MHz, 40 MHz, 80 MHz, or 160 (80+80) MHz, after radar is found on a secondary channel, the BSS is forced to reduce an operating bandwidth. For example, after radar is found on a secondary 20 MHz channel of a 160 MHz BSS is unavailable, only a primary 20 MHz channel can be used for communication, and a bandwidth is greatly reduced. If the BSS is allowed to be established in a preamble puncture mode, in this scenario mentioned above, the BSS only needs to send no data on the 20 MHz channel, and can still use the remaining 140 MHz channel for communication. Because only some secondary channels are punctured in 80 MHz or 160 (80+80) MHz during preamble puncture, and a channel location does not change, a current HT operation information field and VHT operation information field may still be used to indicate an operating channel of a BSS to which an AP belongs. However, in addition, a bitmap is further needed to indicate which 20 MHz secondary channels are unavailable. In this embodiment, a bit in HE operation element or HT operation information is used as bitmap for preamble puncture to indicate a channel usage status when the BSS works in a preamble puncture mode.

Certainly, this embodiment of this application is not merely applicable to a radar frequency band. If some secondary channels are unavailable or an AP does not intend to use the secondary channels due to another reason, the solutions in this embodiment of this application are also applicable. For example, when a 20 MHz 802.11a BSS is established on a secondary channel, a preamble punctured BSS may be established using the method in this embodiment of this application. For another example, when interference on a secondary channel is extremely severe, and the AP does not intend to use the secondary channel, a preamble punctured BSS may also be established using the method in this embodiment of this application.

Method 1:

FIG. 15 shows a structure of an HE operation parameters field. B17 to B23 are reserved fields, and the seven bits may be defined as a bitmap for preamble puncture field. Each bit corresponds to seven 20 MHz secondary channels other than primary 20 MHz. For a 160 (80+80) MHz channel, seven bits in bitmap for preamble puncture respectively correspond, in ascending order of bits, to seven 20 MHz secondary channels that are arranged in ascending order of frequencies and that are other than a primary 20 MHz channel. For an 80 MHz channel, B17 to B19 respectively correspond to three 20 MHz secondary channels that are arranged in ascending order of frequencies and that are other than a primary 20 MHz channel, and B20 to B23 are reserved and set to 0.

Method 2A:

FIG. 16A shows a structure of HE operation element. In this embodiment of this application, a bitmap for preamble puncture field is optionally added to HE operation element, and the bitmap for preamble puncture field has a length of one byte. Further, whether HE operation element sent at a time carries the bitmap for preamble puncture field is indicated using a preamble punctured BSS field in FIG. 16A. The preamble punctured BSS field is located in a bit B17 of an HE operation parameters field. When the preamble punctured BSS field is set to 1, HE operation element carries the bitmap for preamble puncture field. If the preamble punctured BSS field is set to 0, it indicates that HE operation element does not carry the bitmap for preamble puncture field.

Figure 16B:
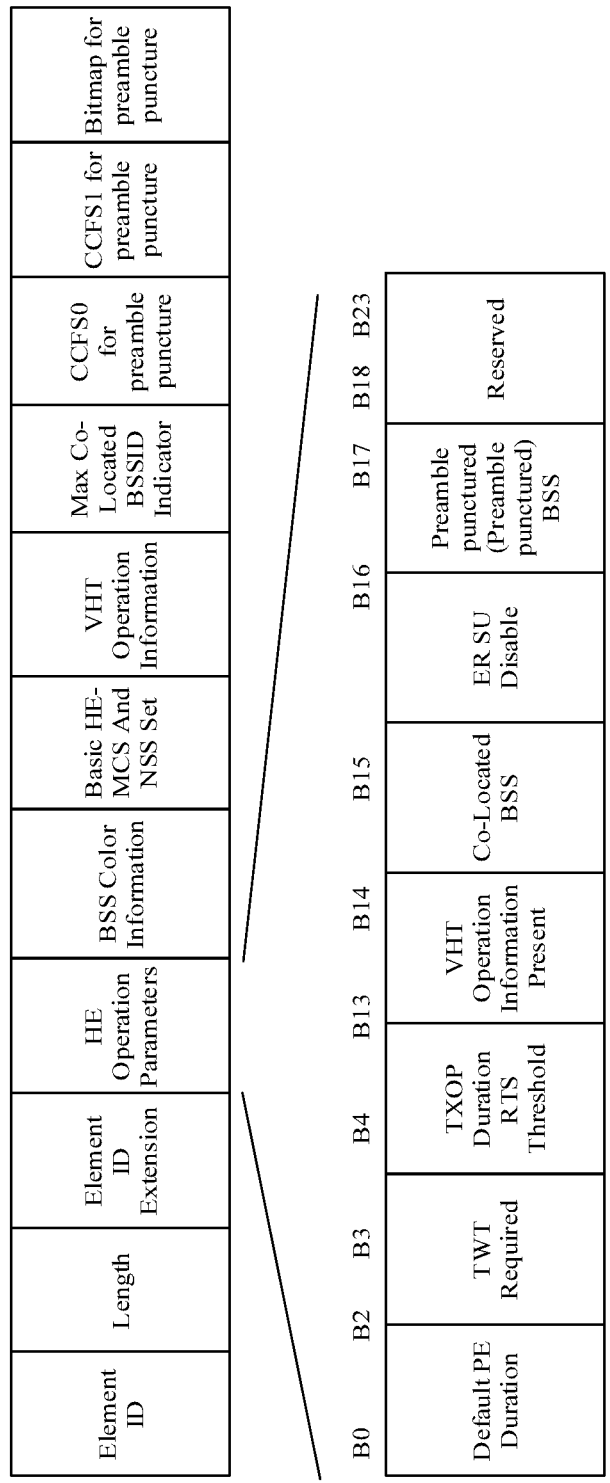
FIG. 16B is a schematic diagram of a frame structure of another HE operation parameter field according to an embodiment of this application.

Method 2B:

FIG. 16B shows a structure of HE operation element. In this embodiment of this application, three fields: CCFS0 for preamble puncture, CCFS1 for preamble puncture, and bitmap for preamble puncture are optionally added to HE operation element, and the three newly added fields each have a length of one byte. The CCFS0 for preamble puncture field and the CCFS0 field are set in a same manner, and the CCFS1 for preamble puncture field and the CCFS1 field are set in a same manner. Only a STA that supports a preamble punctured BSS reads the CCFS0 for preamble puncture field and the CCFS1 for preamble puncture field. The STA that supports the preamble punctured BSS first learns, based on the CCFS0 for preamble puncture field and the CCFS1 for preamble puncture field, of an operating bandwidth and location information established by the BSS, and then, further determines, based on the bitmap for preamble puncture field, 20 MHz channels that are available in the operating bandwidth (a corresponding bit in the bitmap for preamble puncture field is set to 1), and 20 MHz channels that are unavailable in the operating bandwidth (a corresponding bit in the bitmap for preamble puncture field is set to 0). Further, whether HE operation element sent at a time carries three newly added fields is indicated using a preamble punctured BSS field in FIG. 16B. The preamble punctured BSS field is located in a bit B17 of an HE operation parameters field. When the preamble punctured BSS field is set to 1, HE operation element carries the three newly added fields: CCFS0 for preamble puncture, CCFS1 for preamble puncture, and bitmap for preamble puncture. If the preamble punctured BSS field is set to 0, it indicates that HE operation element does not carry the three newly added fields.

A difference between the method 2A and the method 2B lies in that the method 2A does not meet backward compatibility, and can be used only when it is ensured that all associated stations are stations that support a preamble punctured BSS. The Method 2B ensures backward compatibility. An old station may obtain the BSS bandwidth using HT operation information and VHT operation information, and a new station may obtain a BSS bandwidth in a preamble puncture mode using a CCFS0 for preamble puncture field, a CCFS1 for preamble puncture field, and the bitmap for preamble puncture field that are introduced in this embodiment. For example, when an AP finds, through channel detection, that a secondary 40 MHz channel is unavailable, the AP may use an HT operation information field and a VHT operation information field to indicate that a BSS bandwidth is 40 MHz, set the BSS bandwidth to 160 MHz using a CCFS0 for preamble puncture field and a CCFS1 for preamble puncture field, and set, using bitmap for preamble puncture, secondary 40 MHz in 160 MHz to be unavailable and all remaining channels to be available. In this way, the old station may send a frame in an HT, VHT, or HE format using a primary 40 MHz channel, and the new station may select, from the 160 MHz channel, a BSS bandwidth in a preamble puncture mode that does not include secondary 40 MHz, to send data.

Method 3:

FIG. 17 is a structural diagram of HT operation information, where there are still many reserved bits: B4 to B7, B11, B21 to B29, and B33 to B39. Seven reserved bits (for example, B21 to B27) may be defined as a bitmap for preamble puncture field, and each bit corresponds to seven 20 MHz secondary channels other than primary 20 MHz. For a 160 (80+80) MHz channel, seven bits in bitmap for preamble puncture respectively correspond, in ascending order of bits, to seven 20 MHz secondary channels that are arranged in ascending order of frequencies and that are other than a primary 20 MHz channel. For an 80 MHz channel, the first three bits of operation channel bitmap respectively correspond to three 20 MHz secondary channels that are arranged in ascending order of frequencies and that are other than a primary 20 MHz channel, and the last four bits are reserved and set to 0.

Alternatively, eight reserved bits (for example, B21 to B28) may be defined as an operation channel bitmap field, and each bit corresponds to a 20 MHz channel. For a 160 (80+80) MHz channel, eight bits in bitmap for preamble puncture respectively correspond, in ascending order of bits, to eight 20 MHz secondary channels that are arranged in ascending order of frequencies. For an 80 MHz channel, the first four bits of operation channel bitmap respectively correspond to four 20 MHz secondary channels that are arranged in ascending order of frequencies, and the last four bits are reserved and set to 0. It should be noted that for the 80 MHz channel or the 160 (80+80) MHz channel, a bit corresponding to primary 20 MHz is always set to 1.

It can be supported in this embodiment that when some secondary channels are unavailable, a channel aggregation capability is improved by establishing a BSS bandwidth in a preamble puncture mode such that a channel is flexibly used. In addition, in this embodiment of this application, existing fields are reused as much as possible, to reduce signaling overheads.

It can be learned from the foregoing examples that, after the bandwidth is extended to 320 MHz, the EHT operation information field is used to indicate the BSS bandwidth in this embodiment of this application. If the BSS wants to work in a preamble puncture mode, a reserved field in HE operation Element or HT operation information is used. This embodiment of this application further provides a BSS bandwidth indication manner in a larger bandwidth (320 MHz), and provides a BSS bandwidth indication manner in a preamble puncture mode.

It should be noted that, for brief description, the foregoing method embodiments are represented as a combination of a series of actions. However, a person skilled in the art should appreciate that this application is not limited to the described order of the actions, because according to this application, some steps may be performed in another order or simultaneously. It should be further appreciated by a person skilled in the art that the embodiments described in this specification all belong to embodiments, and the involved actions and modules are not necessarily required by this application.

To better implement the foregoing solutions in the embodiments of this application, the following further provides a related apparatus for implementing the foregoing solutions.

Figure 18:
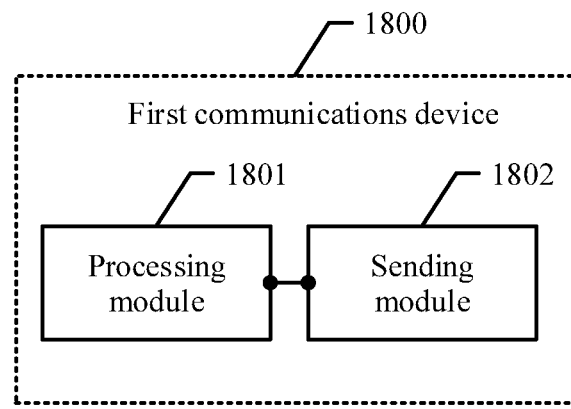
FIG. 18 is a schematic structural diagram of composition of a first communications device according to an embodiment of this application.

An embodiment of this application provides a communications device. As shown in FIG. 18, the communications device is a first communications device 1800, and the first communications device 1800 includes: a processing module 1801 configured to generate a first frame, where the first frame includes a channel bandwidth field, a first channel center frequency segment field, a second channel center frequency segment field, a third channel center frequency segment field, and a fourth channel center frequency segment field, the channel bandwidth field is used to indicate a BSS bandwidth, and the first channel center frequency segment field, the second channel center frequency segment field, the third channel center frequency segment field, and the fourth channel center frequency segment field are used to indicate a location of an operating channel of a BSS, and a sending module 1802 configured to send the first frame.

Figure 19:
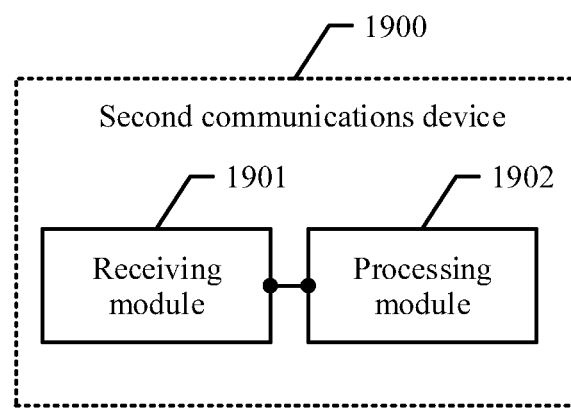
FIG. 19 is a schematic structural diagram of composition of a second communications device according to an embodiment of this application.

An embodiment of this application provides a communications device. As shown in FIG. 19, the communications device is a second communications device 1900, and the second communications device 1900 includes a receiving module 1901 configured to receive a first frame from a first communications device, and a processing module 1902 configured to parse the first frame to obtain a channel bandwidth field, a first channel center frequency segment field, a second channel center frequency segment field, a third channel center frequency segment field, and a fourth channel center frequency segment field, where the processing module 1902 is configured to determine a BSS bandwidth and a location of an operating channel of a BSS based on the channel bandwidth field, the first channel center frequency segment field, the second channel center frequency segment field, the third channel center frequency segment field, and the fourth channel center frequency segment field.

Figure 20:
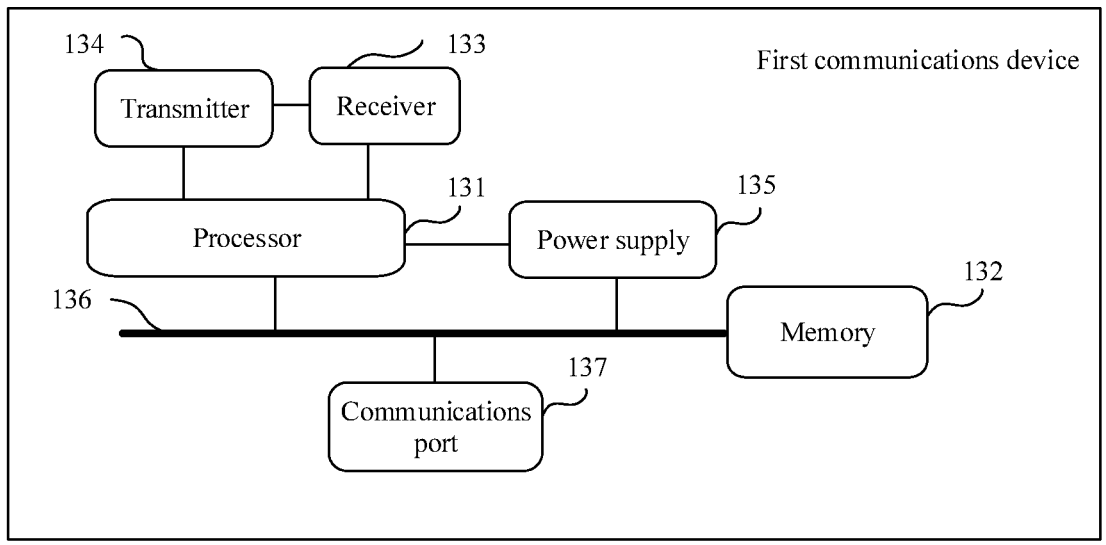
FIG. 20 is a schematic structural diagram of composition of another first communications device according to an embodiment of this application.

FIG. 20 is a schematic structural diagram of another device according to an embodiment of this application. The device is a first communications device, and the first communications device may include a processor 131 (for example, a central processing unit (CPU)), a memory 132, a transmitter 134, and a receiver 133. The transmitter 134 and the receiver 133 are coupled to the processor 131, and the processor 131 controls a sending action of the transmitter 134 and a receiving action of the receiver 133. The memory 132 may include a high-speed random-access memory (RAM), and may further include a nonvolatile memory (NVM), for example, at least one magnetic disk memory. The memory 132 may store various instructions, to complete various processing functions and implement the method steps in the embodiments of this application. Optionally, the first communications device in this embodiment of this application may further include one or more of a power supply 135, a communications bus 136, and a communications port 137. The receiver 133 and the transmitter 134 may be integrated into a transceiver of the first communications device, or may be independent receive and transmit antennas of the first communications device. The communications bus 136 is configured to implement communication and connection between the components. The communications port 137 is configured to implement connection and communication between the first communications device and another peripheral.

In this embodiment of this application, the memory 132 is configured to store computer-executable program code, and the program code includes an instruction. When the processor 131 executes the instruction, the instruction enables the processor 131 to perform a processing action of the first communications device in the foregoing method embodiment, and enables the transmitter 134 to perform a sending action of the first communications device in the foregoing method embodiment. Implementation principles and technical effects thereof are similar, and details are not described herein again.

Figure 21:
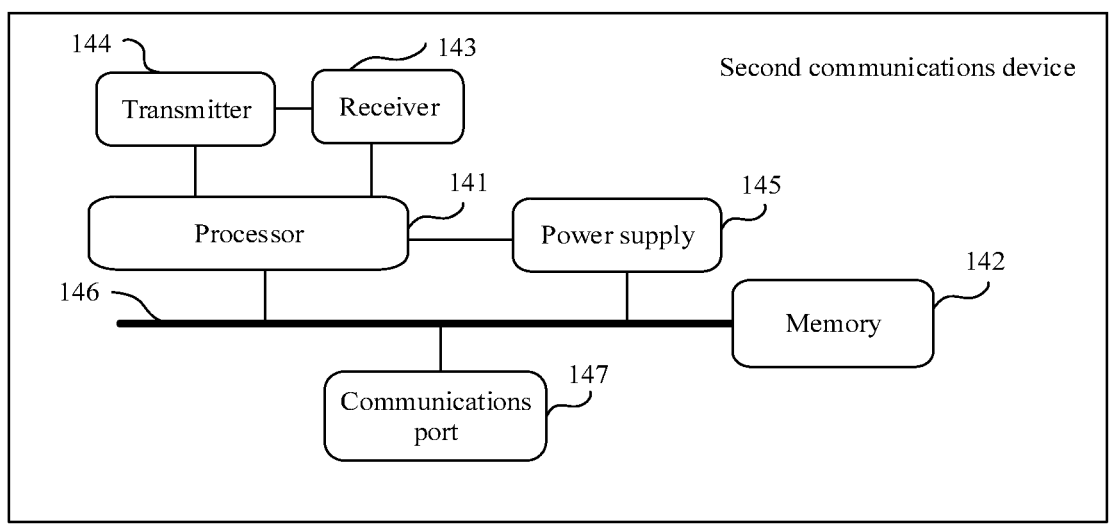
FIG. 21 is a schematic structural diagram of composition of another second communications device according to an embodiment of this application.

FIG. 21 is a schematic structural diagram of another device according to an embodiment of this application. The device is a second communications device, and the second communications device may include a processor (for example, a CPU) 141, a memory 142, a receiver 143, and a transmitter 144. The receiver 143 and the transmitter 144 are coupled to the processor 141, and the processor 141 controls a receiving action of the receiver 143 and a sending action of the transmitter 144. The memory 142 may include a high-speed RAM, and may further include an NVM, for example, at least one magnetic disk memory. The memory 142 may store various instructions, to complete various processing functions and implement the method steps in the embodiments of this application. Optionally, the second communications device in this embodiment of this application may further include one or more of a power supply 145, a communications bus 146, and a communications port 147. The receiver 143 and the transmitter 144 may be integrated into a transceiver of the second communications device, or may be independent receive and transmit antennas of the second communications device. The communications bus 146 is configured to implement communication and connection between the components. The communications port 147 is configured to implement connection and communication between the second communications device and another peripheral.

In this embodiment of this application, the memory 142 is configured to store computer-executable program code, and the program code includes an instruction. When the processor 141 executes the instruction, the instruction enables the processor 141 to perform a processing action of the second communications device in the foregoing method embodiment, and enables the transmitter 144 to perform a sending action of the second communications device in the foregoing method embodiment. Implementation principles and technical effects thereof are similar, and details are not described herein again.

In another possible design, when the communications device is a terminal device or a built-in chip of a network device, the chip includes a processing unit and a communications unit. The processing unit may be, for example, a processor, and the communications unit may be, for example, an input/output interface, a pin, or a circuit. The processing unit may execute a computer-executable instruction stored in a storage unit such that a chip in the terminal performs any one of the foregoing wireless communication methods. Optionally, the storage unit is a storage unit in the chip, such as a register or a buffer, or the storage unit may be a storage unit in the terminal but outside the chip, such as a read-only memory (ROM), another type of static storage device capable of storing static information and instructions, or a RAM.

The processor mentioned above may be a general-purpose CPU, a microprocessor, an application-specific integrated circuit (ASIC), or one or more integrated circuits configured to control program execution of the wireless communication method in the first aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all the modules may be selected based on an actual need to achieve the objectives of the solutions of the embodiments. In addition, in the accompanying drawings of the apparatus embodiments provided in this application, connection relationships between modules indicate that the modules have communication connections with each other, which may be implemented as one or more communications buses or signal cables. A person of ordinary skill in the art may understand and implement the embodiments of the present disclosure without creative efforts.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by corresponding hardware. Moreover, a specific hardware structure used to achieve a same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to the other approaches may be implemented in a form of a software product. The software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A first apparatus comprising:
    a memory configured to store instructions; and
    a processor coupled to the memory and configured to execute the instructions to cause the first apparatus to:
        generate a first frame comprising an operation element field, wherein the operation element field comprises a channel bandwidth field, a first channel center frequency segment field, a second channel center frequency segment field, and a bitmap for preamble puncture field, wherein the channel bandwidth field indicates a basic service set (BSS) bandwidth, wherein the first channel center frequency segment field and the second channel center frequency segment field indicate a location of an operating channel of a BSS, and wherein each bit status in the bitmap for preamble puncture field indicates whether a subchannel of the operating channel of the BSS is available; and
        send the first frame.

2. The first apparatus of claim 1, wherein the operation element field is an Extremely High Throughput (EHT) operation information field.

3. The first apparatus of claim 1, wherein the first frame further comprises a preamble punctured BSS field indicating whether the bitmap for preamble puncture field is present.

4. The first apparatus of claim 1, wherein the first frame is a beacon frame.

5. The first apparatus of claim 1, wherein the first frame is an association response frame.

6. The first apparatus of claim 1, wherein the subchannel has a subchannel bandwidth of 20 megahertz (MHz).

7. A method comprising:
    generating a first frame comprising an operation element field, wherein the operation element field comprises a channel bandwidth field, a first channel center frequency segment field, a second channel center frequency segment field, and a bitmap for preamble puncture field, wherein the channel bandwidth field indicates a basic service set (BSS) bandwidth, wherein the first channel center frequency segment field and the second channel center frequency segment field indicate a location of an operating channel of a BSS, and wherein each bit status in the bitmap for preamble puncture field indicates whether a subchannel of the operating channel of the BSS is available; and
    sending the first frame.

8. The method of claim 7, wherein the operation element field is an Extremely High Throughput (EHT) operation information field.

9. The method of claim 7, wherein the first frame further comprises a preamble punctured BSS field indicating whether the bitmap for preamble puncture field is present.

10. The method of claim 7, wherein the first frame comprises a beacon frame.

11. The method of claim 7, wherein the first frame comprises an association response frame.

12. The method of claim 7, wherein the subchannel has a subchannel bandwidth of 20 megahertz (MHz).

13. A computer program product comprising instructions that are stored on a non-transitory computer-readable medium and that, when executed by a processor, cause a first apparatus to:

generate a first frame comprising an operation element field, wherein the operation element field comprises a channel bandwidth field, a first channel center frequency segment field, a second channel center frequency segment field, and a bitmap for preamble puncture field, wherein the channel bandwidth field indicates a basic service set (BSS) bandwidth, wherein the first channel center frequency segment field and the second channel center frequency segment field indicate a location of an operating channel of a BSS, and wherein each bit status in the bitmap for preamble puncture field indicates whether a subchannel of the operating channel of the BSS is available; and send the first frame.

14. The computer program product of claim 13, wherein the operation element field is an Extremely High Throughput (EHT) operation information field.

15. The computer program product of claim 13, wherein the first frame further comprises a preamble punctured BSS field indicating whether the bitmap for preamble puncture field is present.

16. The computer program product of claim 13, wherein the first frame is a beacon frame or an association response frame.

17. The computer program product of claim 13, wherein the subchannel has a subchannel bandwidth of 20 megahertz (MHz).

18. The computer program product of claim 13, wherein the bitmap for preamble puncture field is 2 bytes.

19. The first apparatus of claim 1, wherein the bitmap for preamble puncture field is 2 bytes.

20. The method of claim 7, wherein the bitmap for preamble puncture field is 2 bytes.

* * * * *